US009409367B2

(12) United States Patent
Graham et al.

(10) Patent No.: US 9,409,367 B2
(45) Date of Patent: Aug. 9, 2016

(54) MACHINE FOR FORMING MULTIPLE TYPES OF CONTAINERS

(75) Inventors: Thomas Dean Graham, Winter Garden, FL (US); Amer Aganovic, Orlando, FL (US); Claudio D'Alesio, Windemere, FL (US); Paul Andrew Spurlock, Oviedo, FL (US)

(73) Assignee: WestRock Shared Services, LLC, Norcross, GA (US)

( * ) Notice: Subject to any disclaimer, the term of this patent is extended or adjusted under 35 U.S.C. 154(b) by 1092 days.

(21) Appl. No.: 13/252,343

(22) Filed: Oct. 4, 2011

(65) Prior Publication Data

US 2012/0100976 A1 Apr. 26, 2012

Related U.S. Application Data

(60) Provisional application No. 61/406,909, filed on Oct. 26, 2010.

(51) Int. Cl.

*B31B 3/00* (2006.01)
*B31B 3/02* (2006.01)
*B31B 3/28* (2006.01)
*B65G 59/06* (2006.01)

(52) U.S. Cl.

CPC ........... *B31B 3/00* (2013.01); *B31B 2201/0282* (2013.01); *B31B 2201/94* (2013.01); *B31B 2201/95* (2013.01); *B31B 2203/066* (2013.01)

(58) Field of Classification Search

CPC .............. B31B 3/00; B31B 1/00; B31B 1/06; B31B 5/00; B31B 2201/00; B31B 2201/02; B31B 2201/92; B31B 2201/94; B31B 1/28; B31B 3/26; B31B 3/28; B31B 3/30; B31B 2201/95; B31B 2201/0282; B31B 2201/2666; B31B 2201/08; B31B 2201/2608; B31B 2201/281; B31B 7/00; B65G 59/00; B65G 59/06; B65G 69/0408; B65B 35/58

USPC ............ 53/251, 144, 544; 493/52, 68, 71, 79, 493/105, 107, 125, 126; 414/795.4, 797.8, 414/272; 198/348, 363, 364, 369.2, 360, 198/361, 370.05

See application file for complete search history.

(56) References Cited

U.S. PATENT DOCUMENTS 4,242,949 A 1/1981 Auckenthaler
4,345,905 A * 8/1982 Moen ........................ B31B 1/46 493/131
4,516,210 A * 5/1985 Dahlke ..................... B31B 1/74 493/1
4,578,054 A * 3/1986 Herrin ........................... 493/126
4,608,038 A * 8/1986 Virta ......................... B31B 1/02 493/110
4,930,291 A 6/1990 Buisseau
4,936,815 A * 6/1990 Kirkland ................... B31B 1/06 493/125
4,988,331 A * 1/1991 Boisseau ................... B31B 1/44 493/143
5,024,641 A * 6/1991 Boisseau ................... B31B 1/44 493/143
5,147,271 A 9/1992 Bacques et al.

(Continued)

*Primary Examiner* — Gloria R Weeks
*Assistant Examiner* — Justin Citrin
(74) *Attorney, Agent, or Firm* — WestRock IP Legal

(57) ABSTRACT

A blank delivery system for use in a machine for forming a container from a blank sheet of material is described herein. The blank delivery system includes a blank loading assembly that includes a plurality of blank hoppers. Each blank hopper is configured to hold a plurality of blanks for forming a different type of container. A blank transfer assembly is coupled to each blank hopper of the plurality of blank hoppers. The blank transfer assembly is configured to convey the blanks from each blank hopper to a container forming system of the machine.

19 Claims, 43 Drawing Sheets

(56) References Cited

U.S. PATENT DOCUMENTS 5,350,348 A * 9/1994 Guot ............................... 493/34
5,393,291 A 2/1995 Wingerter
5,502,950 A * 4/1996 Moncrief et al. ............... 53/448
5,653,671 A 8/1997 Reuteler
5,692,593 A * 12/1997 Ueno et al. ................. 198/369.2
5,771,658 A * 6/1998 Olson et al. ..................... 53/157
5,782,732 A * 7/1998 Herrin ........................... 493/131
5,807,223 A * 9/1998 Holton ...................... B31B 1/28 493/120
5,924,968 A * 7/1999 Odenthal ...................... 493/309
6,015,084 A * 1/2000 Mathieu .................... B31B 7/00 229/122.32
6,571,539 B2 * 6/2003 Gendre et al. .................. 53/456
7,310,925 B2 12/2007 Monti
7,329,218 B2 2/2008 Kisch
7,509,789 B2 * 3/2009 Scholtes ................... B31B 1/44 493/163
7,717,838 B2 * 5/2010 Strong ...................... B31B 1/44 493/126
8,020,361 B2 9/2011 Kobierzycki et al.
2003/0036468 A1 * 2/2003 Blank et al. ....................... 493/8
2004/0005977 A1 1/2004 Scholtes
2008/0078819 A1 4/2008 Strong et al.
2009/0098991 A1 * 4/2009 Graham et al. ............... 493/162
2009/0280973 A1 * 11/2009 Graham et al. ............... 493/127

* cited by examiner

MACHINE FOR FORMING MULTIPLE TYPES OF CONTAINERS

CROSS REFERENCE TO RELATED APPLICATIONS

This application claims the priority of U.S. Provisional Patent Application Ser. No. 61/406,909, filed Oct. 26, 2010, which is hereby incorporated herein by reference in its entirety.

BACKGROUND OF THE INVENTION

This invention relates generally to a machine for forming containers from a blank of sheet material, and more specifically to methods and a machine for continuously forming multiple types of corrugated containers from blanks of sheet material.

Containers fabricated from paperboard and/or corrugated paperboard material are often used to store and transport goods. These containers can include four-sided containers, six-sided containers, eight-sided containers, bulk bins and/or various size corrugated barrels. Such containers are usually formed from blanks of sheet material that are folded along a plurality of preformed fold lines to form an erected corrugated container.

At least some known containers are formed using a machine. For example, a blank may be positioned near a mandrel on a machine, and the machine may be configured to wrap the blank around the mandrel to form at least a portion of the container. An example of such a machine is shown in U.S. Pat. No. 4,242,949 ("the '949 Patent"). The '949 Patent describes a machine that is capable of producing a cardboard case or similar container by wrapping a blank about a mandrel. This mandrel has a substantially square or rectangular cross section, so that the cases formed by the machine have four lateral faces defining a volume having a cross section, parallel to the bottom of the cases, which is also square or rectangular. In other words, this machine forms a four-sided, square, or rectangular box. The machine uses jacks and mechanical linkages to raise, lower, and rotate folding arms that wrap the blank around the mandrel. These arms are rigidly connected together so that they move in tandem, and cannot be moved or controlled independently. The machine shown in the '949 Patent does not include the ability to feed different types of blanks to the forming station for continually forming different types of containers.

Another box forming machine is described in U.S. Pat. No. 5,147,271 ("the '271 Patent"). The '271 Patent describes a machine having an eight-sided mandrel that is capable of producing a cardboard case or similar container by wrapping a blank about the mandrel. This machine is able to form containers having eight side faces defining a volume having a cross section, parallel to the bottom of the container, which is also eight-sided. As in the case of the '949 Patent, the '271 Patent also describes a machine that uses jacks and mechanical linkages to raise, lower, and rotate folding arms that wrap the blank around the mandrel. These arms are rigidly connected together so that they move in tandem, and cannot be moved or controlled independently. The machine shown in the '271 Patent does not include the ability to feed different types of blanks to the forming station for continuously forming multiple different types of containers.

Another box forming machine is described in U.S. Pub. No. 2008/0078819 ("the '819 Application"). The '819 Application describes a machine for forming a barrel from a blank of sheet material. The machine includes a mandrel having an external shape complimentary to an internal shape of at least a portion of the barrel. The barrel that is formed is an eight-sided barrel. Thus, the mandrel is also eight-sided. Unlike in the '949 Patent and the '271 Patent, the '819 Application describes a servomechanism operatively connected to a folding arm for driving and controlling movement of the arm. Again, the '819 Application does not describe a machine that can continuously feed multiple types of blanks to the forming station.

None of these known box forming machines include a plurality of blank feed hoppers, a mandrel, a plurality of folding arms, and a plurality of blank feeding arms that enable the machine to continuously form different types of containers from the different types of blanks being fed to the forming station. It would be beneficial to have a box forming machine that includes individually controlled arms and a control system that allows an operator to program different box forming recipes, or protocols, into the control system. Each recipe would include computer-readable instructions that instruct the different mechanisms of the blank feeding stations and the box forming arms to form various types of boxes, and/or control the output of the formed boxes from the machine. Thus, the machine could continuously form multiple types of boxes. The different types of boxes refer to boxes having various depths, various printing on the outside of the boxes, and various lid structures or, in some cases, no lid structures. A different type of box, as used herein, however, does not mean that the boxes have a different overall length of the sides or ends, or a different number of sides.

BRIEF DESCRIPTION OF THE INVENTION

In one aspect, a blank delivery system for use in a machine for forming a container from a blank sheet of material is provided. The blank delivery system includes a blank loading assembly that includes a plurality of blank hoppers. Each blank hopper is configured to hold a plurality of blanks for forming a different type of container. A blank transfer assembly is coupled to each blank hopper of the plurality of blank hoppers. The blank transfer assembly is configured to convey the blanks from each blank hopper to a container forming system of the machine.

In another aspect, a machine for forming a container from a blank of sheet material is provided. The machine includes a mandrel assembly that is configured to form a container from a blank sheet of material and a container delivery system that is configured to selectively convey the container from the mandrel assembly to a plurality of product loading areas. The container delivery system includes a conveyor belt assembly that is positioned downstream of the mandrel assembly. The conveyor belt assembly includes a first conveyor section and at least a second conveyor section. The first conveyor section is coupled to a first product loading area. The second conveyor section is coupled to a second product loading area that is different than the first product loading area. A container loading assembly is coupled to the mandrel assembly and is positionable between a first position to convey a container from the container forming section to said first conveyor section, and a second position to convey the container from the container forming system to said second conveyor section.

In yet another aspect, a machine for forming a container from a blank of sheet material is provided. The machine includes a mandrel assembly that includes a mandrel having an external shape complimentary to an internal shape of at least a portion of a container, and at least one lifting mechanism configured to wrap at least a portion of the blank about the mandrel to facilitate forming the container. A blank delivery system is coupled to the mandrel assembly. The blank delivery system is configured to selectively deliver a plurality of blanks to the mandrel assembly for forming a plurality of different types of containers. The blank delivery system includes a blank loading assembly that includes a plurality of blank hoppers, wherein each blank hopper is configured to hold a plurality of blanks. A blank transfer assembly is coupled to each blank hopper of the plurality of blank hoppers to convey the blanks from each blank hopper to said mandrel assembly.

DETAILED DESCRIPTION OF THE INVENTION

Figure 1A:
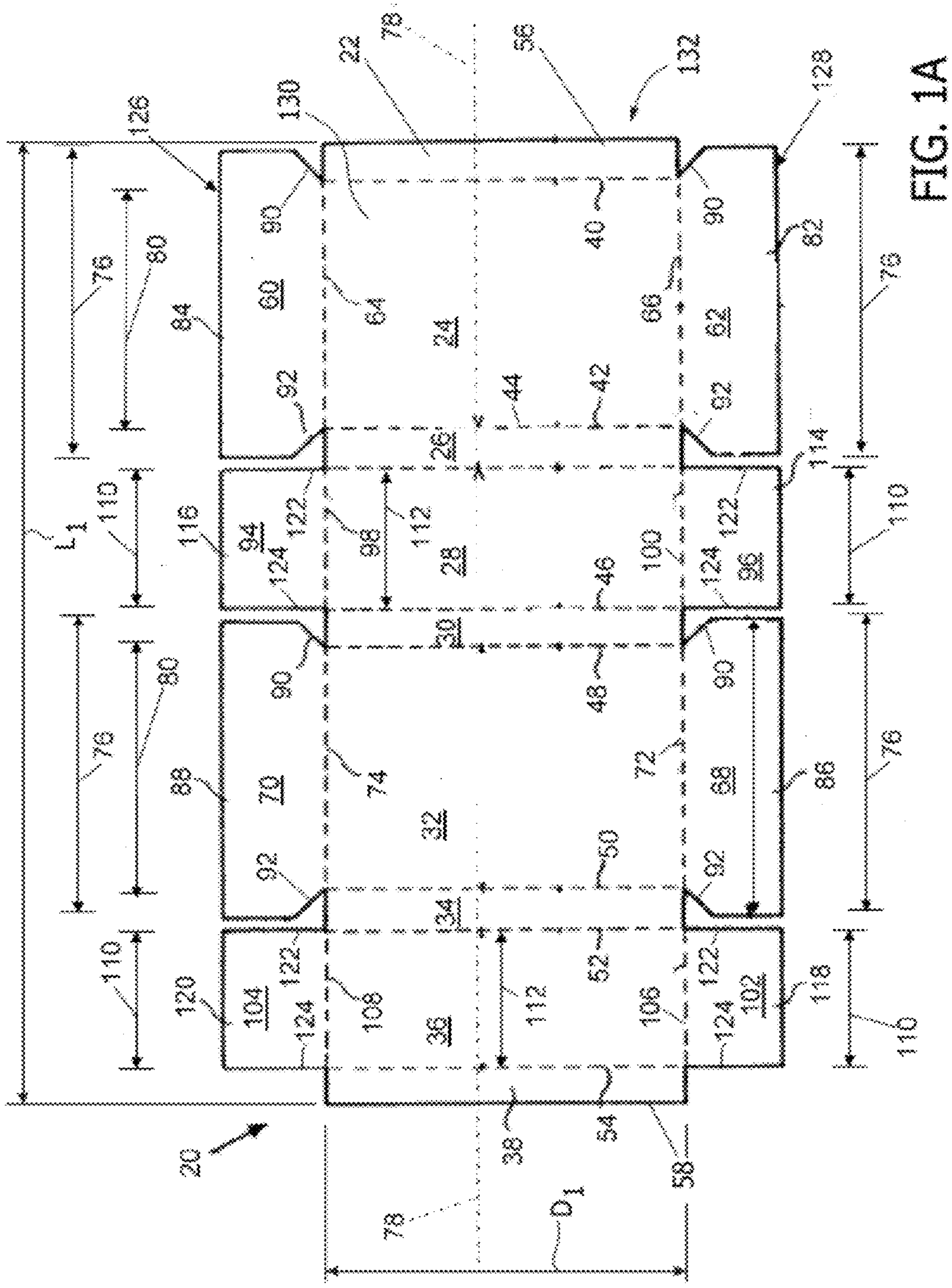
FIG. 1A is a top plan view of an exemplary embodiment of a blank of sheet material having 8-sides that may be used with the machine described herein.

The methods and machine for forming corrugated containers described herein overcome at least some of the limitations of known box forming machines by providing a machine that includes a container forming section and a blank delivery system that is configured to deliver a plurality of different types of blanks to the container forming system for forming a plurality of different types of containers. More specifically, the blank delivery system includes multiple blank hoppers and a blank transfer assembly that is coupled to each blank hopper to selectively deliver different blanks to the container forming section. The blank delivery system also includes modular blank hoppers such that additional hoppers can be added to the machine for running as many different types of blanks as needed. The blank delivery system selectively delivers a plurality of blanks having different blank depths, different lid configurations, and/or different printing to the container forming system to enable a plurality of different types of containers having different container depths, different printing on the outside of containers, and/or different lid structures to be formed. The machine further includes a container delivery system that is configured to selectively deliver a container from the container forming system to one or more product loading areas.

The machine also includes a control system that is coupled in operative control communication with components of the machine to enable an operator to program different box forming recipes, or protocols, into the control system to facilitate forming various types of containers. The control system includes a plurality of servomechanisms, also referred to herein as "servos" or variable speed motors, that are coupled to components of the machine to enable the different components, or groups of components to be independently operated. By providing a machine that includes a blank delivery system that selectively delivers different types of blanks to a container forming system, different types of containers can be continuously formed on the machine without having to stop the machine for adjustment or reconfiguration. Thus, the cost of forming different types of containers is reduced as compared to known box forming machines.

As described herein, a control system allows an operator to change recipes or protocols by making a selection on a user interface. The recipes are computer instructions for controlling the machine to form different size boxes, different types of boxes, and/or adjust a production speed of the machine output. The different recipes control the speed, timing, force applied, and/or other motion characteristics of the different forming components of the machine including how the components move relative to one another. However, the processes and systems described herein are not limited in any way to the corrugated containers shown herein. Rather, the processes and systems described herein can be applied to a plurality of container types manufactured from a plurality of materials. As used herein, the term "servo-controlled" refers to any component and/or device having its movement controlled by a servomechanism.

Figure 1B:
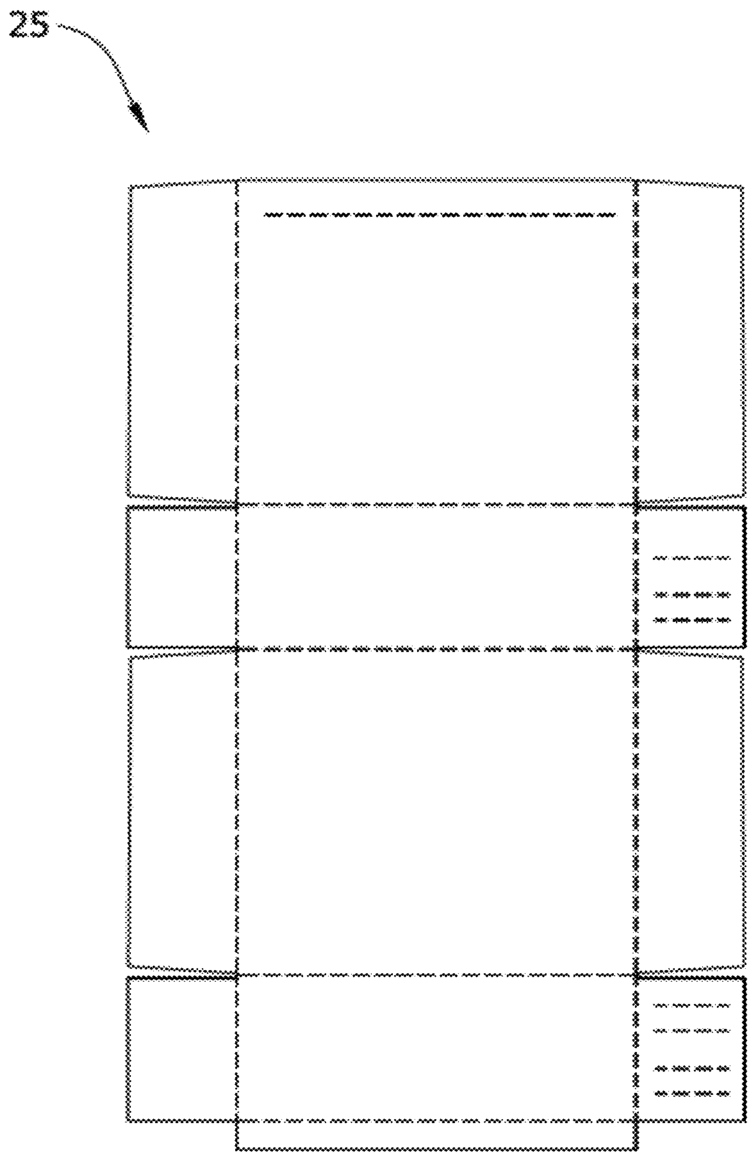
FIG. 1B is a top plan view of an exemplary embodiment of a blank of sheet material having 4-sides that may be used with the machine described herein.

FIG. 1A illustrates a top plan view of an exemplary embodiment of a substantially flat blank 20 of sheet material having 8-sides. FIG. 1B illustrates a top plan view of an exemplary embodiment of a substantially flat blank 25 of sheet material having 4-sides. Each blank 20 and blank 25 includes a series of aligned wall panels and end panels connected together by a plurality of preformed, generally parallel, fold lines. As shown in FIG. 1A, the wall panels include a first corner panel 22, a first side panel 24, a second corner panel 26, a first end panel 28, a third corner panel 30, a second side panel 32, a fourth corner panel 34, a second end panel 36, and a glue panel 38 connected in series along a plurality of fold lines 40, 42, 44, 46, 48, 50, 52, and 54. First corner panel 22 extends from a first free edge 56 to fold line 40, first side panel 24 extends from first corner panel 22 along fold line 40, second corner panel 26 extends from first side panel 24 along fold line 42, first end panel 28 extends from second corner panel 26 along fold line 44, third corner panel 30 extends from first end panel 28 along fold line 46, second side panel 32 extends from third corner panel 30 along fold line 48, fourth corner panel 34 extends from second side panel 32 along fold line 50, second end panel 36 extends from fourth corner panel 34 along fold line 52, and glue panel 38 extends from second end panel 36 along fold line 54 to a second free edge 58.

A first top side panel 60 and a first bottom side panel 62 extend from opposing edges of first side panel 24. More specifically, first top side panel 60 and first bottom side panel 62 extend from first side panel 24 along a pair of opposing preformed, generally parallel, fold lines 64 and 66, respectively. Similarly, a second bottom side panel 68 and a second top side panel 70 extend from opposing edges of second side panel 32. More specifically, second bottom side panel 68 and second top side panel 70 extend from second side panel 32 along a pair of opposing preformed, generally parallel, fold lines 72 and 74, respectively. Fold lines 64, 66, 72, and 74 are generally parallel to each other and generally perpendicular to fold lines 40, 42, 48, and 50. First bottom side panel 62 and first top side panel 60 each have a width 76 taken along a central horizontal axis 78 of blank 20 that is greater than a width 80 of first side panel 24, also taken along central horizontal axis 78. Similarly, second bottom side panel 68 and second top side panel 70 each have width 76 that is greater than width 80 of second side panel 32, taken along central horizontal axis 78.

First bottom side panel 62 and first top side panel 60 each include a free edge 82 or 84, respectively. Similarly, second bottom side panel 68 and second top side panel 70 each include a free edge 86 or 88, respectively. Bottom side panels 62 and 68 and top side panels 60 and 70 each include opposing angled edge portions 90 and 92 that are each obliquely angled with respect to respective fold lines 64, 66, 72, and/or 74. Although other angles may be used without departing from the scope of the present invention, in one embodiment, edge portions 90 and 92 are angled at about 45° with respect to respective fold lines 64, 66, 72, and/or 74.

Figure 3:
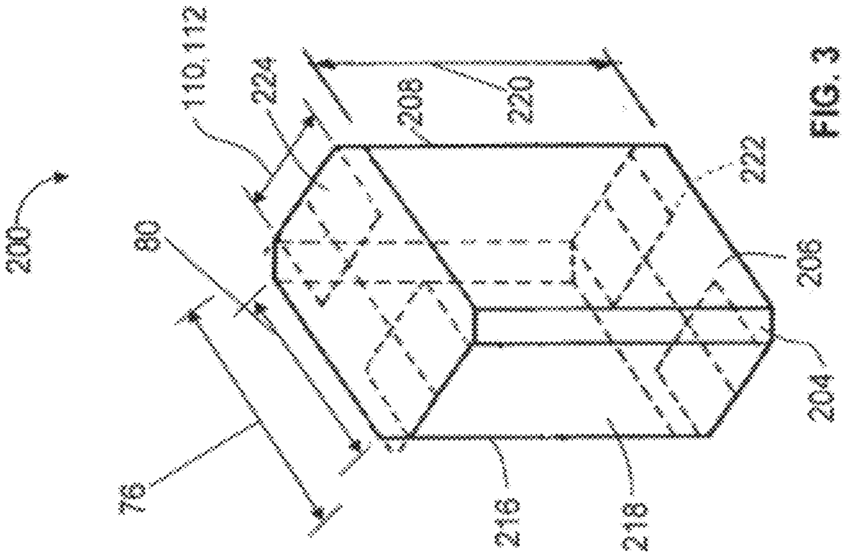
FIG. 3 is a perspective view of the container shown in FIG. 2A in a closed state.
Figure 2A:
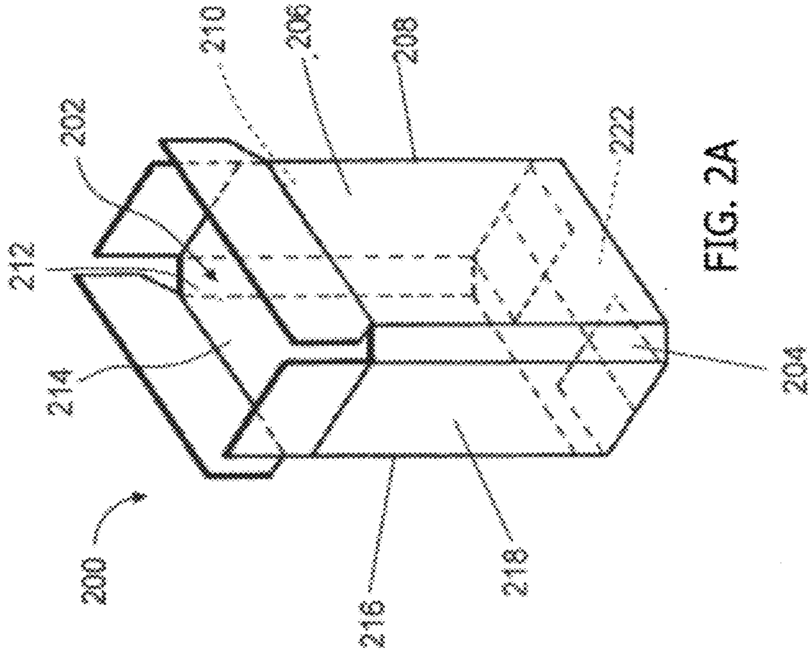
FIG. 2A is a perspective view of an exemplary embodiment of a container having 8-sides that may be formed from the blank shown in FIG. 1A.
Figure 4:
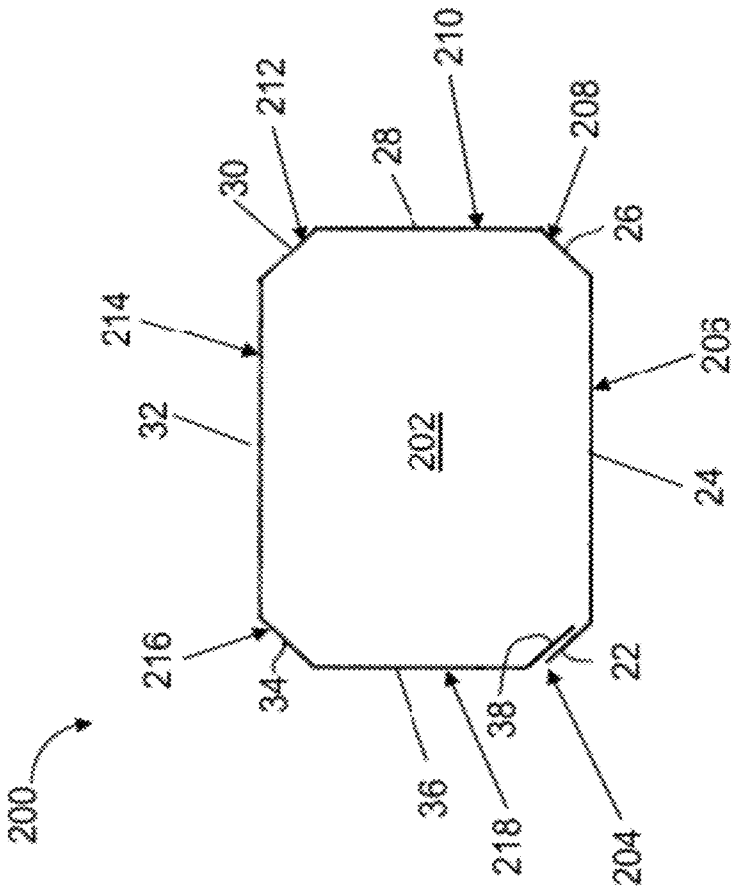
FIG. 4 is an overhead cross-sectional view of the container shown in FIG. 3.

As will be described in more detail below, the shape, size, and arrangement of bottom side panels 62 and 68 and top side panels 60 and 70 as shown in FIG. 1A and described above facilitates forming an octagonal container 200 having angled corners, an example of which is shown in FIG. 2A and FIGS. 3-4. More specifically, the shape, size, and arrangement of bottom side panels 62 and 68 and top side panels 60 and 70 facilitates forming container 200 having corner walls that are obliquely angled with respect to side walls and end walls, and interconnect side walls and end walls of formed container 200.

As shown in FIG. 1A, a first top end panel 94 and a first bottom end panel 96 extend from opposing edges of first end panel 28. More specifically, first top end panel 94 and first bottom end panel 96 extend from first end panel 28 along a pair of opposing preformed, generally parallel, fold lines 98 and 100, respectively. Similarly, a second bottom end panel 102 and a second top end panel 104 extend from opposing edges of second end panel 36. More specifically, second bottom end panel 102 and second top end panel 104 extend from second end panel 36 along a pair of opposing preformed, generally parallel, fold lines 106 and 108, respectively. Fold lines 98, 100, 106, and 108 are generally parallel to each other and generally perpendicular to fold lines 44, 46, 52, and 54. First bottom end panel 96 and first top end panel 94 each have a width 110 taken along central horizontal axis 78 of blank 20 that is substantially equal to a width 112 of first end panel 28, also taken along central horizontal axis 78. Similarly, second bottom end panel 102 and second top end panel 104 each have a width 110 that is substantially equal to width 112 of second end panel 36, taken along central horizontal axis 78.

First bottom end panel 96 and first top end panel 94 each include a free edge 114 or 116, respectively. Similarly, second bottom end panel 102 and second top end panel 104 each include a free edge 118 or 120, respectively. Bottom end panels 96 and 102, and top end panels 94 and 104, each include opposing side edge portions 122 and 124 that are each substantially parallel to respective fold lines 44, 46, 52, and 54. Although other angles may be used without departing from the scope of the present invention, in one embodiment, side edge portions 122 and 124 are angled at about 180° with respect to respective fold lines 44, 46, 52, and/or 54.

As a result of the above exemplary embodiment of blank 20, a manufacturer's joint, a container bottom wall, and a container top wall formed therefrom may be securely closed so that various products may be securely contained within a formed container. Therefore, less material may be used to fabricate blank 20 having suitable strength for construction of a container that can contain various loads.

In the exemplary embodiment, blank 20 extends between a trailing edge 126 and a leading edge 128 and has a depth $D_1$ that is defined as the height of side panels 24 and 32, and end panels 28 and 36. In addition, blank 20 has a length $L_1$ that is defined along centerline axis 78 between first free edge 56 of first corner panel 22 and second free edge 58 of glue panel 38. Blank 20 also includes an inner surface 130 and an outer surface 132. Inner surface 130 and outer surface 132 each extend between leading edge 128 and trailing edge 126, and between first free edge 56 and second free edge 58. In the exemplary embodiment, outer surface 132 of blanks 20 and 25 includes printing and/or labeling. Moreover, each blank 20 and 25 may include different labeling and/or printing to facilitate forming different types of containers 200 each having different printing on the outside of containers 200.

Figure 2B:
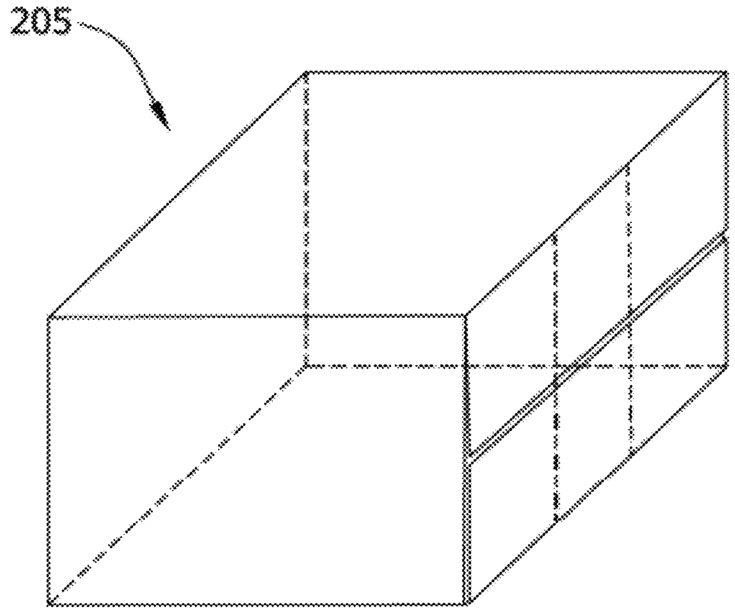
FIG. 2B is a perspective view of an exemplary embodiment of a container having 4-sides that may be formed from the blank shown in FIG. 1B.

As will be described below in more detail with reference to FIGS. 5-42, blank 20 is intended to form container 200 as shown in FIG. 2A and FIGS. 3-4 by folding and/or securing panels 22, 24, 26, 28, 30, 32, 34, 36, and/or 38 (shown in FIG. 1A) and bottom panels 62, 68, 96, and/or 102 (shown in FIG. 1A). Similarly, blank 25 is intended to form container 205 as shown in FIG. 2B. Of course, blanks having shapes, sizes, and configurations different than blank 20 and/or blank 25 described and illustrated herein may be used to form container 200 shown in FIG. 2A and FIGS. 3-4 and/or container 205 shown in FIG. 2B without departing from the scope of the present invention. In other words, the machine, processes, and control system described herein can be used to form a variety of different shaped and sized containers, and is not limited to blank 20 shown in FIG. 1A, blank 25 shown in FIG. 1B, container 200 shown in FIG. 2A and FIGS. 3-4, and/or container 205 shown in FIG. 2B. More specifically, the machine and methods described herein can be configured to form a 4, 6, 8, or N-sided container. In addition, the machine is configured to continuously form multiple different types of containers without having to reconfigure the machine. In other words, different types of blanks (i.e., blanks having a different depth dimension and/or different top configuration and/or different printing on the outside of the container) can be used to form different types of containers on the machine without having to stop operation and reconfigure the machine.

FIG. 2A illustrates a perspective view of an exemplary container 200 having 8-sides, which is erected and in an open configuration, that may be formed from blank 20 (shown in FIG. 1A). FIG. 2B illustrates a perspective view of an exemplary container 205 having 4-sides, that may be formed from blank 25 (shown in FIG. 1B). FIG. 3 illustrates a perspective view of container 200 in a closed configuration. FIG. 4 illustrates an overhead cross-sectional view of container 200. Referring to FIGS. 1A, 2A, and 3-4, in the exemplary embodiment, container 200 includes a plurality of walls defining a cavity 202. More specifically, container 200 includes a first corner wall 204, a first side wall 206, a second corner wall 208, a first end wall 210, a third corner wall 212, a second side wall 214, a fourth corner wall 216, and a second end wall 218. First corner wall 204 includes first corner panel 22 and glue panel 38, first side wall 206 includes first side panel 24, second corner wall 208 includes second corner panel 26, first end wall 210 includes first end panel 28, third corner wall 212 includes third corner panel 30, second side wall 214 includes second side panel 32, fourth corner wall 216 includes fourth corner panel 34, and second end wall 218 includes second end panel 36, as described in more detail below. Each wall 204, 206, 208, 210, 212, 214, 216, and 218 has a height 220. Although each wall may have a different height without departing from the scope of the present invention, in the embodiment shown in FIGS. 1A, 2A, and 3-4, each wall 204, 206, 208, 210, 212, 214, 216, and 218 has substantially the same height 220.

In the exemplary embodiment, first corner wall 204 connects first side wall 206 to second end wall 218, second corner wall 208 connects first side wall 206 to first end wall 210, third corner wall 212 connects first end wall 210 to second side wall 214, and fourth corner wall 216 connects second side wall 214 to second end wall 218. Further, bottom panels 62, 68, 96, and 102 form a bottom wall 222 of container 200, and top panels 60, 70, 94, and 104 form a top wall 224 of container 200. Although container 200 may have other orientations without departing from the scope of the present invention, in the embodiments shown in FIGS. 2A and 3-4, end walls 210 and 218 are substantially parallel to each other, side walls 206 and 214 are substantially parallel to each other, first corner wall 204 and third corner wall 212 are substantially parallel to each other, and second corner wall 208 and fourth corner wall 216 are substantially parallel to each other. Corner walls 204, 208, 212, and 216 are obliquely angled with respect to walls 206, 210, 214, and 218, and they interconnect to form angled corners of container 200.

Bottom panels 62, 68, 96, and 102 are each orientated generally perpendicular to walls 204, 206, 208, 210, 212, 214, 216, and 218 to form bottom wall 222. More specifically, bottom end panels 96 and 102 are folded beneath/inside of bottom side panels 62 and 68. Similarly, in a fully closed position (shown in FIG. 3), top panels 60, 70, 94, and 104 are each orientated generally perpendicular to walls 204, 206, 208, 210, 212, 214, 216, and 218 to form top wall 224. Although container 200 may be secured together using any suitable fastener at any suitable location on container 200 without departing from the scope of the present invention, in one embodiment, adhesive (not shown) is applied to an inner surface and/or an outer surface of first corner panel 22 and/or glue panel 38 to form first corner wall 204. In one embodiment, adhesive may also be applied to exterior surfaces of bottom end panels 96 and/or 102 and/or interior surfaces of bottom side panels 62 and/or 68 to secure bottom side panels 62 and/or 68 to bottom end panels 96 and/or 102. As a result of the above exemplary embodiment of container 200, the manufacturer's joint, bottom wall 222, and/or top wall 224 may be securely closed so that various products may be securely contained within container 200. Therefore, less material may be used to fabricate a stronger container 200.

Figure 5:
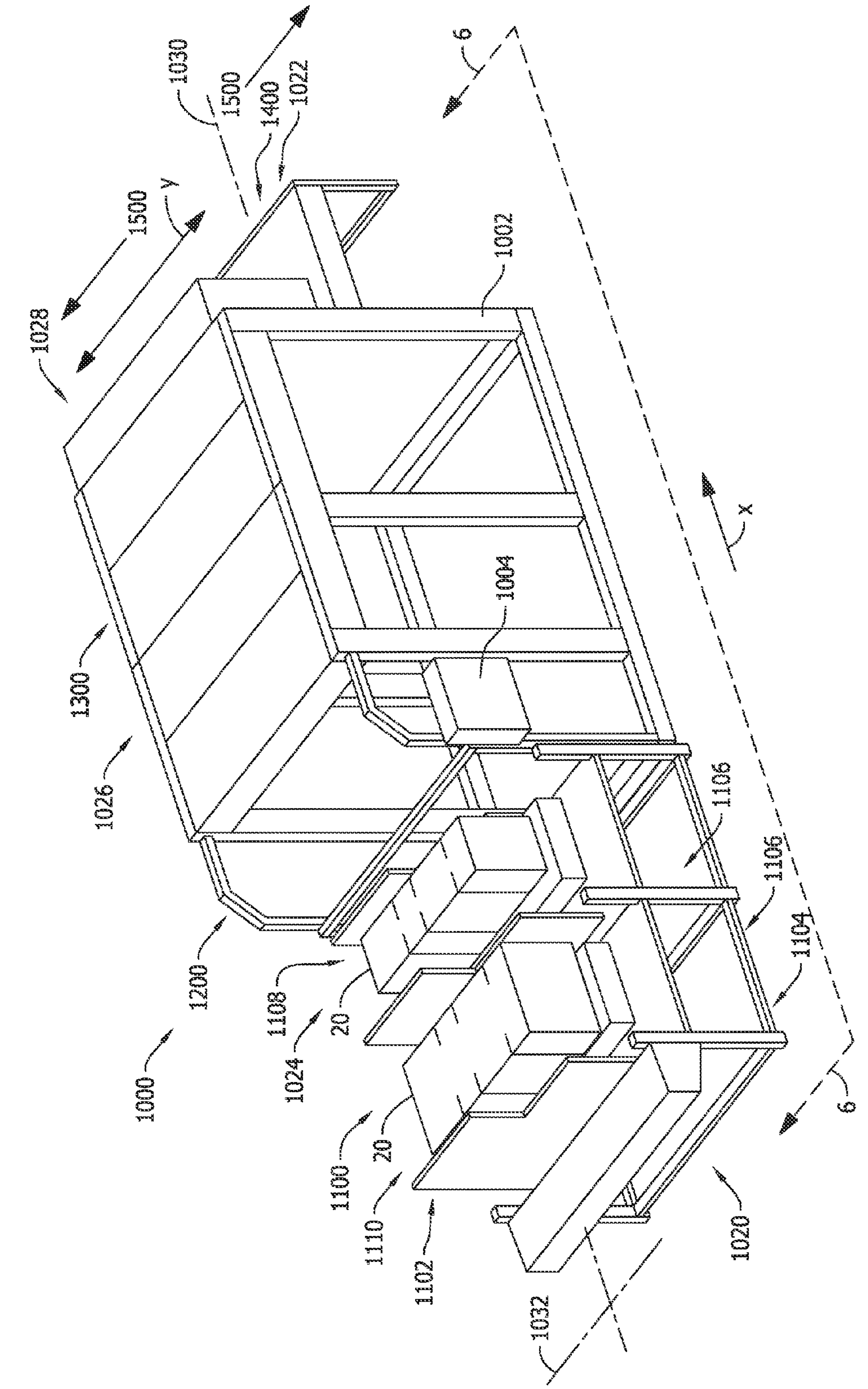
FIG. 5 is a perspective view of an exemplary embodiment of a machine that may be used to form a container from the blank of sheet material shown in FIG. 1A and FIG. 1B.
Figure 6:
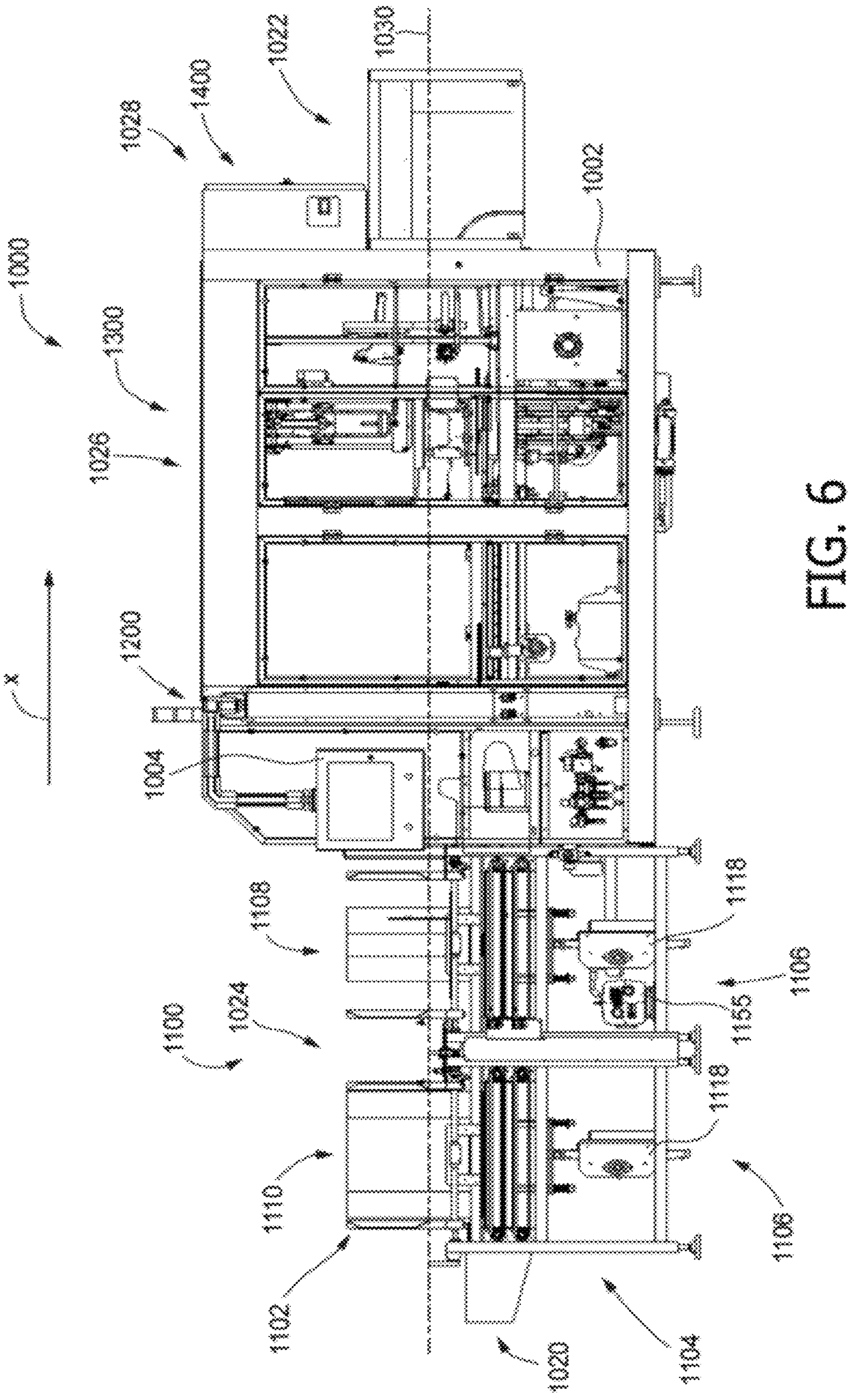
FIG. 6 is a sectional view of the machine shown in FIG. 5.
Figure 7:
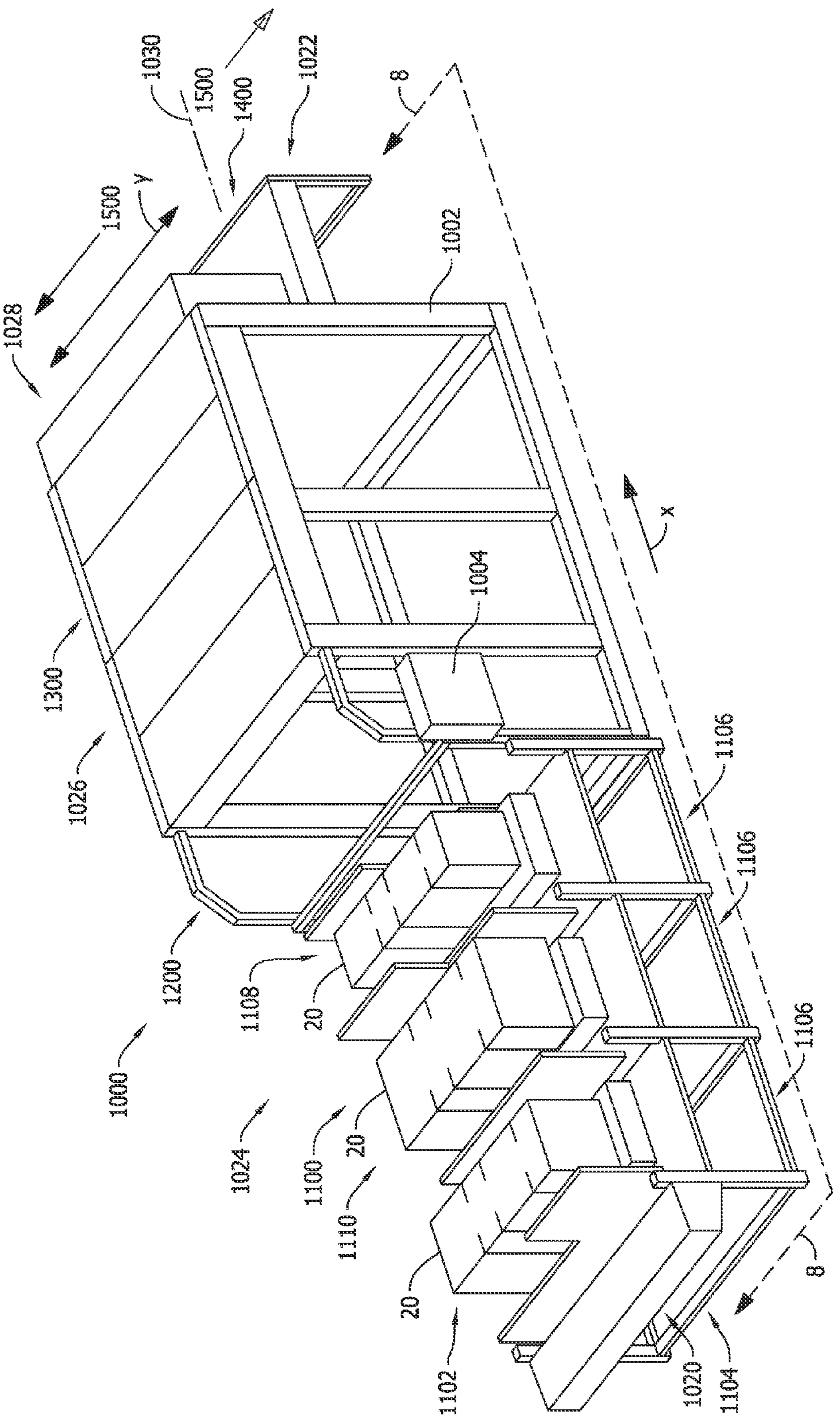
FIG. 7 is a perspective view of another embodiment of the machine shown in FIG. 5.
Figure 8:
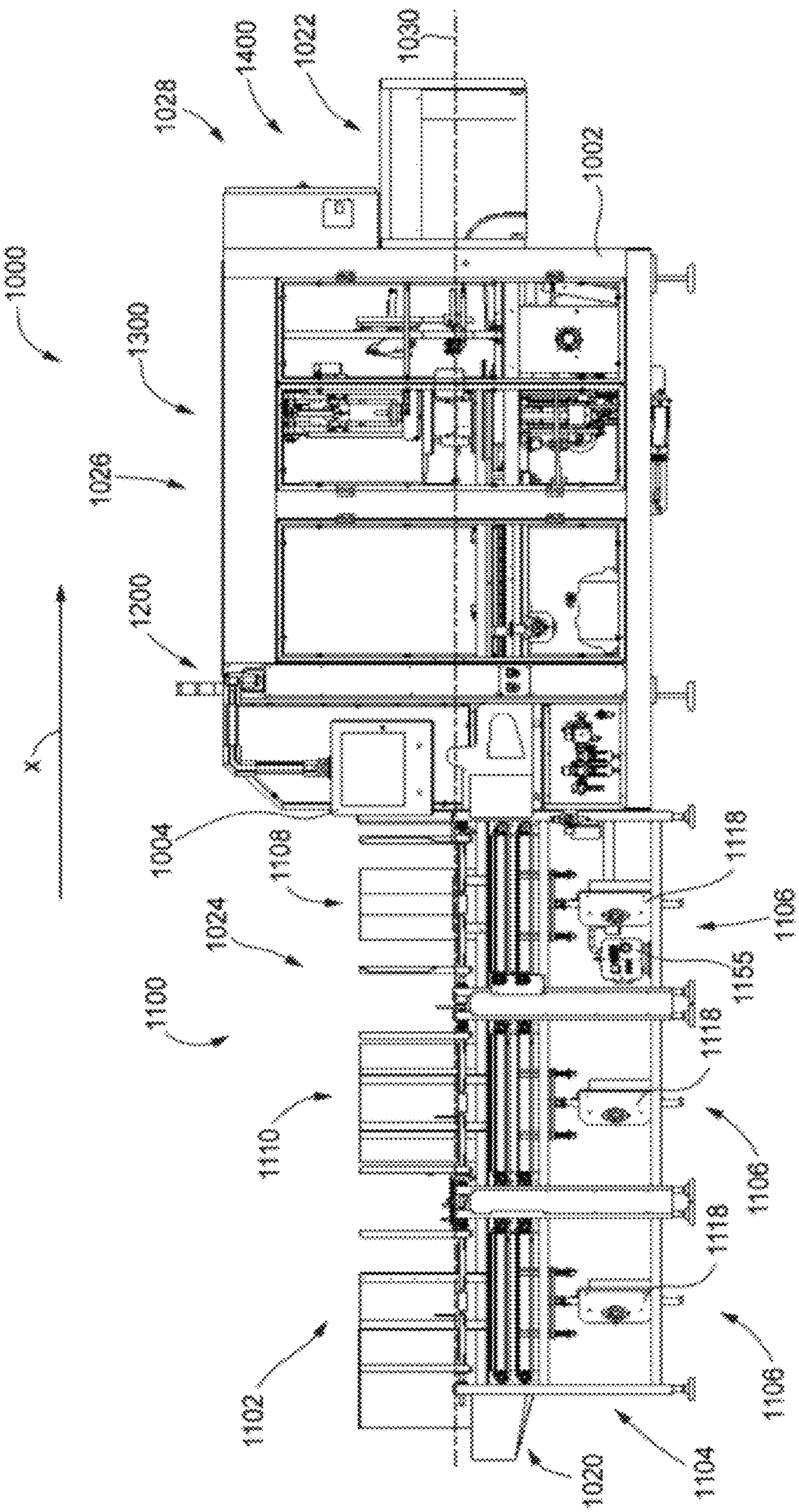
FIG. 8 is a sectional view of the machine shown in FIG. 7.
Figure 9:
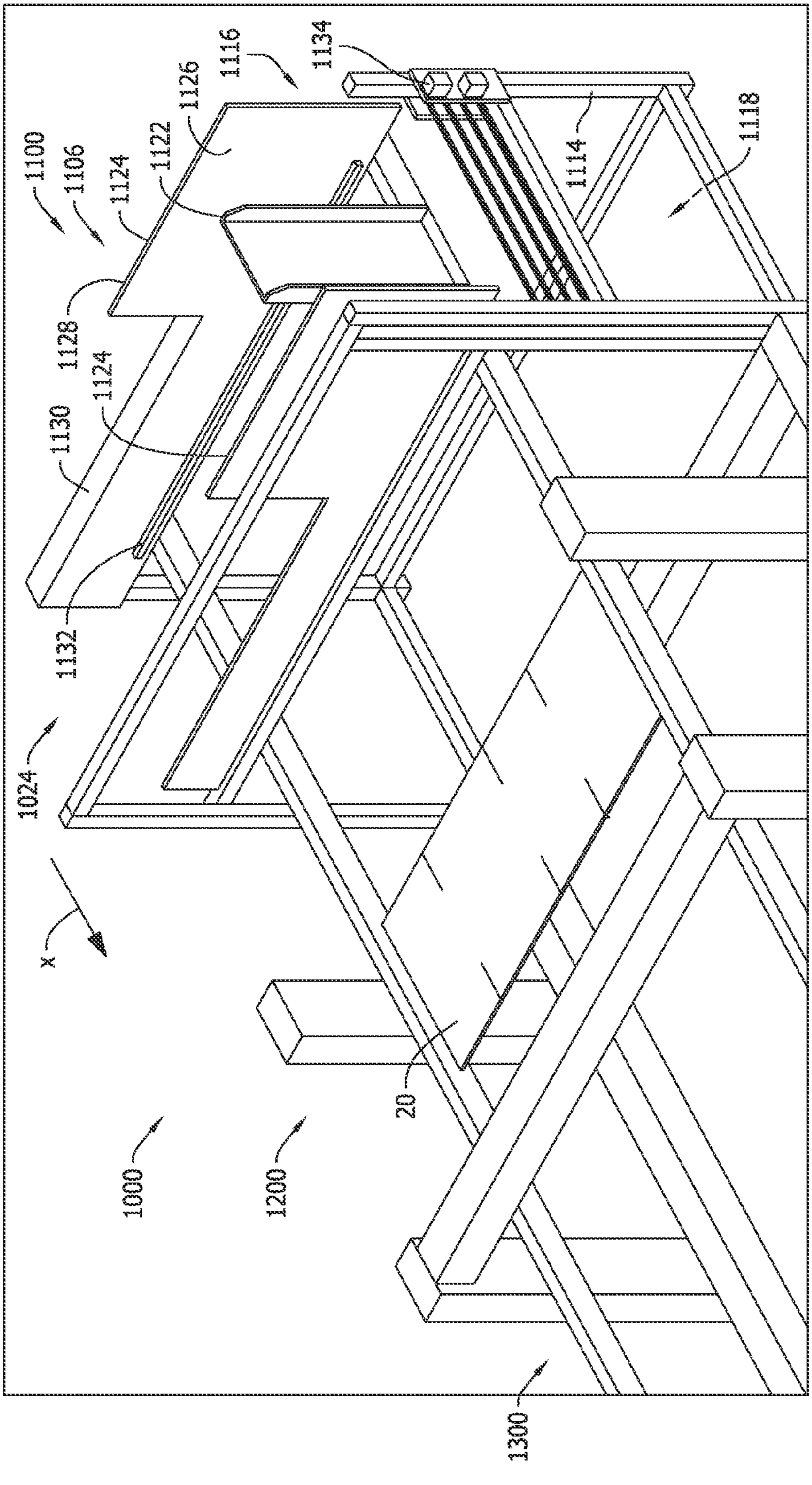
FIG. 9 is a perspective view of an exemplary blank feed section included within the machine shown in FIGS. 5-8.
Figure 10:
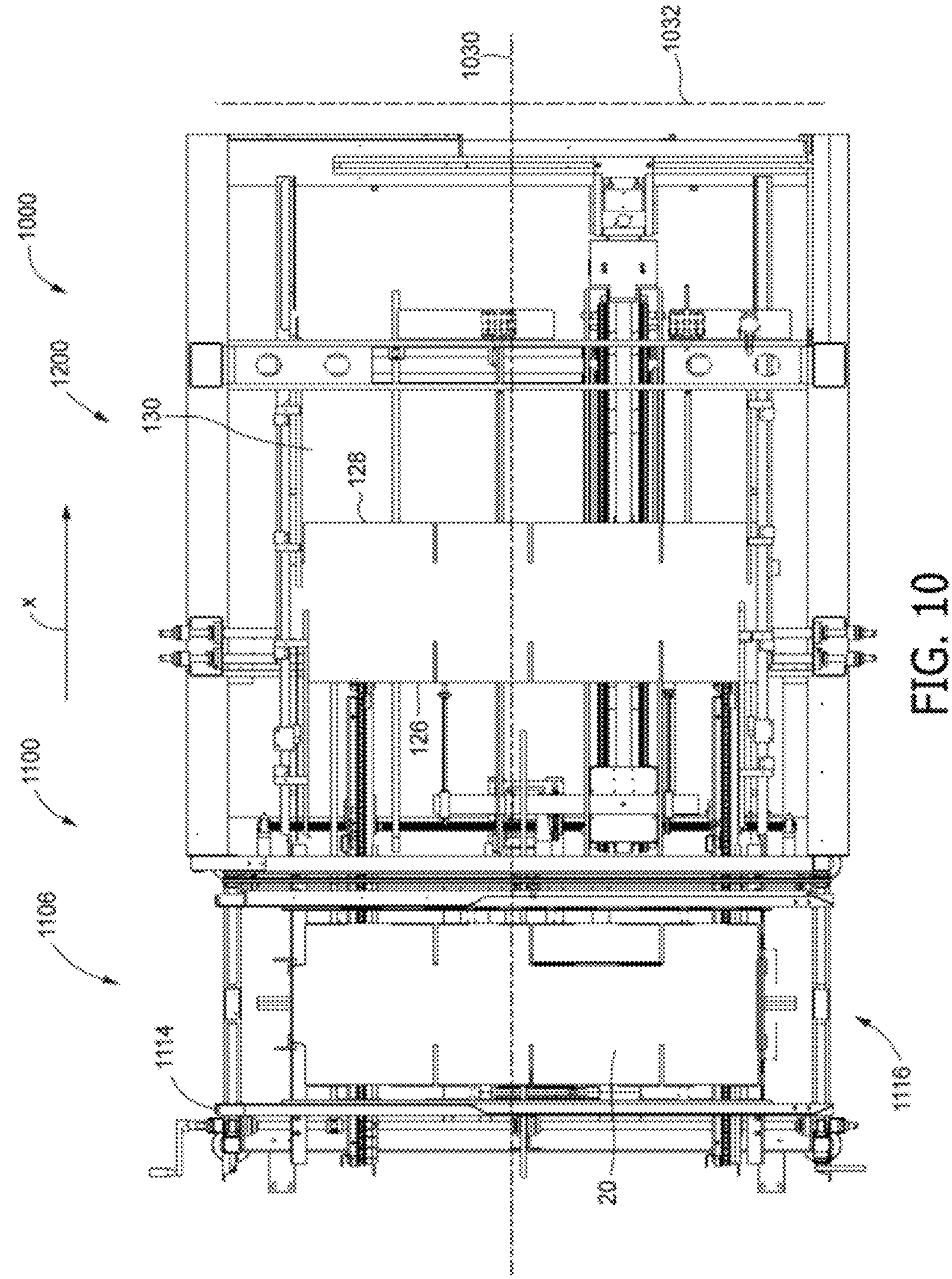
FIG. 10 is a top sectional view of the blank feed section shown in FIG. 9.
Figure 11:
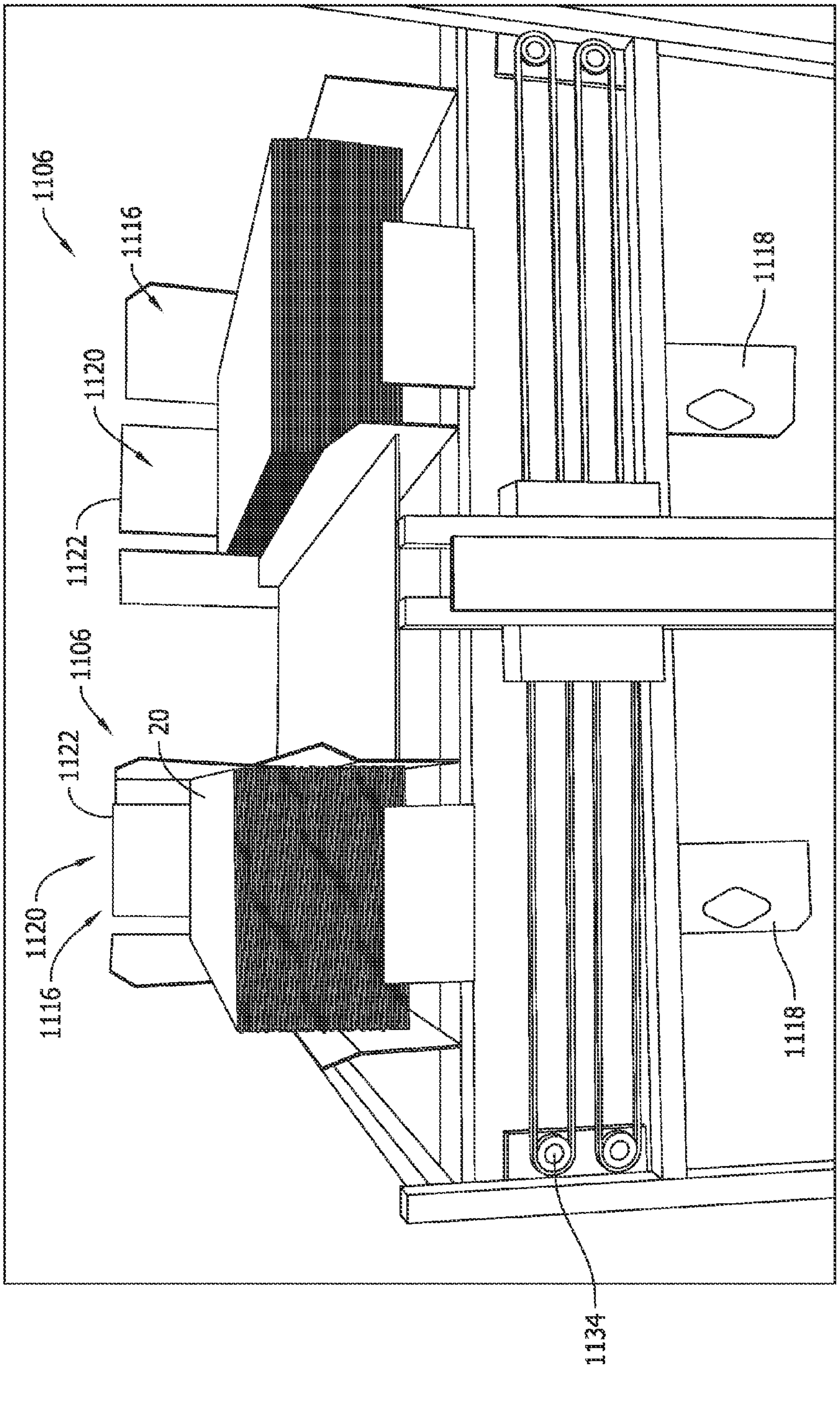
FIG. 11 is a perspective view of an exemplary blank loading assembly that may be used with the blank feed section shown in FIG. 9.
Figure 12:
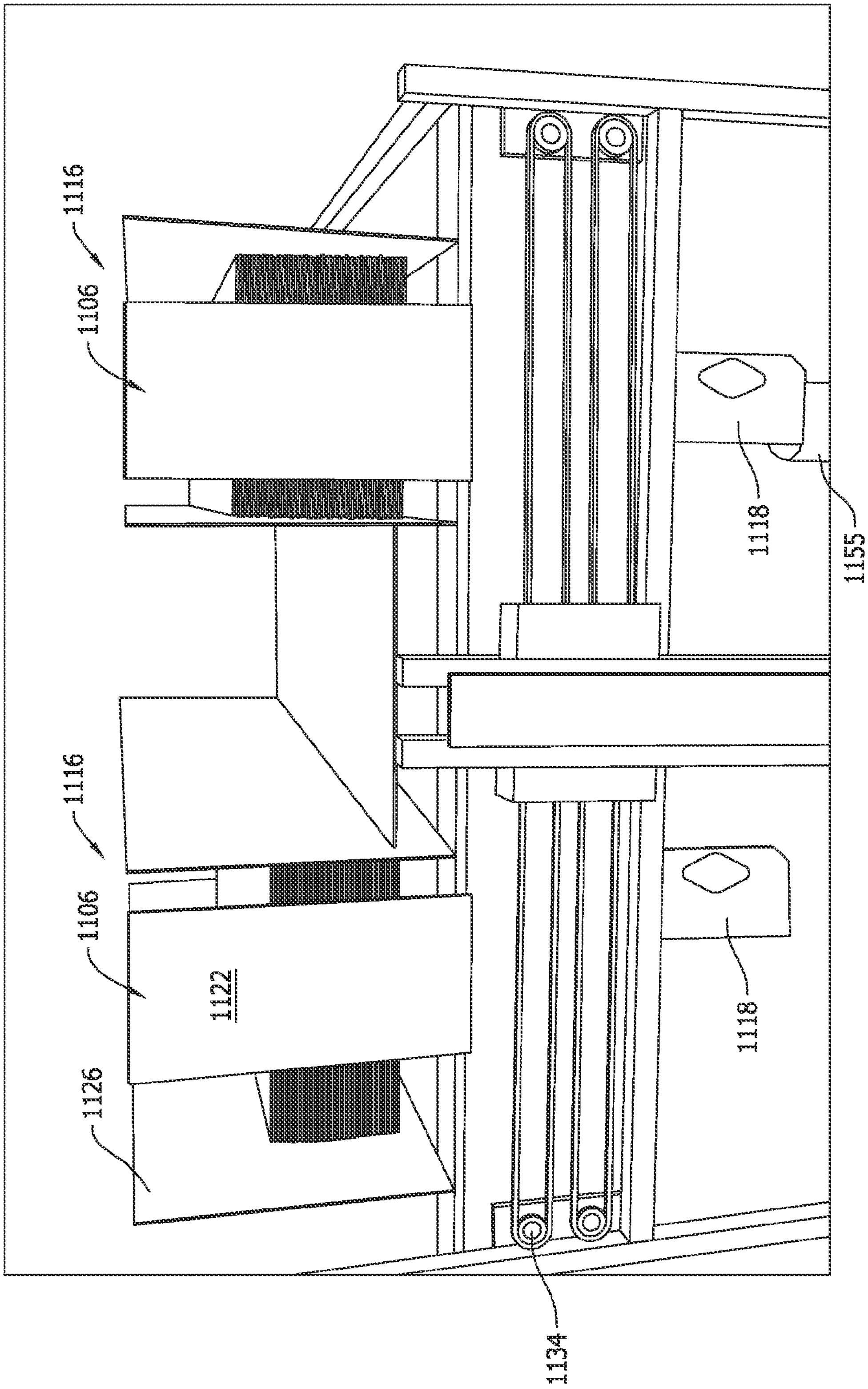
FIG. 12 is an opposite perspective view of the blank loading assembly shown in FIG. 11.
Figure 13:
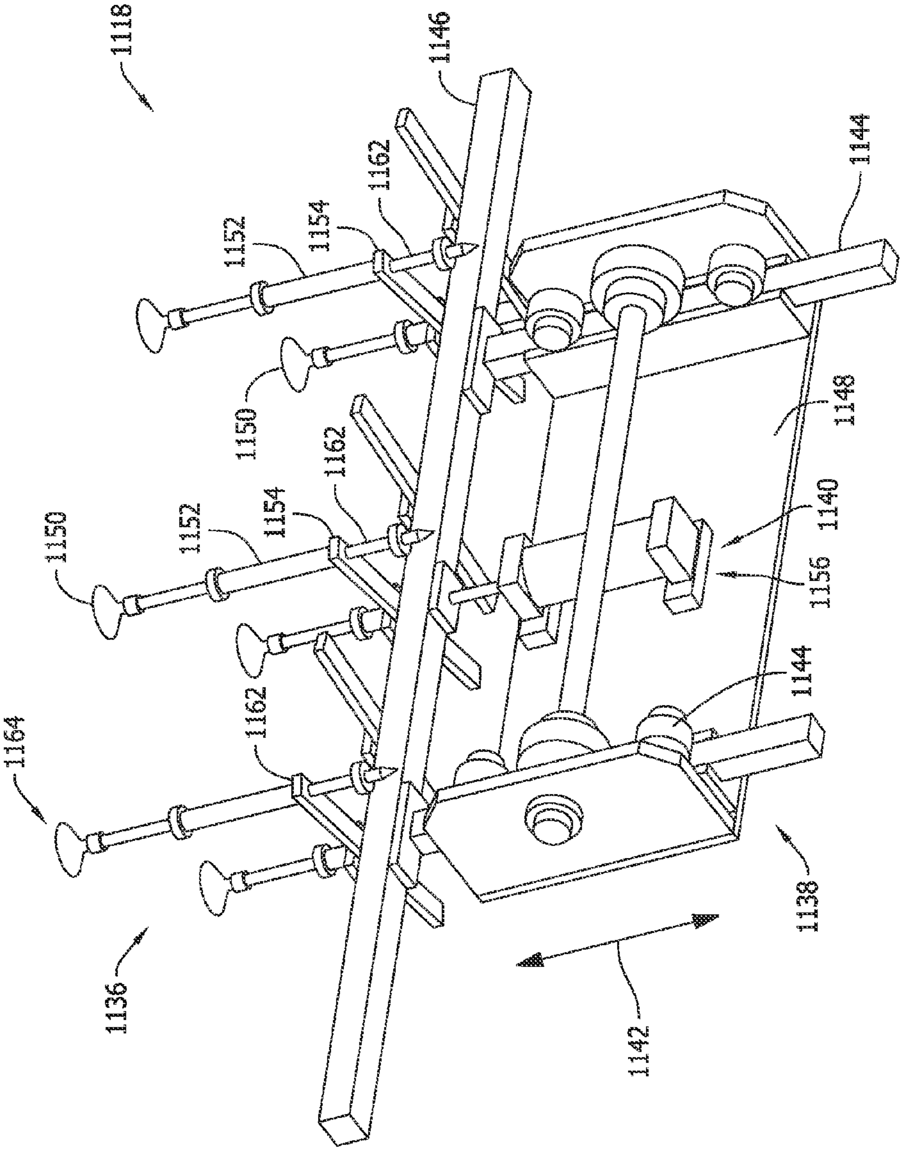
FIG. 13 is a perspective view of a portion of an exemplary vacuum puller assembly that may be used with the blank loading assembly shown in FIG. 11 and FIG. 12.
Figure 14:
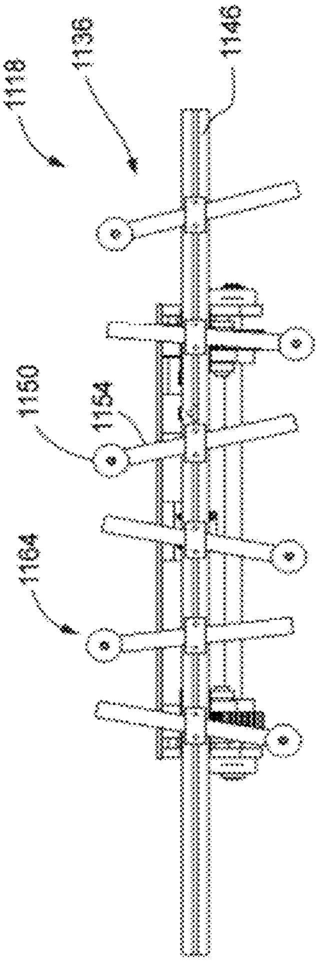
FIG. 14 is a top sectional view of the vacuum puller assembly shown in FIG. 13.
Figure 15:
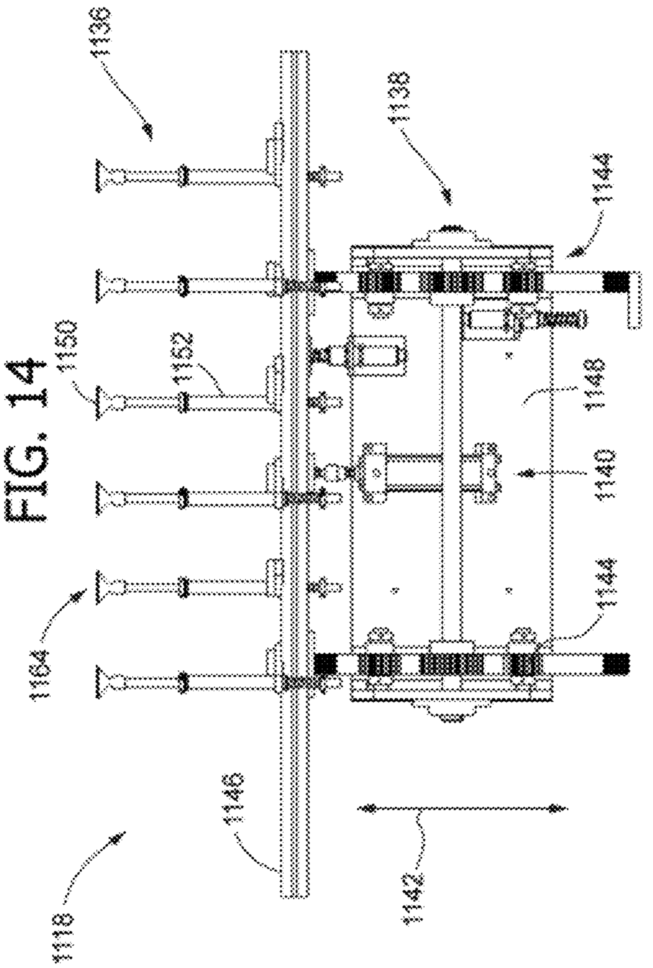
FIG. 15 is a front sectional view of the vacuum puller assembly shown in FIG. 13.
Figure 16:
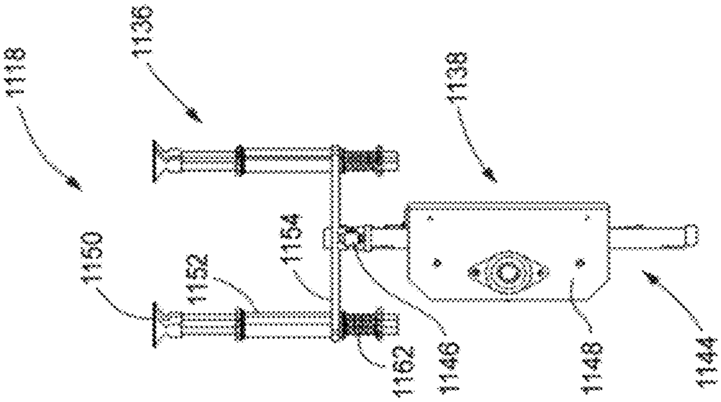
FIG. 16 is a side sectional view of the vacuum puller assembly shown in FIG. 13.

FIG. 5 illustrates a perspective view of an exemplary machine 1000 for forming a container, such as container 200 (shown in FIGS. 2A and 3-4) from a blank of sheet material, such as blank 20 (shown in FIG. 1A), and such as container 205 (shown in FIG. 2B) from a blank of sheet material, such as blank 25 (shown in FIG. 1B). FIG. 6 illustrates a sectional view of machine 1000 shown in FIG. 5 and taken along sectional lines 6-6. FIG. 7 illustrates another perspective view of machine 1000. FIG. 8 is a sectional view of machine 1000 shown in FIG. 7 and taken along sectional lines 8-8. Machine 1000 will be discussed thereafter with reference to forming a corrugated container such as corrugated container 200 from blank 20, however, machine 1000 may be used to form a box or any other container having any size, shape, and/or configuration from a blank having any size, shape, and/or configuration without departing from the scope of the present invention. For example, the 4-sided blank 25 is shown in some of the figures being run on machine 1000.

As shown in FIGS. 5-8, machine 1000 is configurable to form one or more types of container 200. Moreover, machine 1000 is configured to continuously form different types of containers 200 from different types of blanks 20 without having to stop machine 1000 for adjustment or reconfiguration. A type of container 200, as used herein, means a container 200 formed from a blank 20 that may have a different depth $D_1$, a different lid configuration, and/or a different printing on blank outer surface 132. The different types of containers 200, however, do not have a different length $L_1$ or a different number of sides to the containers.

In the exemplary embodiment, machine 1000 extends between a tail end 1020 and a leading end 1022 and is configured to convey a blank 20 from tail end 1020 to leading end 1022 along a sheet loading direction indicated by an arrow X. Machine 1000 includes a frame 1002, a blank delivery system 1024, a container forming system 1026 downstream of blank delivery system 1024 along sheet loading direction X, and a container delivery system 1028 downstream of container forming system 1026. Blank delivery system 1024 is configured to selectively deliver a plurality of blanks 20 having different blank depths $D_1$, different lid configurations, and/or different printing to container forming system 1026. Container forming system 1026 is configured to receive blanks 20 from blank delivery system 1024 and form a plurality of different types of containers 200 having different container depths, different printing on the outside of containers 200, different lid structures and/or, in some cases, no lid structures. A control system 1004 is coupled in operative control communication with components of machine 1000 to enable an operator to program different box forming recipes, or protocols, into control system 1004 to facilitate forming various types of containers, and/or control the output of the formed containers from machine 1000, as described in more detail herein.

Figure 45:
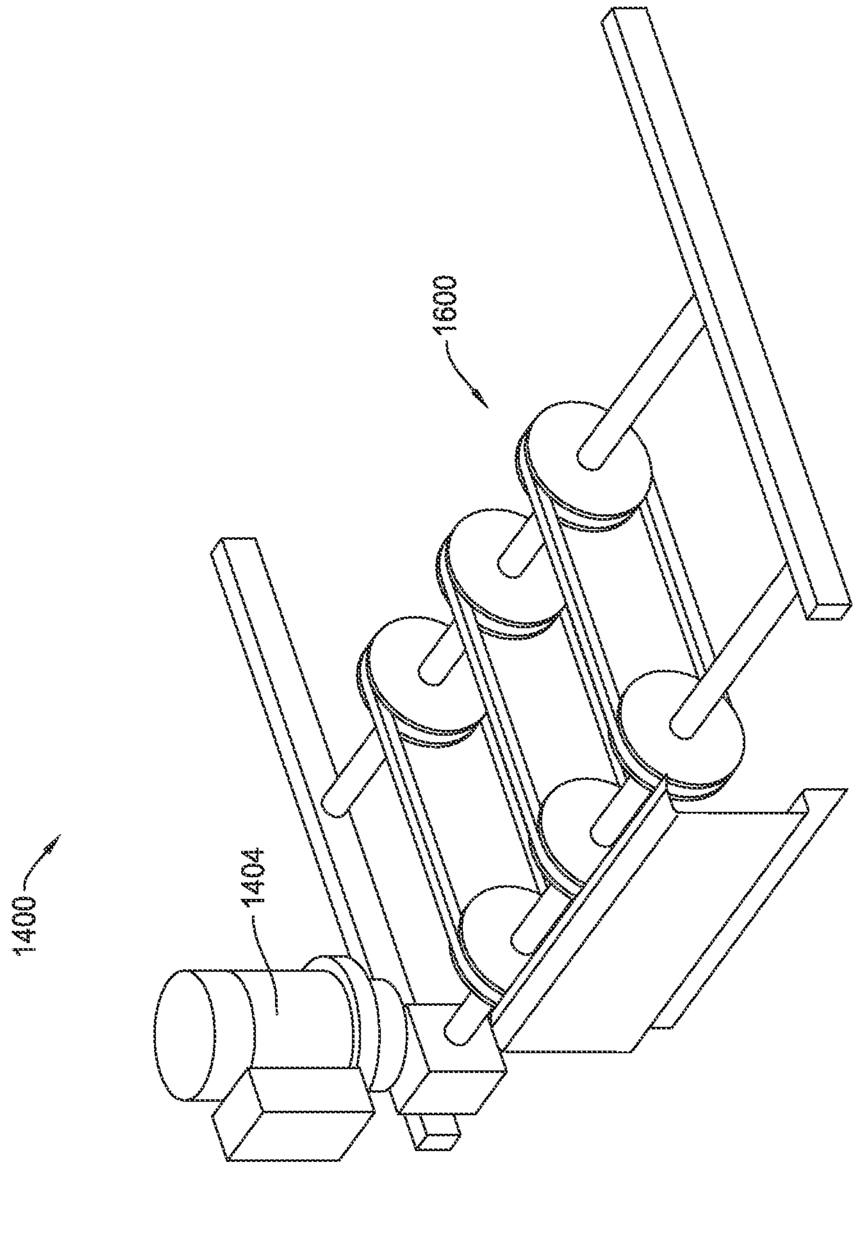
Figure 46:
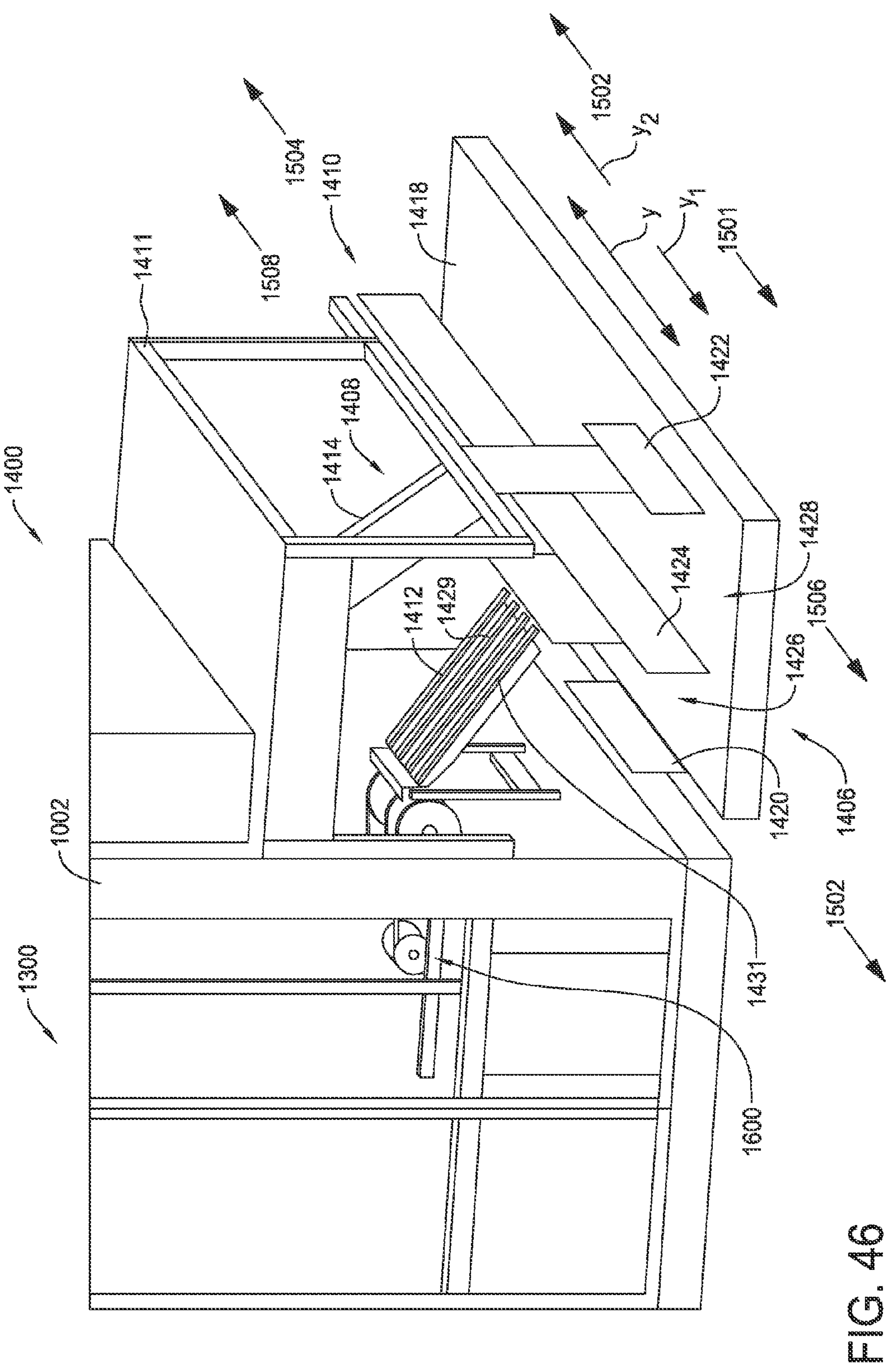
FIG. 46 is a perspective view of an exemplary container diverter assembly that may be used with the outfeed section shown in FIG. 43.
Figure 47:
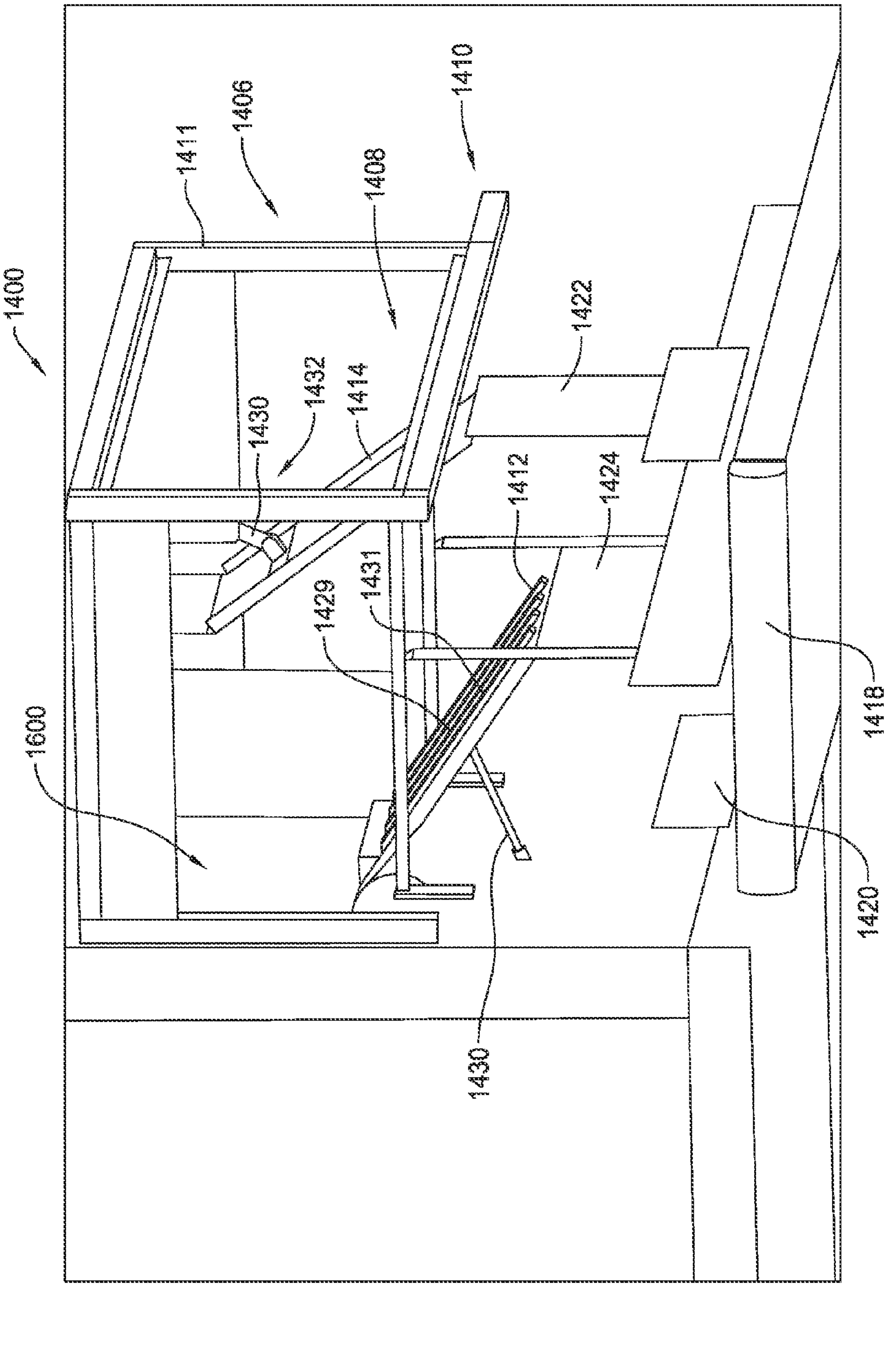
FIG. 47 is another perspective view of the container diverter assembly shown in FIG. 46.
Figure 48:
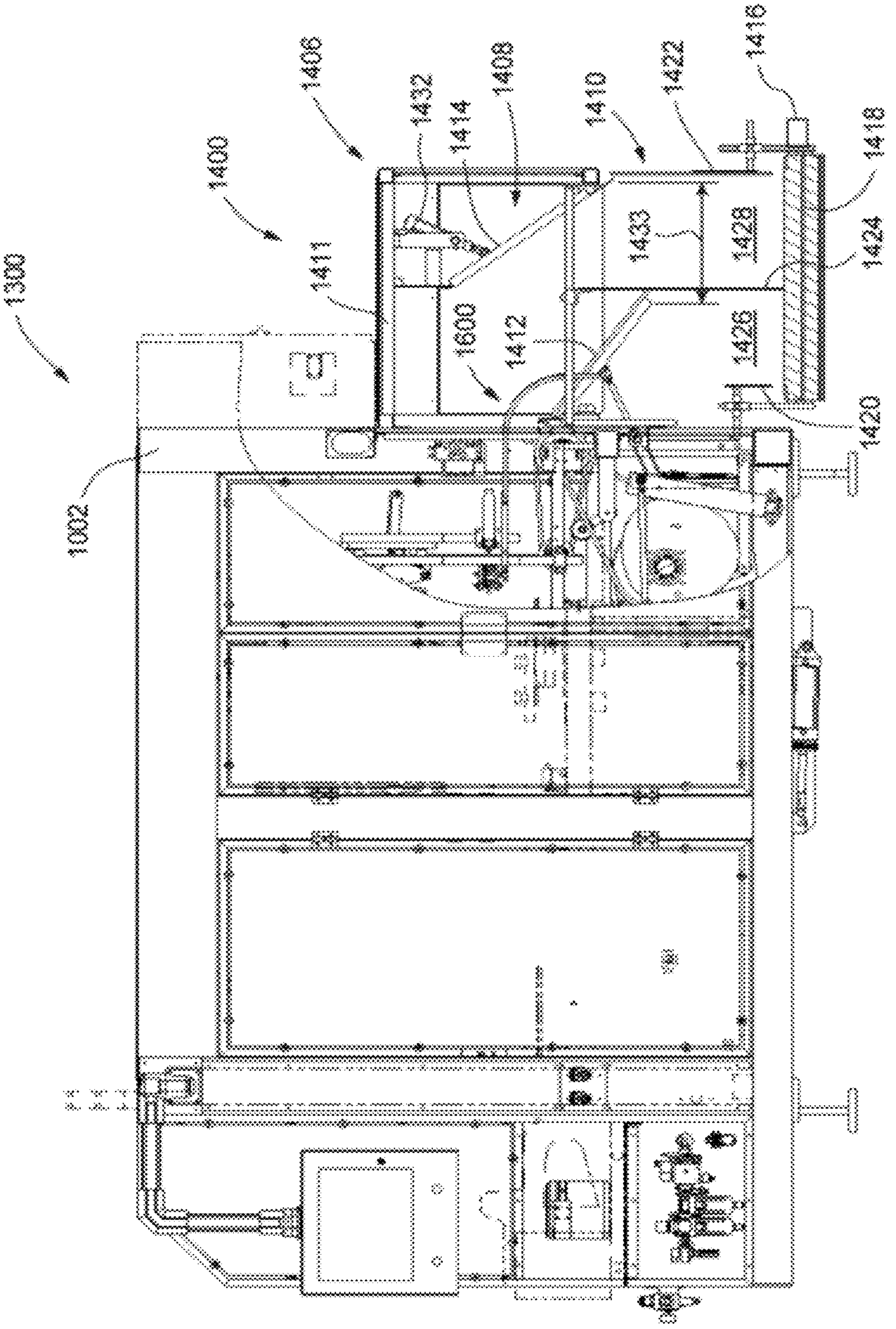
FIG. 48 is a partial cross-sectional view of the container diverter assembly shown in FIG. 46.
Figure 49:
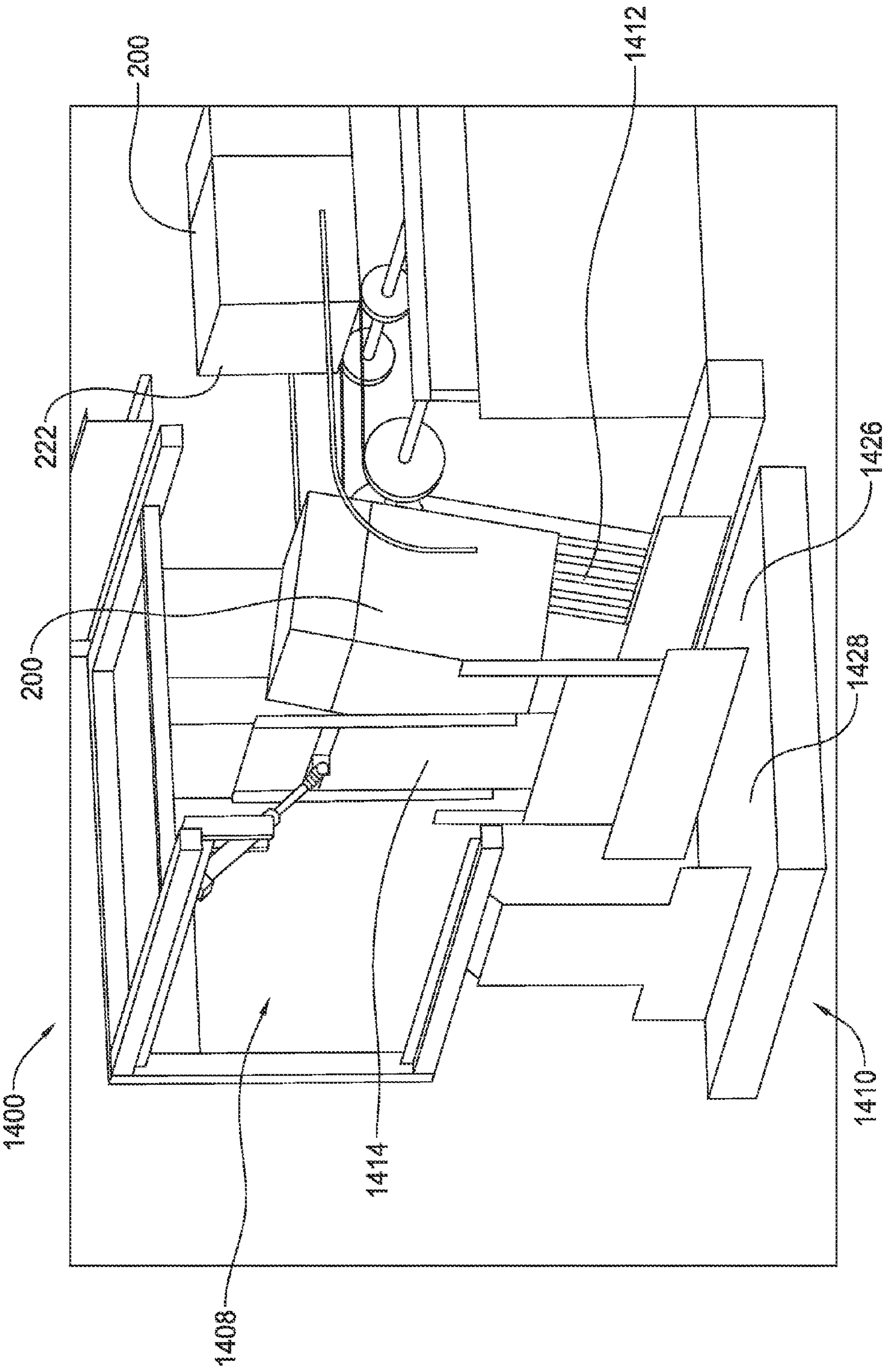
FIGS. 49-50 are perspective views of the container diverter assembly shown in FIG. 46.
Figure 50:
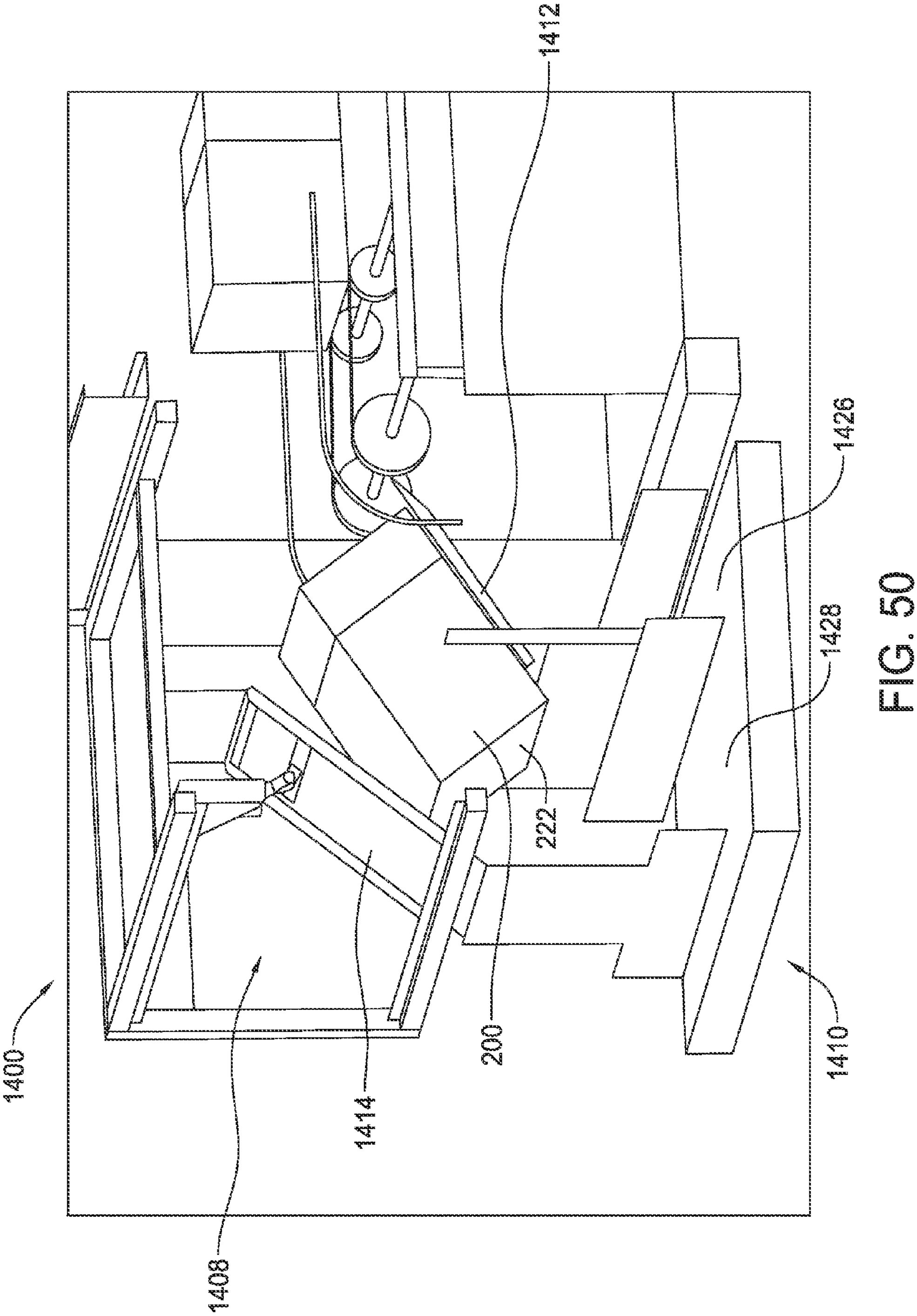

In the exemplary embodiment, blank delivery system 1024 includes a blank feed section 1100 and a transfer section 1200. Container forming system 1026 includes a mandrel wrap section 1300 that is coupled to transfer section 1200. Container delivery system 1028 includes an outfeed section 1400 that is coupled to mandrel wrap section 1300. In addition, machine 1000 includes a product load section 1500 that is positioned with respect to and/or coupled to container delivery system 1028. In the exemplary embodiment, blank feed section 1100 is positioned at tail end 1020 of machine 1000. Transfer section 1200 is positioned between blank feed section 1100 and mandrel wrap section 1300 along sheet loading direction X. Mandrel wrap section 1300 is positioned downstream from transfer section 1200 in sheet loading direction X. Further, outfeed section 1400 is positioned at leading end 1022 and is downstream from mandrel wrap section 1300 in sheet loading direction X. Product load section 1500 is positioned downstream from outfeed section 1400 with respect to a container discharge direction indicated by arrow Y. Product load section 1500 includes a plurality of product loading areas 1501 (shown in FIG. 45) where a product is loaded into a formed container 200, and container 200 is closed and sealed for shipping and/or storing the product. A centerline axis 1030 extends between blank feed section 1100 and outfeed section 1400 and is oriented generally parallel to sheet loading direction X.

In the exemplary embodiment, blank feed section 1100 includes a blank loading assembly 1102 for receiving a plurality of blanks 20, and a blank transfer assembly 1104 for transferring one or more blanks 20 from blank loading assembly 1102 to transfer section 1200. Blank loading assembly 1102 includes one or more blank hoppers 1106 that are coupled in a serial relationship along sheet loading direction X. These blank hoppers 1106 are modular so that more blank hoppers 1106 can be added to machine 1000 or blank hoppers 1106 can be easily removed from machine 1000. Moreover, an additional blank hopper 1106 can be coupled within an existing set of blank hoppers 1106 to increase the number of blank hoppers 1106 included within blank loading assembly 1102. Each blank hopper 1106 is configurable to receive blanks 20 having different blank depths $D_1$, different lid configurations, and different printing to convey a different type of blank 20 to blank transfer assembly 1104.

During operation, machine 1000 is configured to form containers 200 having the same number of sides and having a predefined length $L_1$. Each blank hopper 1106 is sized to convey blanks 20 having the same number of sides and the predefined length $L_1$. In the exemplary embodiment, a first blank hopper 1108 is configured to convey a first type of blanks 20 that includes a first printing, a first lid configuration, and a first depth. A second blank hopper 1110 is configured to convey a second type of blank 20 that may include a second printing, a second lid configuration, and a second depth that are each different than the first printing, the first lid configuration, and the first depth, respectively. During operation, machine 1000 selectively conveys blanks 20 from first blank hopper 1108 and/or second blank hopper 1110 to form multiple different types of containers 200.

FIGS. 9-26 illustrate various portions and perspectives of blank feed section 1100 of machine 1000. In the exemplary embodiment, each blank hopper 1106 includes a frame 1114, a hopper assembly 1116 for receiving a plurality of blanks 20, and a vacuum puller assembly 1118. Vacuum puller assembly 1118 is positioned below hopper assembly 1116 for conveying blank 20 from hopper assembly 1116 to blank transfer assembly 1104.

In the exemplary embodiment, hopper assembly 1116 is supported from frame 1114 above a ground surface, and is configured to receive a plurality of blanks 20 therein. Blanks 20 are orientated within hopper assembly 1116 in any manner that enables operation of machine 1000 as described herein. In the exemplary embodiment, blanks 20 are loaded horizontally into hopper assembly 1116 to form a stack 1120 of blanks 20 within hopper assembly 1116. Blanks 20 are positioned such that leading edge 128 of blank 20 is oriented generally perpendicular to sheet loading direction X. Leading edge 128 of blank 20 is positioned closer to mandrel wrap section 1300 than trailing edge 126 such that depth $D_1$ of blank 20 is defined along centerline axis 1030, and length $L_1$ of blank 20 is defined along a transverse axis 1032 that is perpendicular to centerline axis 1030. Each blank 20 is positioned within hopper assembly 1116 such that blank outer surface 132 is adjacent to inner surface 130 of an adjacent blank 20. Blank outer surface 132 is positioned with respect to vacuum puller assembly 1118 to enable vacuum puller assembly 1118 to contact outer surface 132 to transfer blank 20 from hopper assembly 1116 to blank transfer assembly 1104. Hopper assembly 1116 is modular and can be rotated 180° so that it can be loaded with blanks 20 from either side of machine 1000.

In the exemplary embodiment, hopper assembly 1116 includes a stack alignment plate 1122 that is positioned between two opposing sidewalls 1124. Each sidewall 1124 is oriented along transverse axis 1032 and includes an inner surface 1126 that extends between an upper portion 1128 and a lower portion 1130. Adjacent sidewalls 1124 are axially-spaced along centerline axis 1030 to define a gap that is sized to receive blanks 20 therein. In the exemplary embodiment, each sidewall 1124 includes a loading rail 1132 that extends outwardly from lower portion 1130 of inner surface 1126, and is oriented with respect to transverse axis 1032. Blanks 20 are positioned within hopper assembly 1116 such that blanks 20 are supported from loading rails 1132 along leading edge 128 and along trailing edge 126 and suspended above vacuum puller assembly 1118. Stack alignment plate 1122 is positioned between opposing sidewalls 1124 and is configured to justify and/or align blanks 20 in stack 1120.

In the exemplary embodiment, sidewalls 1124 are coupled to a positioning assembly 1134 for selectively positioning sidewalls 1124 along centerline axis 1030 to adjust the gap between sidewalls 1124. By adjusting the gap, hopper assembly 1116 may be configured to receive blanks 20 having different depths $D_1$. Moreover, stack alignment plate 1122 is also coupled to positioning assembly 1134 for selectively positioning stack alignment plate 1122 along transverse axis 1032 such that hopper assembly 1116 may be configured to received blanks 20 having different lengths $L_1$.

In the exemplary embodiment, vacuum puller assembly 1118 is oriented between sidewalls 1124 such that vacuum puller assembly 1118 may remove a blank 20 from hopper assembly 1116 and transfer blank 20 from hopper assembly 1116 to blank transfer assembly 1104. Blank transfer assembly 1104 is oriented between hopper assembly 1116 and vacuum puller assembly 1118 to convey a blank 20 from vacuum puller assembly 1118 to transfer section 1200 in sheet loading direction X.

As shown in FIGS. 13-16, vacuum puller assembly 1118 includes a plurality of vacuum assemblies 1136 that are coupled to a vacuum support assembly 1138. An actuator 1140 is coupled to vacuum support assembly 1138 for moving vacuum assemblies 1136 in a vertical direction, represented by arrow 1142. Moreover, vacuum puller assembly 1118 is movable between a first position (not shown) wherein vacuum assembly 1136 contacts a blank 20 positioned within hopper assembly 1116, and a second position (not shown) wherein blank 20 is positioned onto blank transfer assembly 1104.

In the exemplary embodiment, vacuum support assembly 1138 includes one or more rack and pinion assemblies 1144 that are coupled to a support bar 1146. Rack and pinion assembly 1144 is also coupled to a frame 1148, and is configured to move support bar 1146 with respect to frame 1148 in vertical direction 1142. Each vacuum assembly 1136 is coupled to support bar 1146 and extends outwardly from support bar 1146 towards hopper assembly 1116. Each vacuum assembly 1136 includes a vacuum suction cup 1150 that is coupled to a piston 1152, and a support arm 1154 that is coupled between piston 1152 and support bar 1146. Suction cups 1150 are coupled to a vacuum system 1155 (shown in FIGS. 6, 8, and 12) that includes independent vacuum generators (not shown) for providing suction to attach suction cups 1150 to individual blanks 20. In an alternative embodiment, suction cups 1150 are attached to a centralized vacuum generator, which provides the vacuum for suction cups 1150 to attach to a blank 20. In the exemplary embodiment, actuator 1140 includes a pneumatic cylinder 1156 that is coupled to an air supply system (not shown). Alternatively, actuator 1140 may include an electric motor, a hydraulic cylinder, or any suitable device that is configured to move a cylinder arm along vertical direction 1142.

In the exemplary embodiment, each piston 1152 extends a vertical length from support bar 1146 such that each vacuum suction cup 1150 is positioned the same distance from outer surface 132 of blanks 20 that are positioned within hopper assembly 1116. In the exemplary embodiment, piston 1152 extends between a first end and a second end. Vacuum suction cup 1150 is coupled to the first end. The second end is coupled to support arm 1154 for supporting piston 1152 from support arm 1154. A compression spring 1162 is coupled between the second end and support arm 1154 to bias vacuum suction cup 1150 away from blank outer surface 132 and towards support arm 1154. Moreover, compression spring 1162 dampens a movement of piston 1152 during operation of vacuum puller assembly 1138. Each vacuum suction cup 1150 includes a bellowed end 1164 that defines a suction cavity that is configured to form a vacuum seal when vacuum suction cup 1150 is placed in contact with blank outer surface 132.

In operation, actuator 1140 operates pneumatic cylinder 1156 to position suction cups 1150 to facilitate pulling a blank 20 from hopper assembly 1116 and transferring blank 20 to blank transfer assembly 1104. Moreover, actuator 1140 bi-directionally positions vacuum support assembly 1138, which in turn bi-directionally positions suction cups 1150. The general motion of vacuum puller assembly 1118 is a movement in a generally vertical direction. During operation, suction cups 1150 engage blank outer surface 132 during an upward motion of vacuum assembly 1136. Actuator 1140 reverses direction of vacuum support assembly 1138 to reverse the movement of suction cups 1150 to a downward motion towards their original position. During the downward movement, suction cups 1150 maintain the suction seal sufficient to pull blank 20 from hopper assembly 1116. Moreover, compression spring 1162 is compressed and loaded during the downward stroke movement. Vacuum puller assembly 1118 removes blank 20 from hopper assembly 1116, and places blank 20 on blank transfer assembly 1104 when the vacuum puller assembly 1118 is near the bottom of its stroke. After placing blank 20 on blank transfer assembly 1104, the vacuum is released from suction cups 1150 and blank 20 is released. Vacuum puller assembly 1118 continues its downward travel as compressing springs 1162 bias pistons 1152 downwardly such that suction cups 1150 are moved away from blank 20 as blank 20 begins its downstream travel, thus reducing wear and tear on suction cups 1150.

Figure 17:
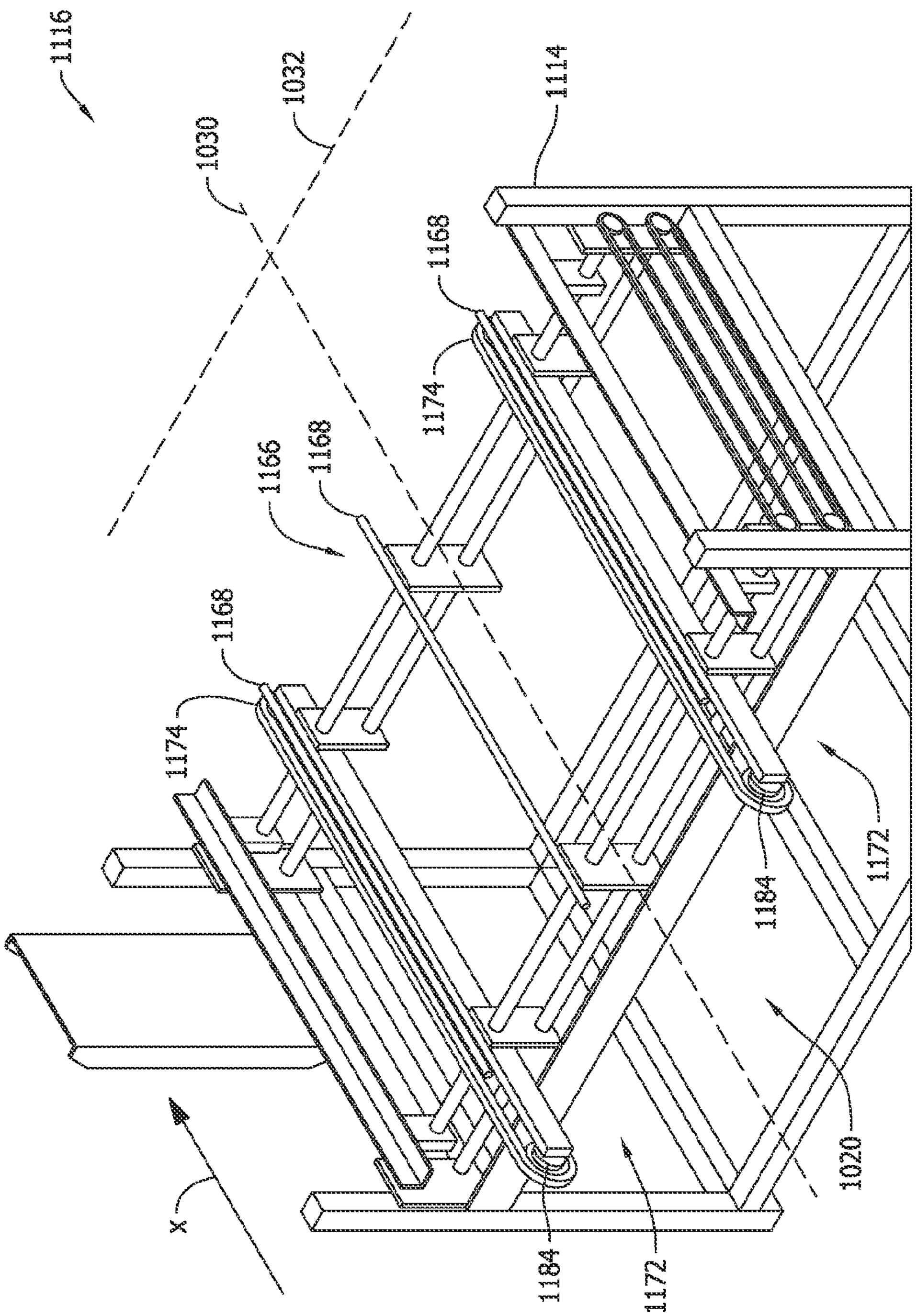
FIG. 17 is a perspective view of a portion of an exemplary blank hopper that may be used with the blank loading assembly shown in FIG. 11 and FIG. 12.
Figure 18:
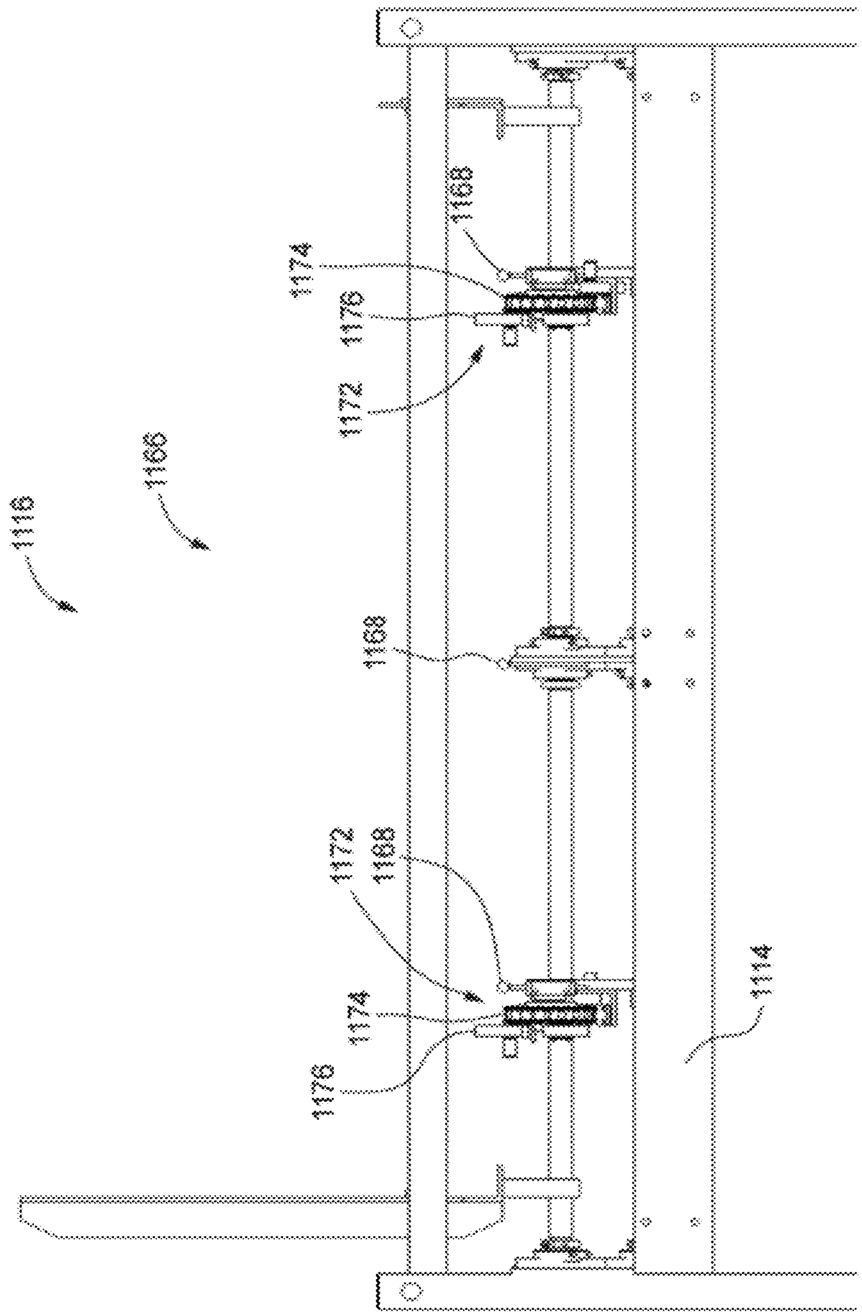
FIG. 18 is a cross-sectional view of the portion of the blank hopper shown in FIG. 17.
Figure 19:
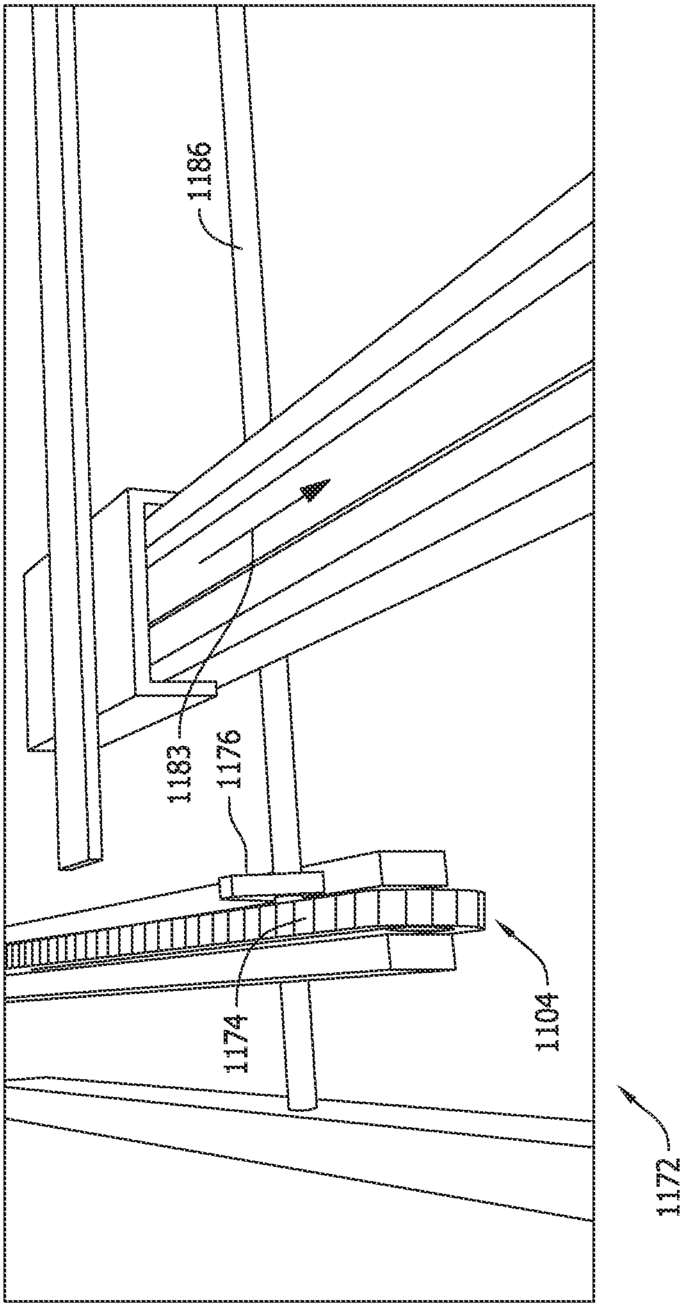
FIG. 19 is a perspective view of a portion of an exemplary blank transfer assembly that may be used with the blank feed section shown in FIG. 9.
Figure 20:
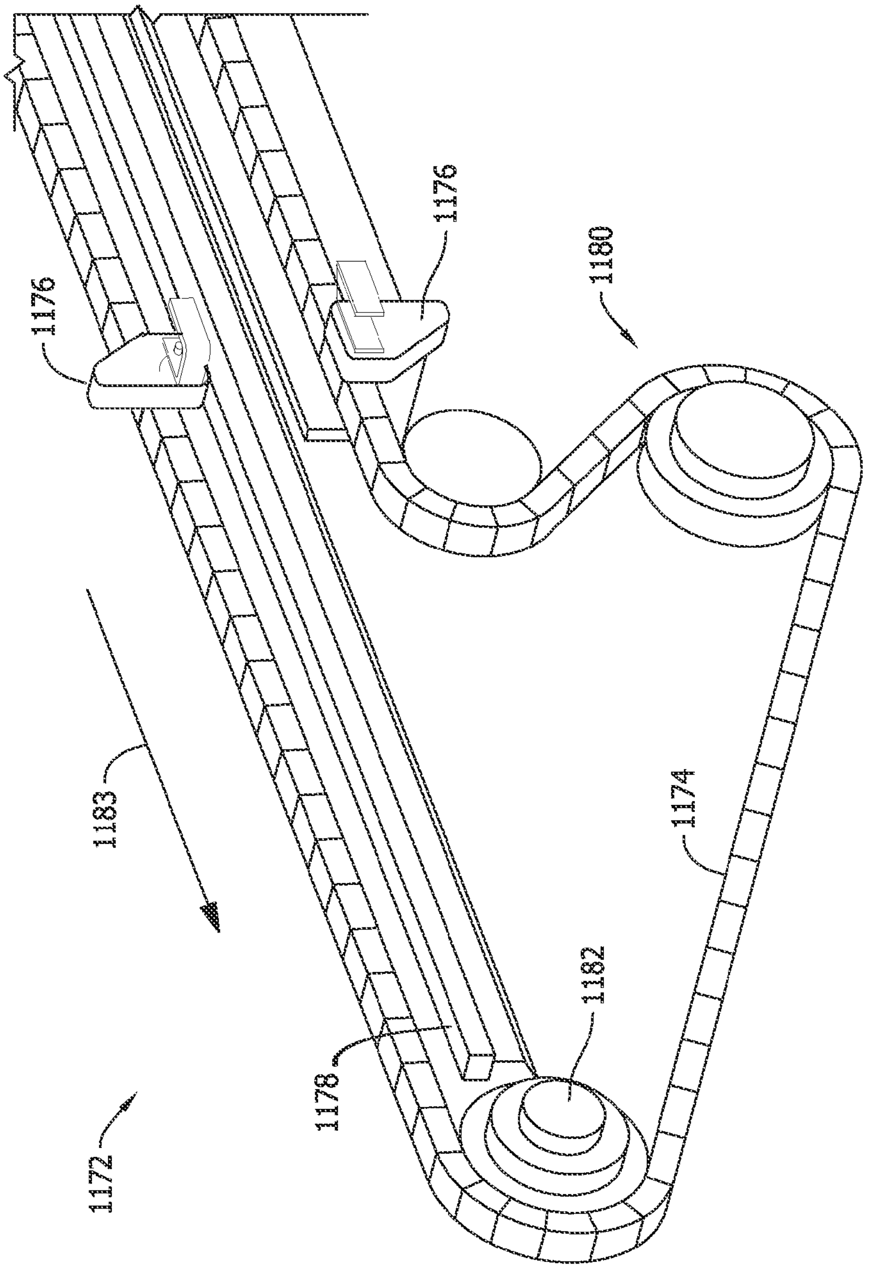
FIG. 20 is another perspective view of the portion of the blank transfer assembly shown in FIG. 19.
Figure 22:
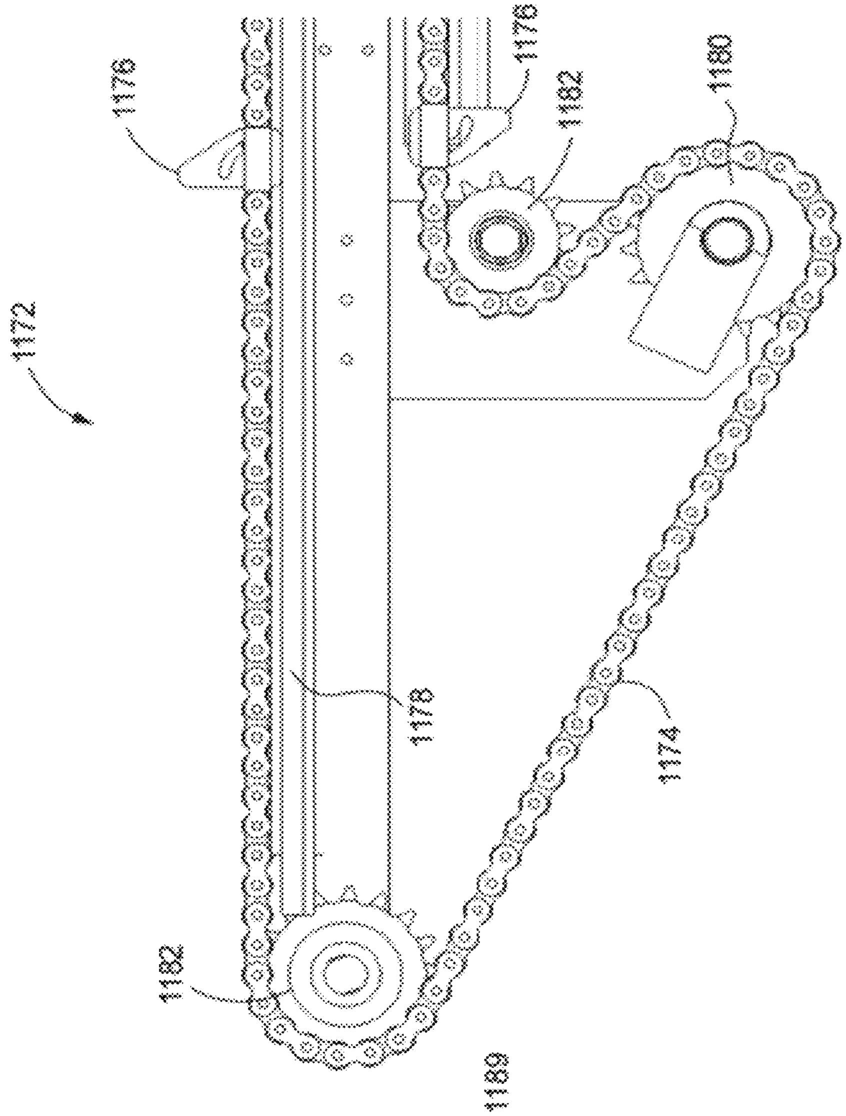
FIG. 22 is a side sectional view of the portion of the blank transfer assembly shown in FIG. 19.
Figure 21:
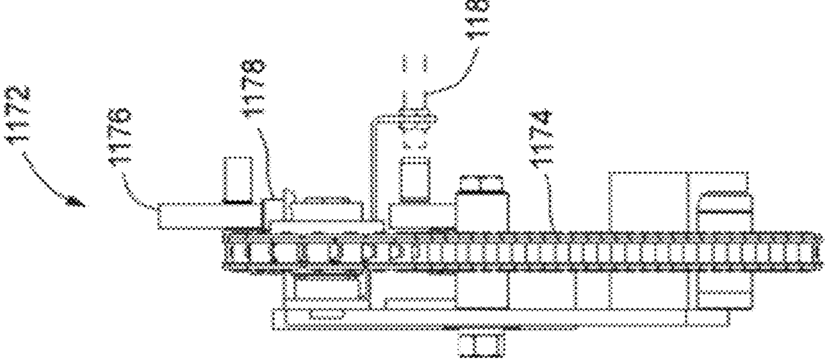
FIG. 21 is a front sectional view of the portion of the blank transfer assembly shown in FIG. 19.
Figure 23:
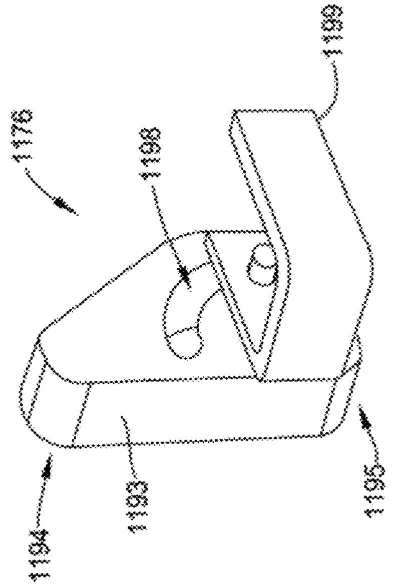
FIG. 23 is a perspective view of an exemplary lug assembly that may be used with the blank transfer assembly shown in FIG. 19.
Figure 24:
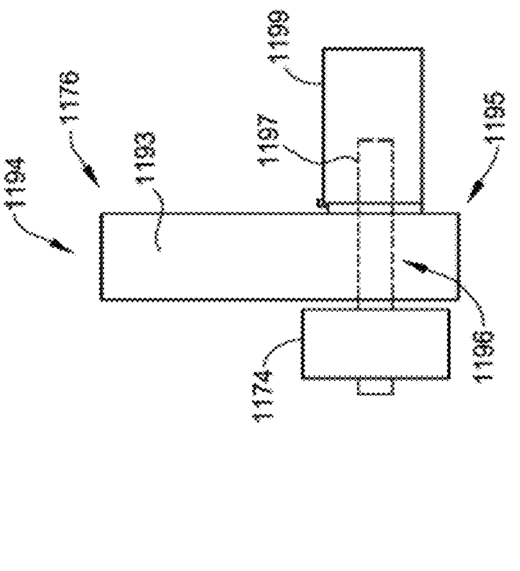
FIGS. 24-26 are sectional views of the lug assembly shown in FIG. 23.
Figure 25:
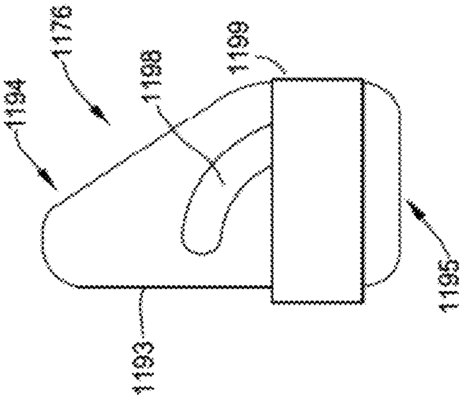
Figure 26:
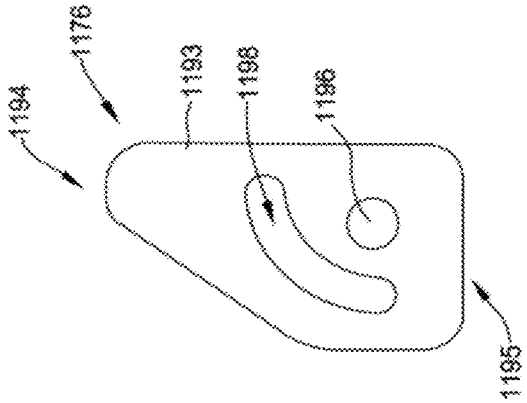
Figure 27:
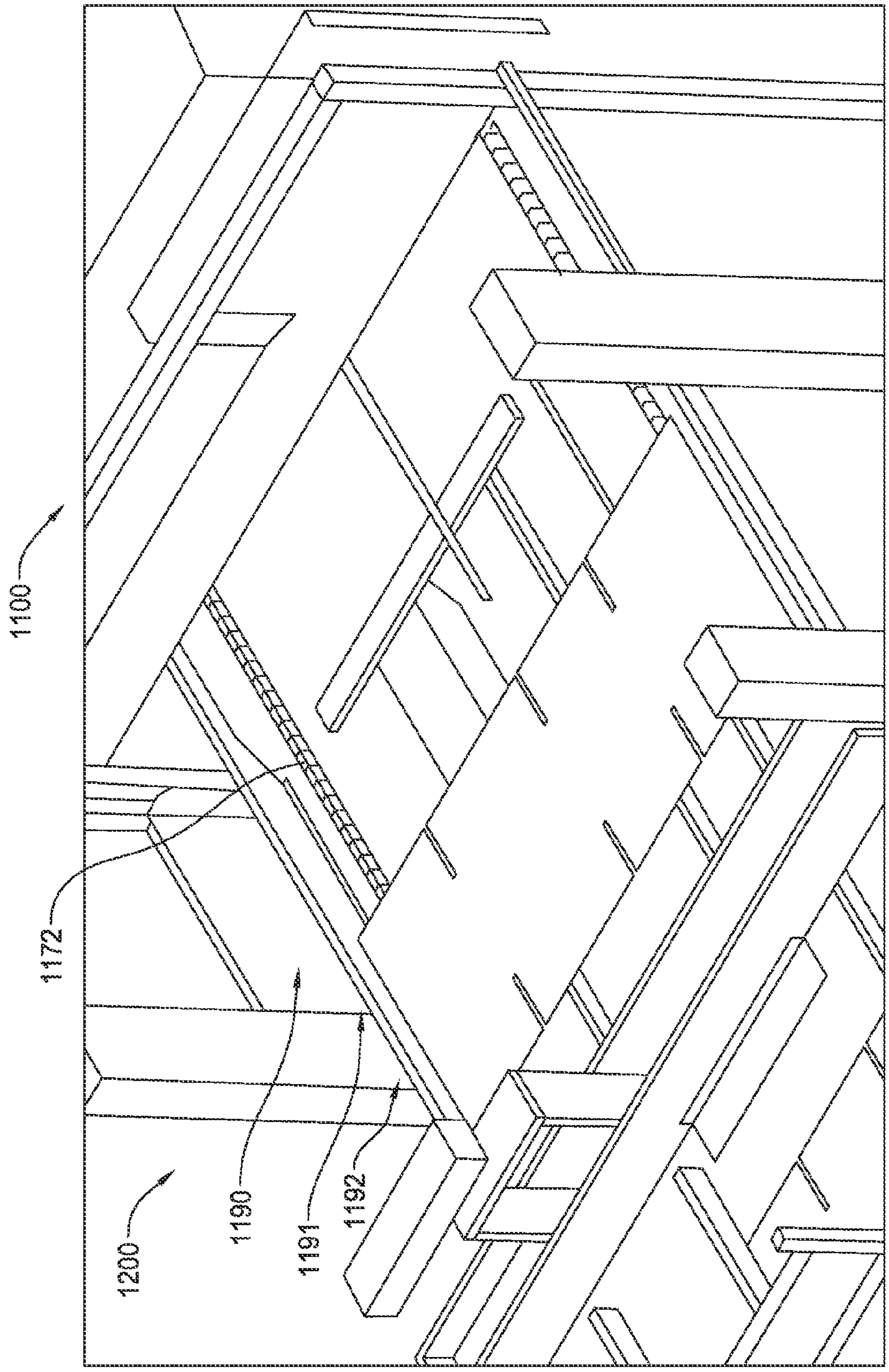
FIG. 27 is a perspective view of an exemplary transfer section included within the machine shown in FIGS. 5-8.

Referring to FIGS. 17 and 18, hopper assembly 1116 also includes a guiderail assembly 1166 that is coupled to frame 1114. Guiderail assembly 1166 includes one or more guiderails 1168 that are oriented with respect to centerline axis 1030 in sheet loading direction X. In the exemplary embodiment, each guiderail 1168 is axially-spaced along transverse axis 1032 such that a gap is defined between each guiderail 1168 and is sized to enable vacuum assembly 1136 to extend through the gap during operation of vacuum puller assembly 1118. Guiderails 1168 are positioned with respect to hopper assembly 1116 such that vacuum puller assembly 1118 transfers blanks 20 from hopper assembly 1116 to guiderail assembly 1166. Each guiderail 1168 is coupled to positioning assembly 1134 to selectively position guiderail 1168 along transverse axis 1032.

A shown in FIGS. 19-26, in the exemplary embodiment, blank transfer assembly 1104 includes one or more lug assemblies 1172 for conveying blank 20 from hopper assembly 1116 to transfer section 1200. Each lug assembly 1172 includes a lug chain 1174, a plurality of transfer lugs 1176 that are coupled to lug chain 1174, a lug rail 1178 that is configured to position lug 1176 with respect to blank 20, a drive sprocket 1180, and one or more support sprockets 1182. Each lug assembly 1172 extends from tail end 1020 of machine 1000 to transfer section 1200 along sheet loading direction X. Moreover, each lug chain 1174 is oriented between hopper assembly 1116 and vacuum puller assembly 1118 to enable vacuum puller assembly 1118 to transfer blank 20 from hopper assembly 1116 to lug assembly 1172. In the exemplary embodiment, each lug chain 1174 extends through blank loading assembly 1102 and defines a blank loading path 1183 from blank loading assembly 1102 to container forming system 1026. Blank loading path 1183 is the path traveled by each blank 20 along sheet loading direction X.

In the exemplary embodiment, lug chain 1174 extends between a tail sprocket 1184 (shown in FIG. 17) that is positioned near tail end 1020, and a drive sprocket that is positioned near transfer section 1200. Drive sprocket 1180 is coupled to lug chain 1174 to move lug chain 1174 along loading path 1183 in sheet loading direction X. Tail sprocket 1184 is coupled to lug chain 1174 for supporting lug chain 1174 from frame 1114 and enables lug chain 1174 to define loading path 1183 traveling between hopper assembly 1116 and vacuum puller assembly 1118. A plurality of support sprockets 1182 are coupled to frame 1114 to support lug chain 1174 from frame 1114 along loading path 1183. Tail sprocket 1184 includes a splined opening that is configured to receive a splined support shaft therethrough. Drive sprocket 1180 includes a splined opening that is configured to receive a splined drive shaft 1186 therethrough. Drive shaft 1186 extends between two or more lug assemblies 1172 such that each drive sprocket 1180 is rotated at the same speed, and each lug chain 1174 is moved along the predefined path at the same speed. A variable speed motor is operatively coupled to a drive shaft belt that is, in turn, operatively coupled to drive shaft 1186. Drive shaft 1186 is supported and aligned by at least one drive sprocket 1180. The splined shafts and sprockets allow lug chains 1174 to move along transverse axis 1032 to accommodate blanks having different lengths $L_1$.

In the exemplary embodiment, blank transfer assembly 1104 includes a pair 1187 (shown in FIG. 28) of lug assemblies 1172 on opposite sides of machine 1000. Each lug assembly 1172 is driven by a single motor that is coupled to each drive sprocket 1180 and to each tail sprocket 1184. Each lug chain 1174 includes a series of lugs 1176 that are spaced apart along lug chain 1174 wherein lugs 1176 on the first lug chain 1174 are aligned with lugs 1176 on the second lug chain 1174 to form a pair 1188 (shown in FIG. 28) of transfer lugs 1176. Thus, the two lug chains 1174 have a series of spaced apart pairs 1188 of transfer lugs 1176 for pushing or transferring a blank 20 placed near the lug chains 1174. The lugs 1176 push blank 20 along guiderails 1168 to the transfer section 1200.

In the exemplary embodiment, each lug 1176 is pivotably coupled to lug chain 1174. Lug rail 1178 is positioned adjacent to lug chain 1174 such that lug 1176 moves along lug rail 1178 through at least a portion of loading path 1183. Lug rail 1178 is also positioned with respect to lug chain 1174 such that a portion of lug 1176 extends above lug chain 1174, and above guiderails 1168 (shown in FIG. 18), as lug 1176 travels through hopper assembly 1116 along loading path 1183 in sheet loading direction X. In the exemplary embodiment, lug rail 1178 extends from tail end 1020, through hopper assembly 1116, and into a portion of transfer section 1200 to enable lug 1176 move blank 20 from hopper assembly 1116 to transfer section 1200. A guiderail assembly 1190 (shown in FIG. 27) is positioned with respect to lug assembly 1172 to receive free edges 56 and 58 of blank 20 as blank 20 is conveyed from blank hopper 1106 to transfer section 1200. A pair of guiderail assemblies 1190 are on opposite sides of machine 1000. Guiderail assembly 1190 includes an upper rail 1191 and a lower rail 1192 that is spaced vertically below upper rail 1191 to define a slot (not shown) that is sized to receive blank free edges 56 and 58 therein. Upper rail 1191 is configured to contact blank inner surface 130 and lower rail 1192 is configured to contact blank outer surface 132 to prevent blank 20 from moving in a vertical direction as blank 20 is conveyed from blank hopper 1106 to transfer section 1200.

Referring to FIGS. 23-26, in the exemplary embodiment, lug 1176 includes a pushing surface 1193 that extends between an upper portion 1194 and a lower portion 1195. An opening 1196 is defined within lug 1176 and is sized and shaped to received a pin 1197 therethrough. Pin 1197 is inserted though opening 1196 and through lug chain 1174 such that lug 1176 is pivotably coupled to lug chain 1174. In the exemplary embodiment, a positioning slot 1198 extends through lug 1176 and is configured to enable lug 1176 to pivot about pin 1197 through a limited angle of rotation, and to rotate with respect to lug chain 1174. Positioning slot 1198 is configured to enable lug 1176 to move with respect to positioning pin 1197. A position indicator member 1199 is coupled to lug chain 1174 with pin 1197 such that lug 1176 is positioned between lug chain 1174 and position member 1199. Position member 1199 is oriented substantially parallel to lug chain 1174 and is coupled to pin 1197 such that lug 1174 is rotatable with respect to position member 1199. At least a portion of position member 1199 is insertable into positioning slot 1198 to limit a rotation of lug 1176 about pin 1197. In the exemplary embodiment, a position sensor 1189 is coupled to lug assembly 1172 and is configured to sense a position of each lug 1176 along loading path 1183. In one embodiment, position sensor 1189 includes a magnetic sensor that is positioned adjacent lug chain 1174 for sensing position indicator member 1199 as lug 1176 is moved past position sensor 1189.

During operation of lug assembly 1172, as lug 1176 is moved towards an end portion of lug rail 1178, the orientation of position member 1199 within positioning slot 1198 prevents upper portion 1194 from rotating towards blank 20. As lug 1176 travels off the end portion of lug rail 1178, lug 1176 rotates away from blank 20 to prevent lug upper portion 1194 from contacting blank 20 and pinching blank 20 against guiderail assembly 1190. Moreover, slot 1198 is sized and shaped to enable upper portion 1194 of lug 1176 to rotate away from blank 20 as lug 1176 is moved downstream of lug rail 1178. By preventing upper portion 1194 from rotating towards blank 20, upper portion 1194 is prevented from contacting and/or pinching trailing edge 126 of blank 20 that may cause damage to blank 20.

During operation of blank feed section 1100, vacuum puller assembly 1118 operates in synchronization with blank transfer assembly 1104 to move blanks 20 from hopper assembly 1116 to blank transfer assembly 1104. In the exemplary embodiment, vacuum puller assembly 1118 transfers blank 20 from hopper assembly 1116 to guiderails 1168. Lug chain 1174 moves lug 1176 along lug rail 1178 such that pushing surface 1193 of lug 1176 contacts trailing edge 126 of blank 20 and conveys blank 20 from blank feed section 1100 to transfer section 1200. In other words, control system 1004 knows the location of the pairs of transfer lugs 1176, and knows when to pull blank 20 from hopper assembly 1116 and place blank 20 near lug chain 1174 such that blank 20 is not placed on top of a pair of transfer lugs 1176. Rather, blank 20 is strategically placed just downstream to a pair of lugs 1176 such that lugs 1176 do not interfere with blank 20, but rather, begin to push blank 20 as it is placed on guiderails 1168.

FIGS. 27-32 illustrate various portions and perspectives of transfer section 1200 of machine 1000. In the exemplary embodiment, transfer section 1200 includes a pusher assembly 1206 that is configured to convey blank 20 from blank feed section 1100 to mandrel wrap section 1300 in sheet loading direction X. In the exemplary embodiment, pusher assembly 1206 is at least partially positioned within the gap and is oriented between lug assemblies 1172 to enable pusher assembly 1206 to convey blank 20 from lug assembly 1172 to mandrel wrap section 1300.

Figure 30:
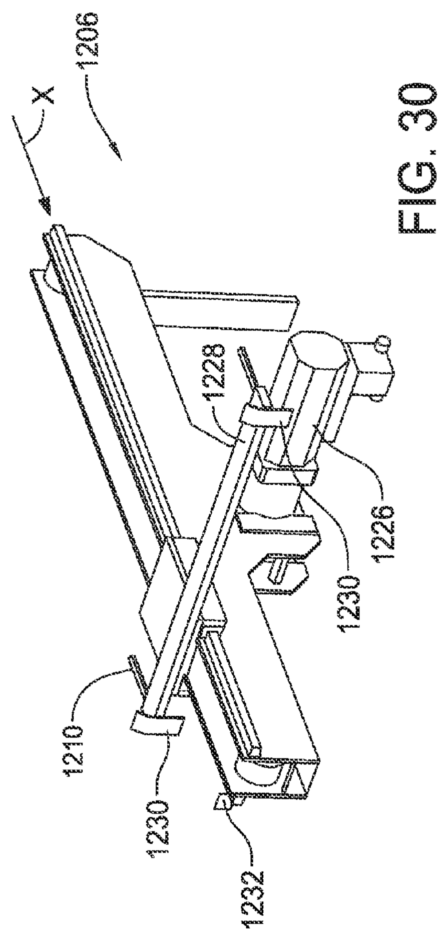
FIGS. 29-30 are perspective views of the pusher assembly shown in FIG. 28.
Figure 29:
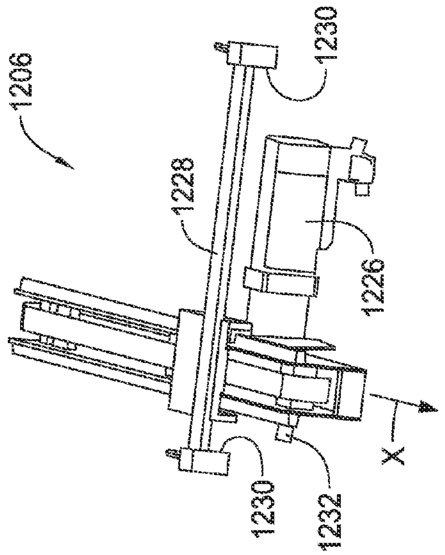

As shown in FIGS. 29-30, pusher assembly 1206 includes a pusher servomechanism 1226 operatively coupled to a pusher bar 1228. Pusher assembly 1206 further includes one or more pusher rods 1210 that extend outwardly from pusher bar 1228. A pusher foot 1230 is pivotably coupled to each pusher rod 1210. At least one sensor 1232, such as a photo eye, is positioned adjacent pusher assembly 1206, and more particularly, adjacent pusher assembly 1206, to determine at least a size of blank 20, as described in more detail below. Pusher assembly 1206 operates in synchronization with blank transfer assembly 1104 to move blanks 20 from blank transfer assembly 1104 to mandrel wrap section 1300. More specifically, pusher servomechanism 1226 drives pusher bar 1228 in a direction parallel to direction X, and pusher feet 1230 contact trailing edge 126 of blank 20 and push blank 20 toward mandrel wrap section 1300. Servomechanism 1226 then reverses direction and moves pusher bar 1228 in a direction opposite to direction X to pick up the next blank 20 from blank transfer assembly 1104.

Figure 28:
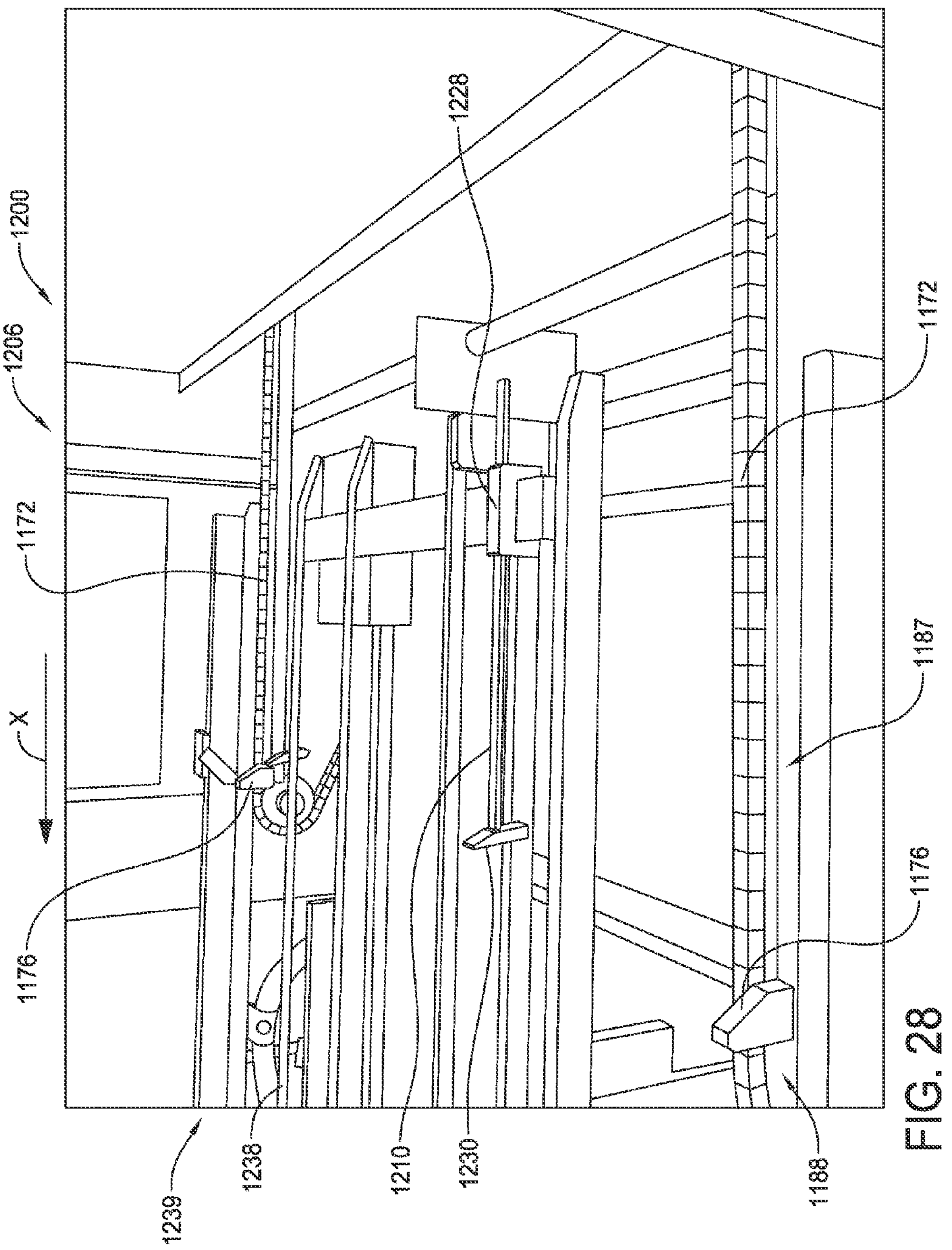
FIG. 28 is a perspective view of a portion of an exemplary pusher assembly that may be used with the transfer section shown in FIG. 27.

In the exemplary embodiment, pusher assembly 1206 is movable between a first position, i.e. a pick-up position, shown in FIG. 28, and a second position, i.e. a transfer position, not shown. In the pick-up position, pusher assembly 1206 is positioned between lug assemblies 1172 such that pusher feet 1230 are positioned adjacent trailing edge 126 of blank 20. In addition, in the pick-up position, a leading portion of lug assembly 1172 is positioned closer to mandrel wrap section 1300 than pusher feet 1230 to enable lug assembly 1172 to move trailing edge 126 of blank 20 downstream of pusher feet 1230. As pusher assembly 1206 moves from the pick-up position to the transfer position, pusher assembly 1206 conveys blank 20 along a plurality of guiderails 1238 in sheet loading direction X.

Figure 32:
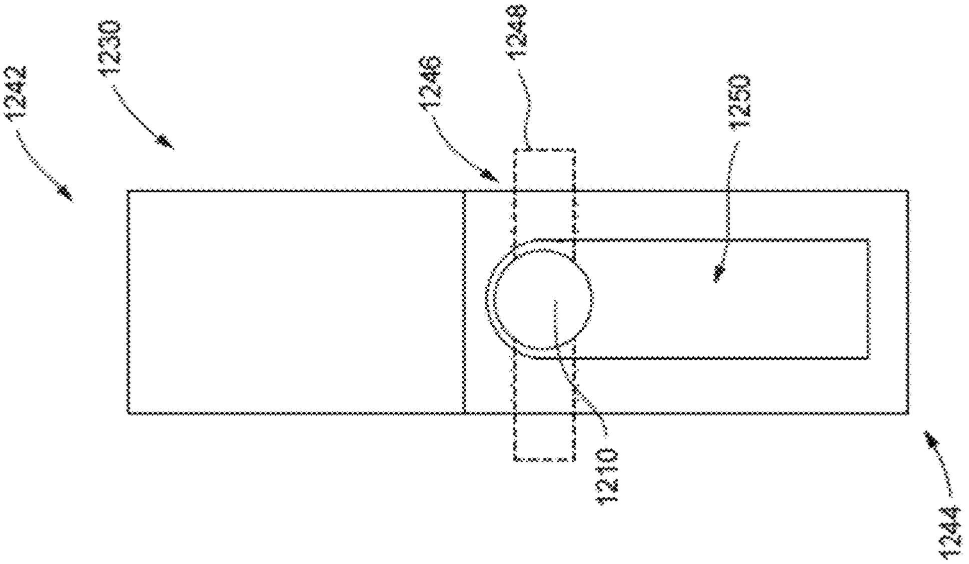
FIGS. 31-32 are sectional views of an exemplary pusher foot that may be used with the pusher assembly shown in FIG. 28.
Figure 31:
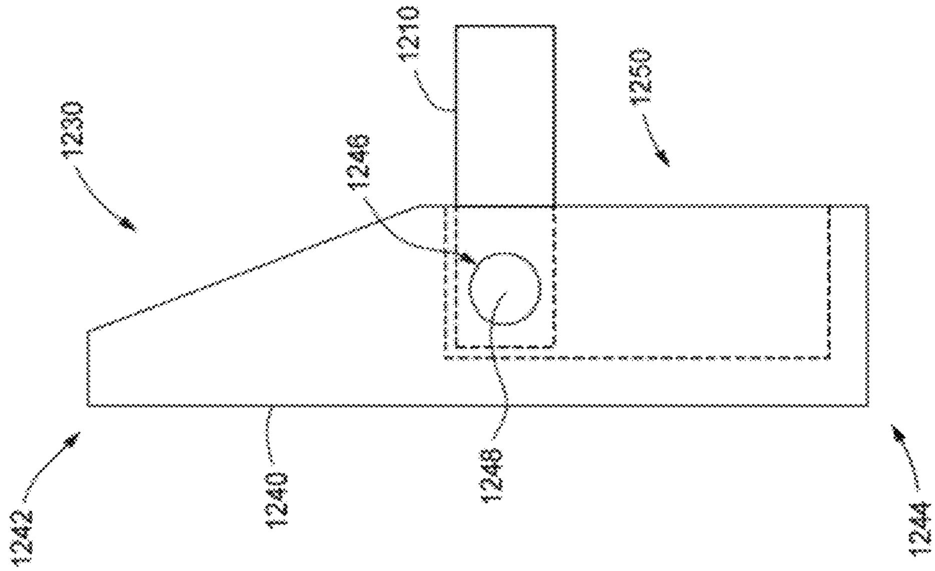
Figure 33:
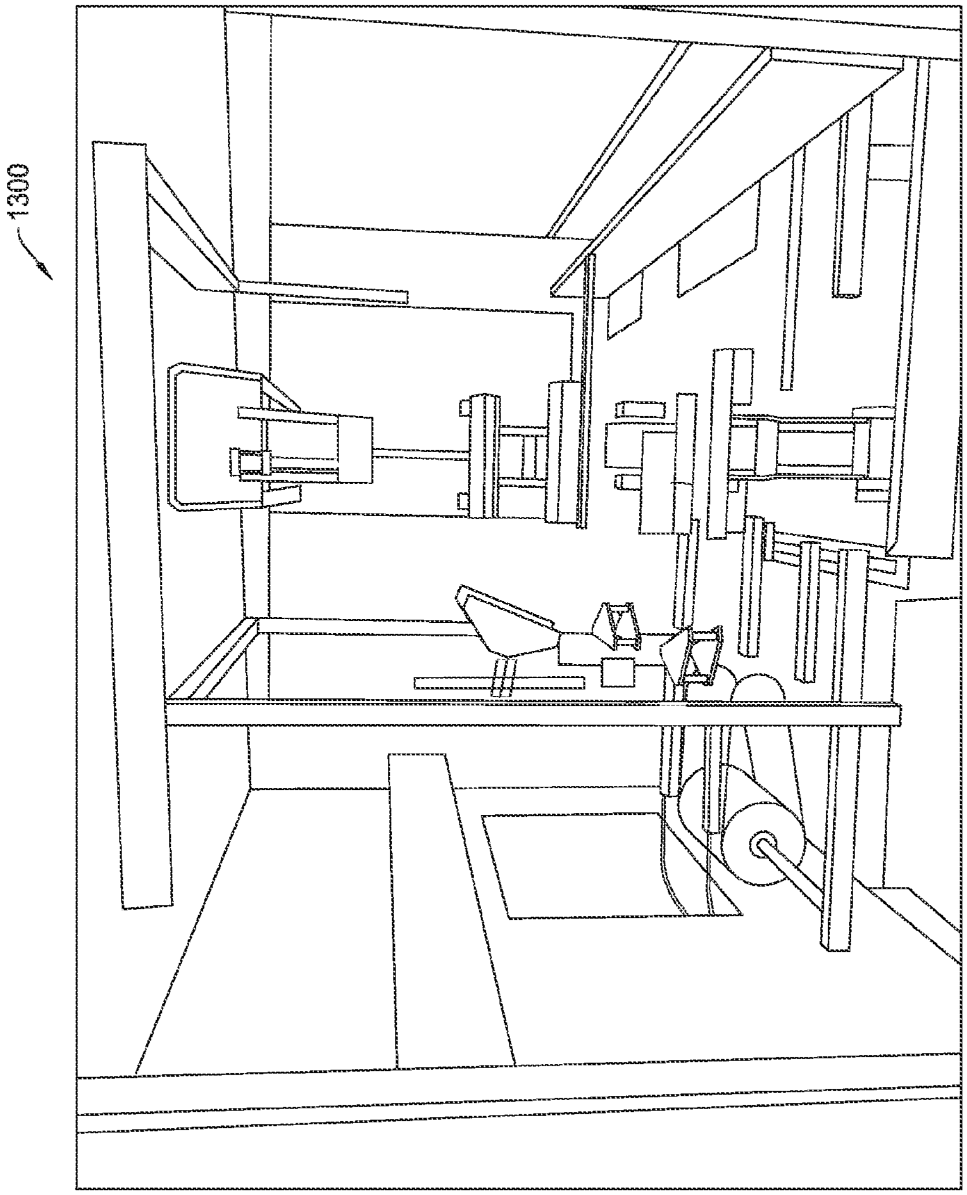
FIG. 33 is a perspective view of an exemplary mandrel wrap section included within the machine shown in FIGS. 5-8.
Figure 34:
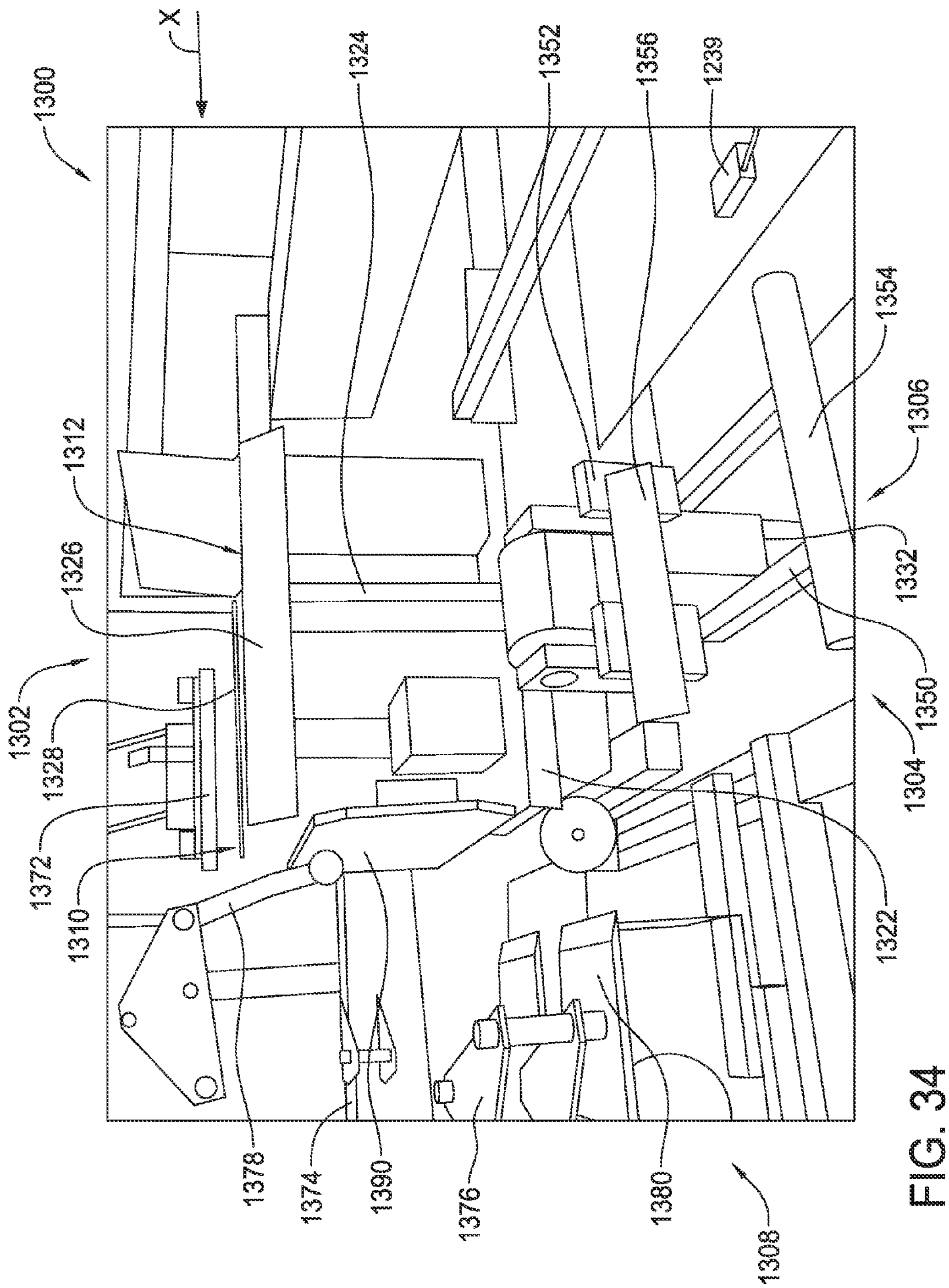
FIG. 34 is a perspective view of an exemplary mandrel assembly that may be used with the mandrel wrap section shown in FIG. 33.
Figure 35:
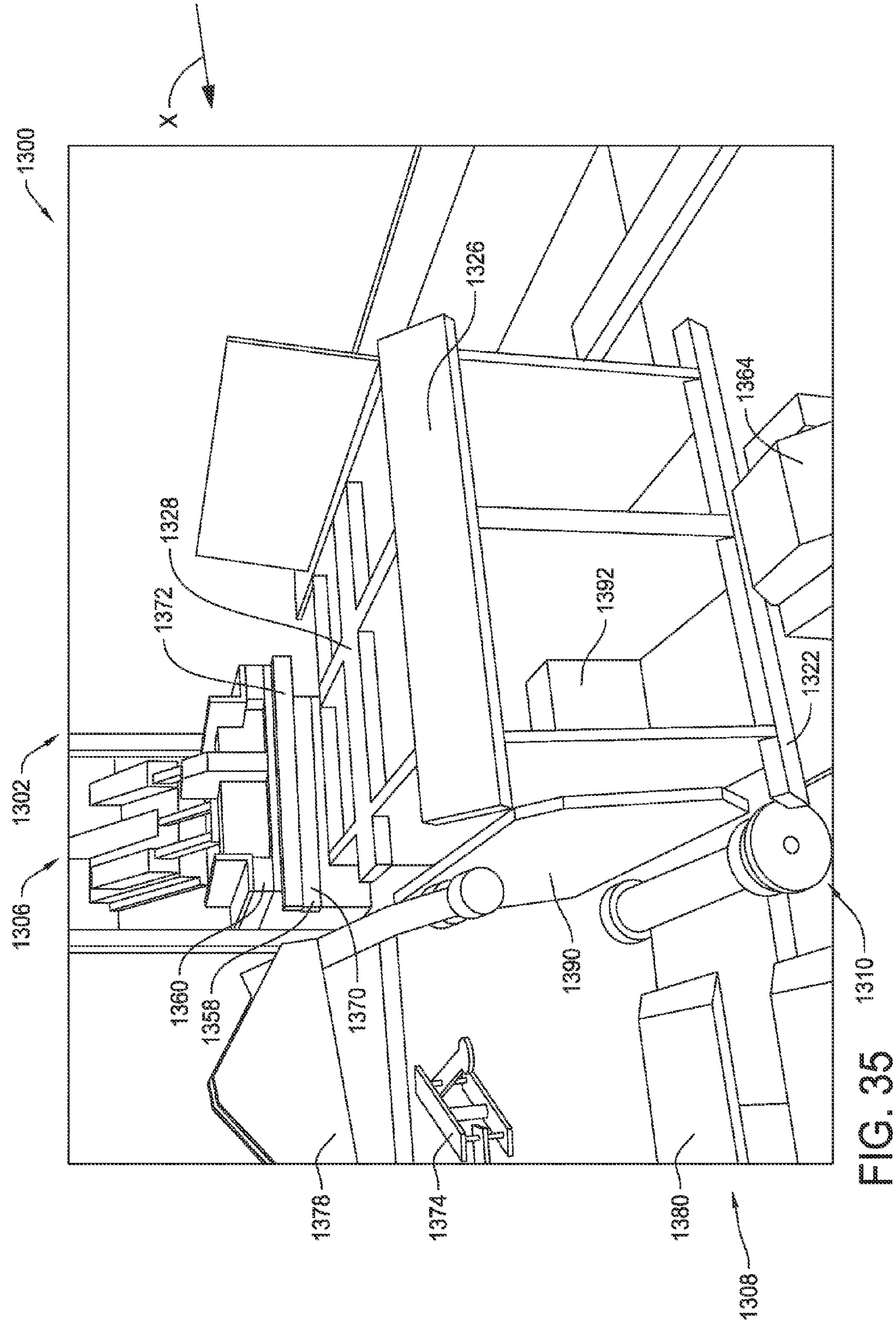
FIG. 35 is another perspective view of the mandrel assembly shown in FIG. 34.
Figure 36:
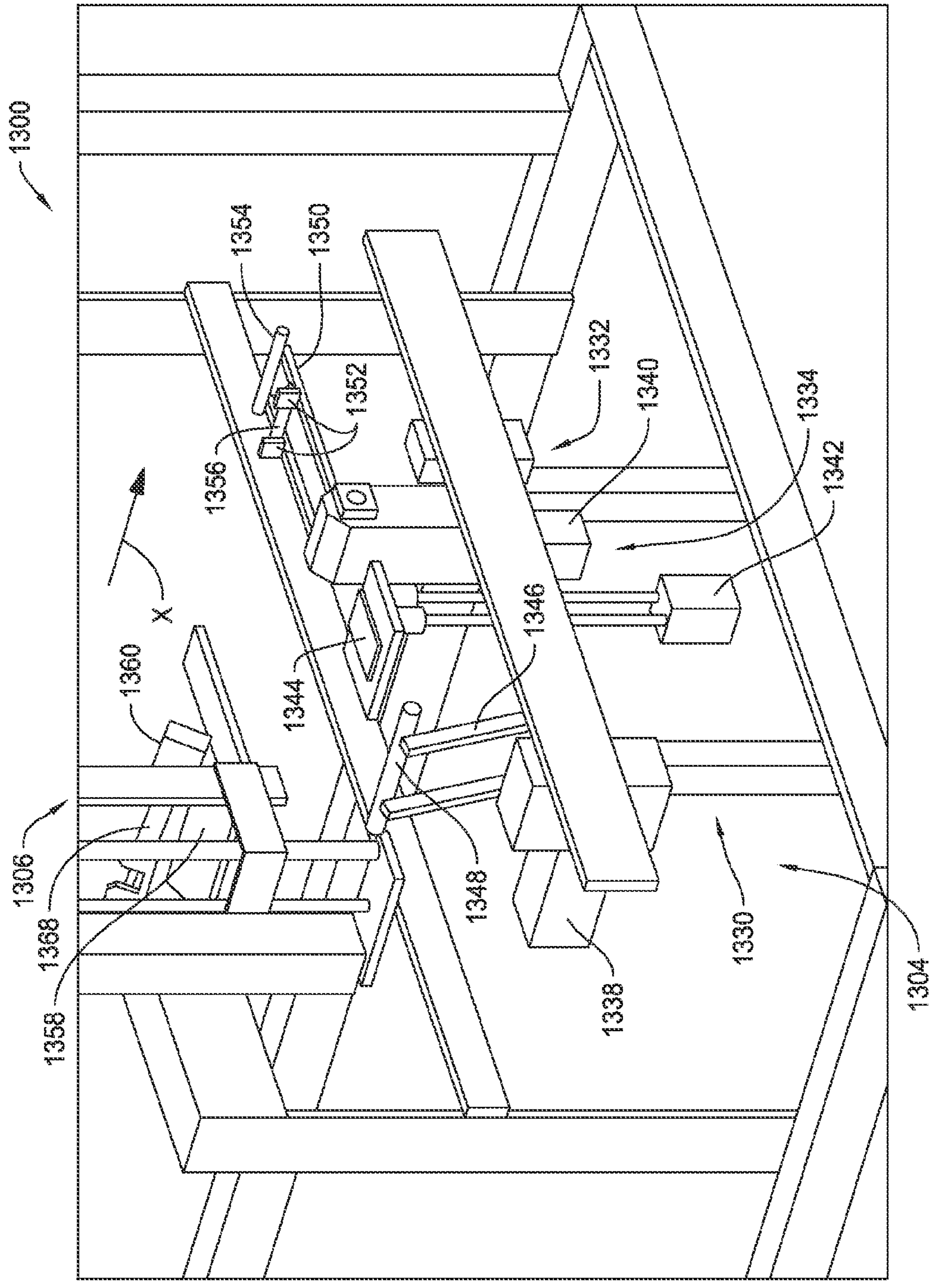
FIG. 36 is a perspective view of a portion of an exemplary lift frame assembly that may be used with the mandrel assembly shown in FIG. 33 and FIG. 34.
Figure 37:
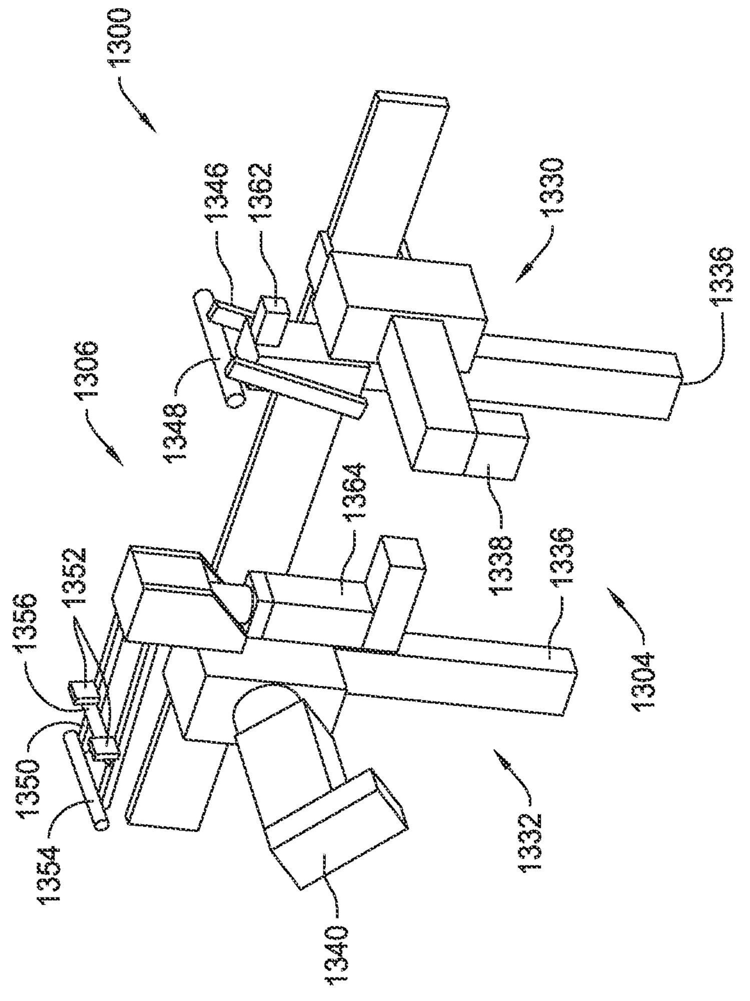
FIG. 37 is another perspective view of the portion of the lift frame assembly shown in FIG. 36.
Figure 38:
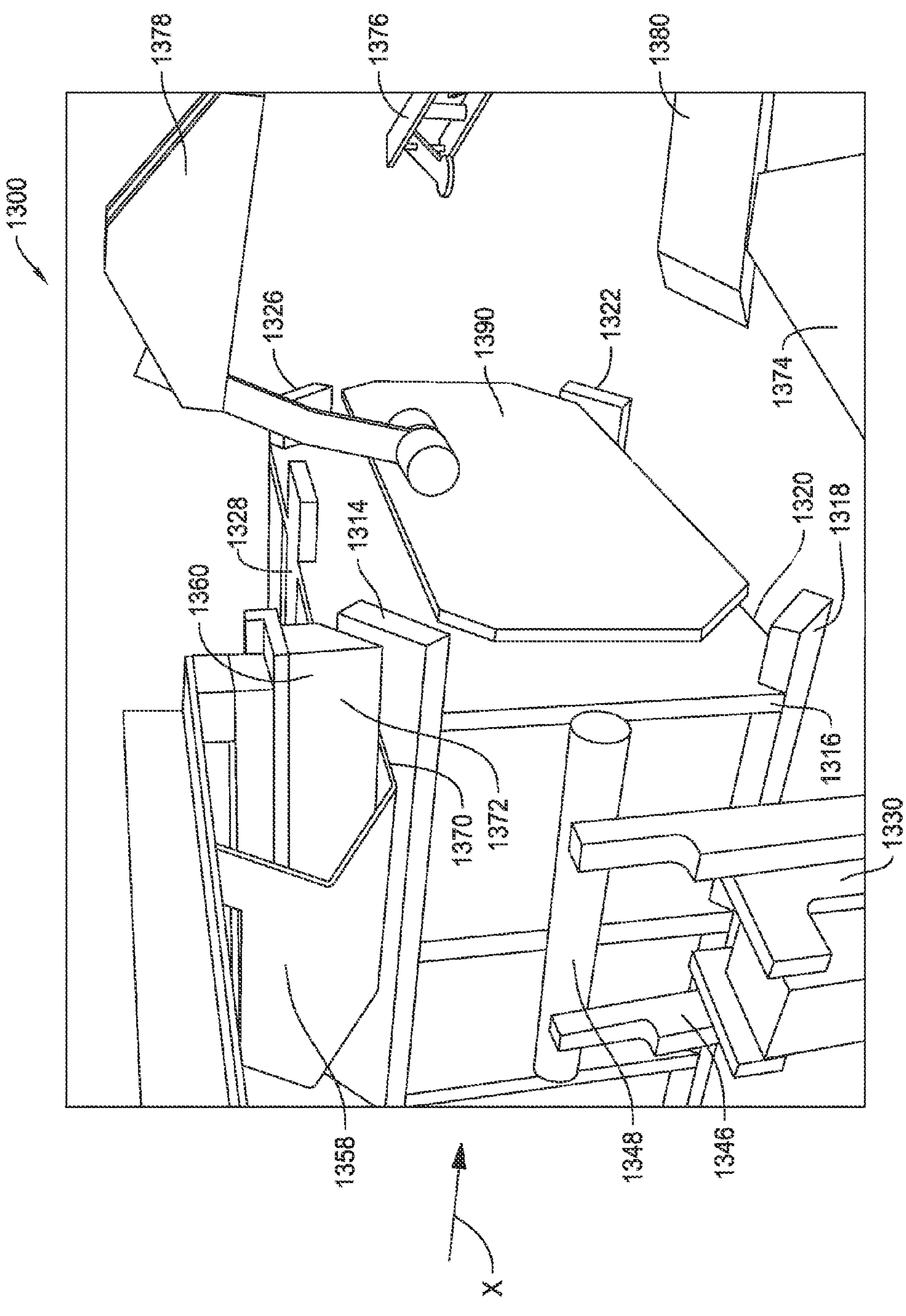
FIG. 38 is a perspective view of an exemplary lateral presser arm, glue tab presser, and glue tab folder that may be used with the mandrel assembly shown in FIG. 33 and FIG. 34.
Figure 39:
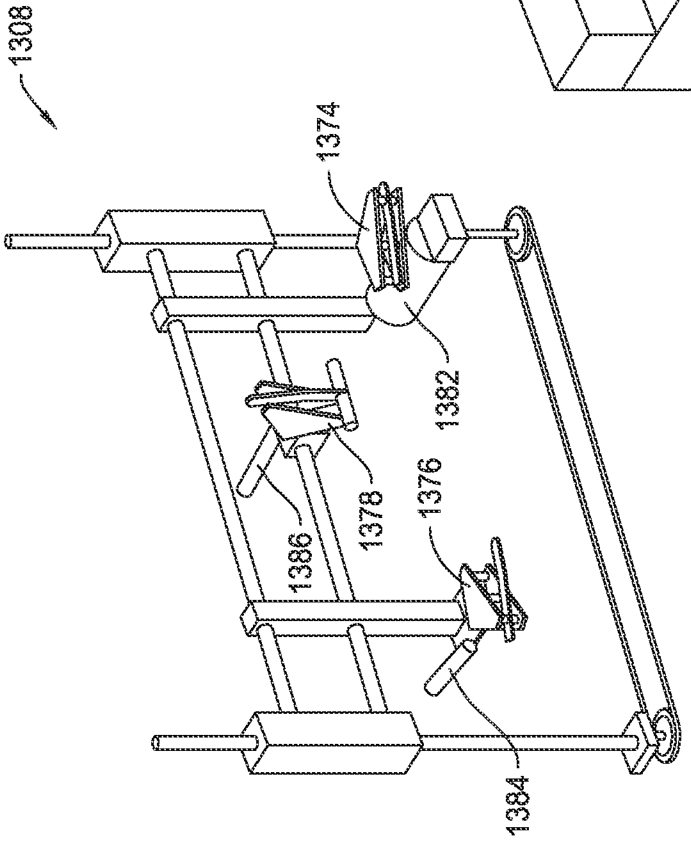
FIG. 39 is a perspective view of a bottom folder assembly that may be used with the mandrel assembly shown in FIG. 33 and FIG. 34.
Figure 40:
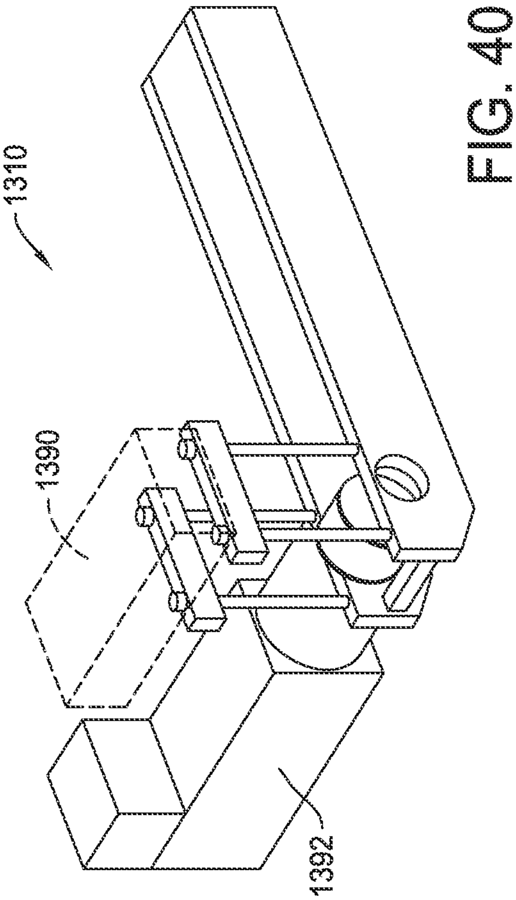
FIG. 40 is a perspective view of a servo-driven eject assembly that may be used with the mandrel assembly shown in FIG. 33 and FIG. 34.
Figure 42:
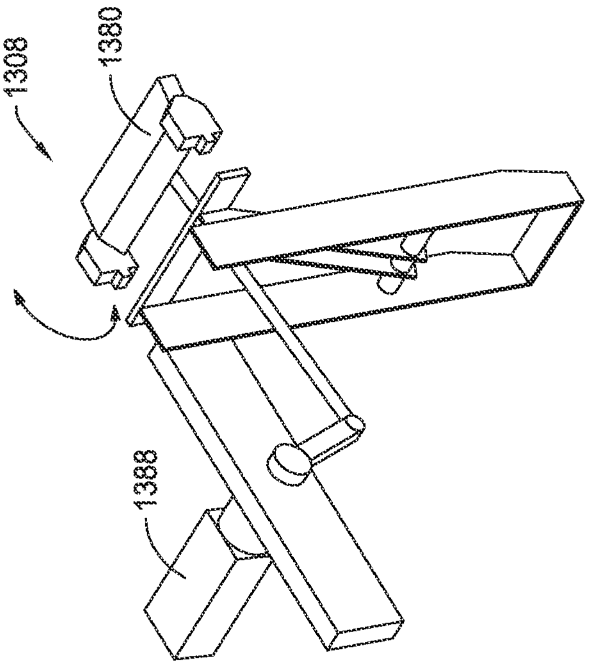
FIG. 42 is a perspective view of a bottom presser plate assembly that may be used with the mandrel assembly shown in FIG. 33 and FIG. 34.
Figure 41:
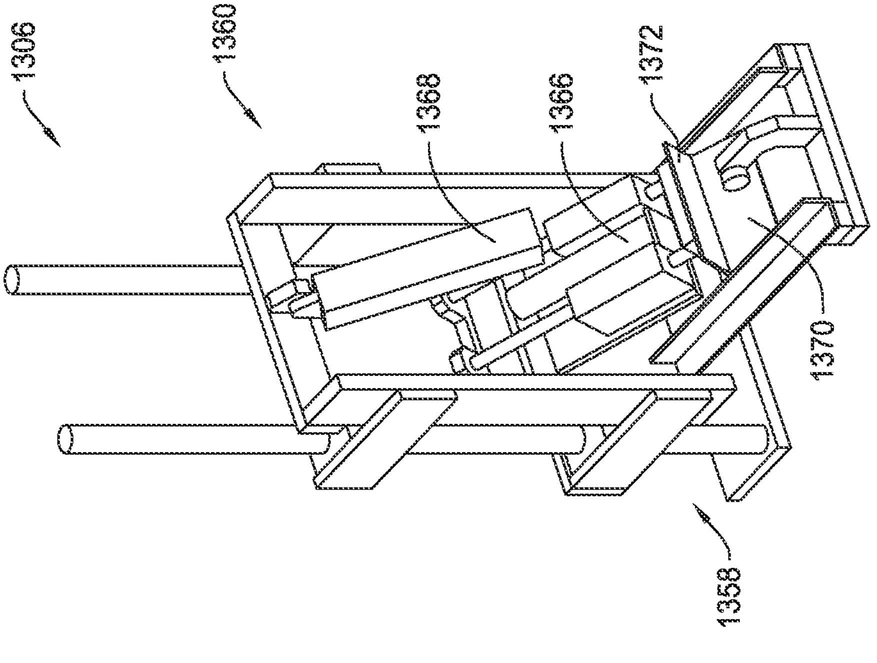
FIG. 41 is a perspective view of a glue tab folder and glue tab presser assembly that may be used with the mandrel assembly shown in FIG. 33 and FIG. 34.
Figure 43:
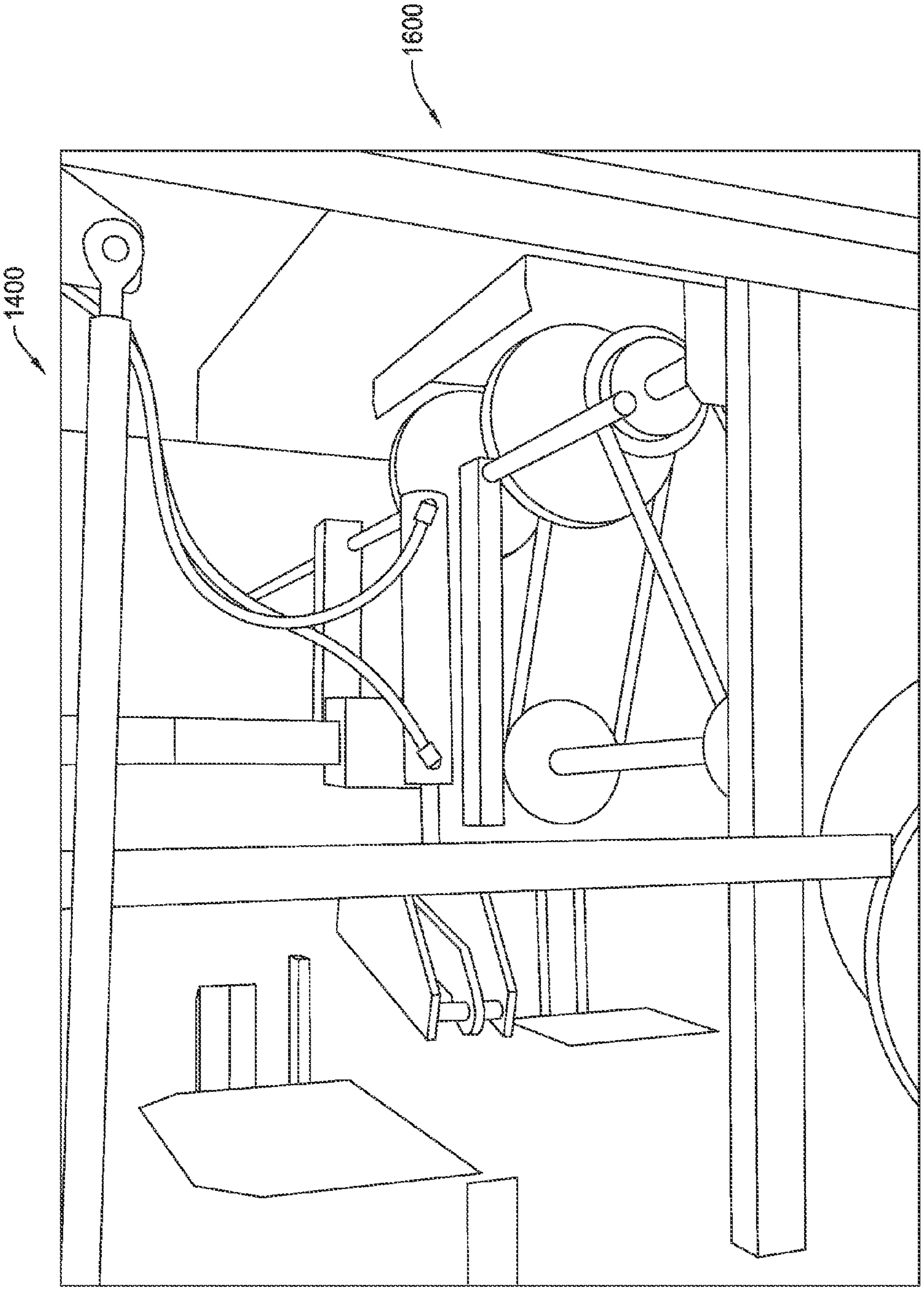
FIG. 43 is a perspective view of an exemplary outfeed section within the machine shown in FIGS. 5-8.
Figure 44:
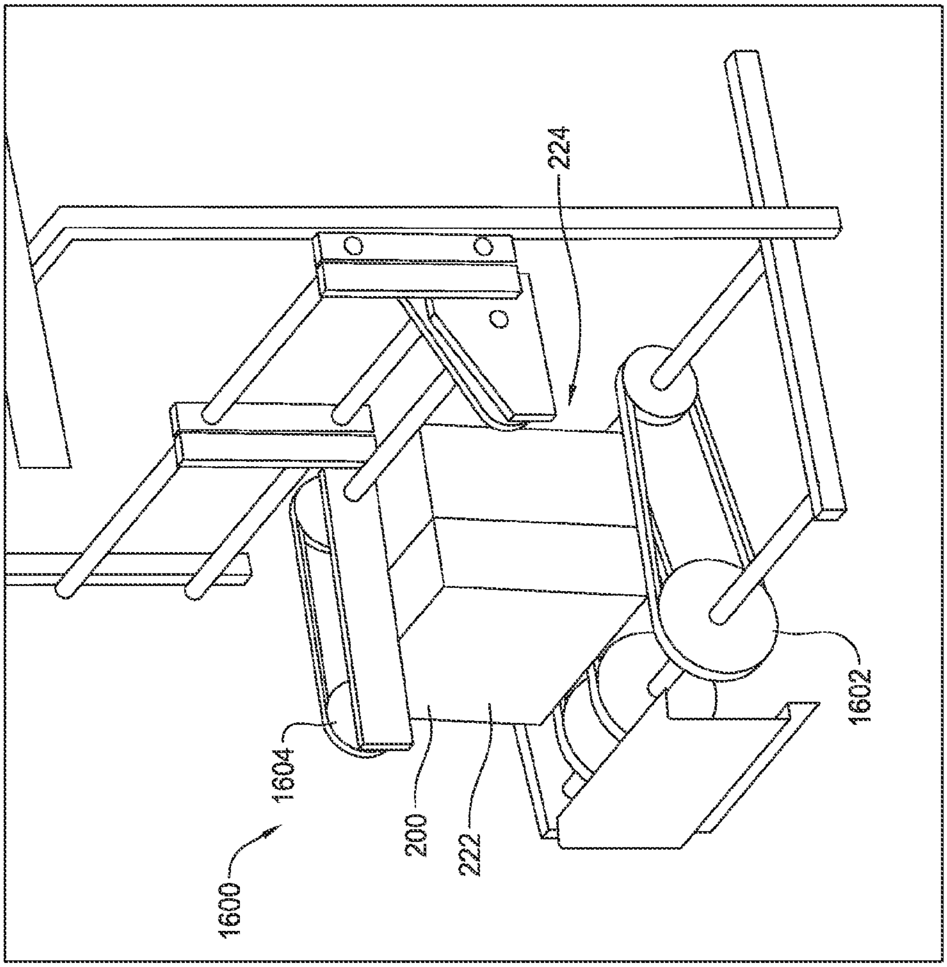
FIGS. 44-45 are a perspective view of portions of the outfeed assembly shown in FIG. 43.

Referring to FIG. 31-32, in the exemplary embodiment, pusher foot 1230 includes a pushing surface 1240 that extends between a top portion 1242 and a bottom portion 1244. An opening 1246 is defined within pusher feet 1230 and is sized and shaped to receive a pin 1248 therethrough. Pin 1248 is inserted through opening 1246 and through pusher rod 1210 such that pusher foot 1230 is pivotably coupled to pusher rod 1210. A slot 1250 is defined within pusher foot 1230 and is configured to enable pusher foot 1230 to pivot about pin 1248 through a limited angle of rotation. Pusher rod 1210 is positioned within slot 1250 to enable top portion 1242 to pivot in the downstream direction as pusher assembly 1206 moves from the transfer position to the pick-up position such that top portion 1242 moves below blank outer surface 132. When pusher assembly 1206 returns to the pick-up position, pusher feet 1230 pivots about pusher rod 1210 and returns to a pushing position with pushing surface 1240 oriented substantially perpendicular to trailing edge 126 of blank 20.

During operation, as pusher assembly 1206 moves from the transfer position to the pick-up position in a direction opposite sheet loading direction X, pusher feet 1230 pivot toward mandrel wrap section 1300 to enable pusher feet 1230 to travel below blank 20 as blank 20 is conveyed from lug assembly 1172 to transfer section 1200 in sheet loading direction X. Moreover, as pusher assembly 1206 moves to the pick-up position, guiderails 1238 support blank 20 above pusher assembly 1206 to enable pusher feet 1230 to travel below blank 20 and enable lug assembly 1172 to move blank 20 along guiderails 1238 in sheet loading direction X. As pusher assembly 1206 moves to the pick-up position, pusher feet 1230 are moved from leading edge 128 towards trailing edge 126. In the pick-up position, pusher feet 1230 pivot to a substantially perpendicular position with respect to trailing edge 126 to enable pusher feet 1230 to contact trailing edge 126 and convey blank 20 from transfer section 1200 to mandrel wrap section 1300.

FIGS. 33-42 illustrate various portions and perspectives of mandrel wrap section 1300. Blanks 20 are received in mandrel wrap section 1300 from transfer section 1200. Mandrel wrap section 1300 includes a mandrel assembly 1302, a lift assembly 1304, a folding assembly 1306, a bottom folder assembly 1308, and an ejection assembly 1310. In the exemplary embodiment, mandrel assembly 1302 includes a mandrel 1312 having a plurality of faces 1314, 1316, 1318, 1320, 1322, 1324, 1326, and 1328 that substantially correspond to at least some of the panels on blank 20. Alternatively, mandrel 1312 does not include side faces 1316 and/or 1324. In the exemplary embodiment, mandrel 1312 includes a first corner face 1314, a first side face 1316, a second corner face 1318, a bottom face 1320, a third corner face 1322, a second side face 1324, a fourth corner face 1326, and a top face 1328. Corner faces, or miter faces, 1314, 1318, 1322, and 1326 each extend at an angle between top face 1328 and one of side faces 1316 and/or 1324 or bottom face 1320 and one of side faces 1316 and/or 1324. Any of the mandrel faces can be solid plates, frames, plates including openings defined therein, and/or any other suitable component that provides a face and/or surface configured to enable a container to be formed from a blank as described herein.

An adhesive applicator 1239 (shown in FIG. 34) applies adhesive to certain predetermined panels and/or flaps of blank 20 before blank 20 is positioned adjacent mandrel 1312 and/or while blank 20 is positioned adjacent mandrel 1312. For example, adhesive applicator 1239 may apply adhesive to bottom/exterior surfaces of glue panel 38, first bottom end panel 96, and/or second bottom end panel 102 and/or to top/interior surfaces of first corner panel 22, first bottom side panel 62, and/or second bottom side panel 68 (all shown in FIG. 1A). However, as discussed above, adhesive may be applied to interior and/or exterior surfaces of any suitable panel and/or flap of blank 20. After adhesive is applied by adhesive applicator 1239, blank 20 is positioned under mandrel 1312. In the exemplary embodiment, second side panel 32 is positioned below bottom face 1320 of mandrel 1312 by pusher assembly 1206.

Lift assembly 1304 includes a first lift mechanism 1330, a second lift mechanism 1332, and an under plate assembly 1334 each coupled to a lifting frame 1336, which is coupled to frame 1002. First lift mechanism 1330 includes a servomechanism 1338, second lift mechanism 1332 includes a servomechanism 1340, and plate under assembly 1334 includes a pneumatic cylinder assembly 1342. Servomechanisms 1338 and/or 1340, and pneumatic cylinder assembly 1342 are each controlled separately to lift blank 20 toward and/or against mandrel assembly 1302. As such, lift assembly 1304 is positioned adjacent mandrel assembly 1302. In the exemplary embodiment, lift assembly 1304 receives blank 20 from pusher assembly 1206 and lifts blank 20 toward mandrel assembly 1302. For example, plate under assembly 1334 includes a plate 1344 that lifts second side panel 32 toward bottom face 1320 of mandrel 1312. Lift mechanisms 1330 and 1332 assist folding assembly 1306 in wrapping blank 20 about mandrel 1312, as described in more detail below. In an alternative embodiment, lift assembly 1304 includes a motor linked to a cam, and first lift mechanism 1330, a second lift mechanism 1332, and an plate under assembly 1334 are mechanically linked such that first lift mechanism 1330, a second lift mechanism 1332, and an plate under assembly 1334 each operate as lift assembly 1304 is positioned adjacent mandrel assembly 1302.

In the exemplary embodiment, folding assembly 1306 includes a lateral presser arm 1346 having an engaging bar 1348; a folding arm 1350 having a squaring bar 1352, an engaging bar 1354, and a miter bar 1356, a glue panel folder assembly 1358, a glue panel presser assembly 1360, a servomechanism 1364, and a plurality of pneumatic cylinders 1366 and 1368. These assemblies also include devices such as, but not limited to, guide rails and mechanical fingers (not shown). In the exemplary embodiment, lateral presser arm 1346 is coupled to first lift mechanism 1330 at a pneumatic cylinder 1362, and folding arm 1350 is coupled to second lift mechanism 1332 at a servomechanism 1364. Glue panel folder assembly 1358 and glue panel presser assembly 1360 are positioned adjacent first miter face 1314 of mandrel 1312. As such, glue panel folder assembly 1358 and glue panel presser assembly 1360 are positioned above lateral presser arm 1346 and first lift mechanism 1330.

Lateral presser arm 1346 and/or first lift mechanism 1330 are configured to wrap a first portion of blank 20 about mandrel 1312, and folding arm 1350 and/or second lift mechanism 1332 are configured to wrap a second portion of blank 20 about mandrel 1312. More specifically, lateral presser arm engaging bar 1348 is configured to contact fourth corner panel 34, second end panel 36, and/or glue panel 38 and fold panels 34, 36, and/or 38 about mandrel 1312 as lateral presser arm 1346 is rotated by pneumatic cylinder 1362 and/or lifted by first lift mechanism 1330 and servomechanism 1338. Folding arm engaging bar 1354 is configured to contact the second portion of blank 20 to wrap blank 20 about mandrel 1312 as folding arm 1350 is rotated by servomechanism 1364 and/or lifted by second lift mechanism 1332 and servomechanism 1340. Miter bar 1356 is configured to contact second corner panel 26 to position second corner panel 26 adjacent to and/or against fourth miter face 1326 of mandrel 1312. Squaring bar 1352 is configured to contact first end panel 28 adjacent fold line 44 between first end panel 28 and second corner panel 26. As such, squaring bar 1352 facilitates aligning and folding panels 26 and 28 against mandrel 1312 as the second portion of blank 20 is wrapped about mandrel 1312. In an alternative embodiment, folding arm 1350 is coupled to a pneumatic cylinder that is configured to move folding arm 1350 to contact the second portion of blank 20 to wrap blank 20 about mandrel 1312. In another alternative embodiment, lateral presser arm 1346 is coupled to a pneumatic cylinder to move lateral presser arm 1346 to contact fourth corner panel 34, second end panel 36, and/or glue panel 38 and fold panels 34, 36, and/or 38 about mandrel 1312.

In the exemplary embodiment, glue panel folder assembly 1358 includes an angled plate 1370 having a face substantially parallel to mandrel face 1314. Plate 1370 is coupled to a pneumatic cylinder 1366 that controls movements of plate 1370 toward and away from mandrel 1312. Plate 1370 is configured to contact and/or fold glue panel 38 during formation of container 200. In the exemplary embodiment, plate 1370 is configured to rotate glue panel 38 about fold line 54 towards and/or into contact with mandrel face 1314. Glue panel presser assembly 1360 includes a presser bar 1372 having a pressing surface substantially parallel to mandrel face 1314. Presser bar 1372 is coupled to a pneumatic cylinder 1368 that controls movement of presser bar 1372 toward and away from mandrel 1312. Presser bar 1372 is configured to contact and/or fold first corner panel 22 and/or glue panel 38 to form container 200. In the exemplary embodiment, presser bar 1372 is configured to press first corner panel 22 and glue panel 38 together against mandrel face 1314 to form a manufacturing joint at first corner wall 204 of container 200.

Bottom folder assembly 1308 includes a pair of side arms 1374 and 1376, an upper arm 1378, and a lower plate 1380. Each arm 1374, 1376, and 1378 includes pneumatic cylinders 1382, 1384, or 1386, and lower plate 1380 includes a servomechanism 1388 such that each arm 1374, 1376, and 1378 and lower plate 1380 can be individually controlled in terms of speed, force, rotation, extension, retraction, and/or any other suitable movements. Side arms 1374 and 1376 are configured to fold bottom end panels 102 and 96, respectively, about fold lines 106 and 100. Upper arm 1378 is configured to fold first bottom side panel 62 about fold line 66, and lower plate 1380 is configured to fold second bottom side panel 68 about fold line 72. Lower plate 1380 is further configured to press bottom panels 62, 68, 96, and/or 102 together to form bottom wall 222 of container 200. In the exemplary embodiment, each arm 1374, 1376, and 1378 includes a roller that contacts a respective panel of blank 20; however, it should be understood that arm 1374, 1376, and/or 1378 can include any suitable contacting surface. Further, lower plate 1380 is configured to lay flat in a first position and rotate toward mandrel 1312 to a second position. When lower plate 1380 is in the first position, container 200 can be ejected from mandrel 1312 over lower plate 1380 to outfeed section 1400. When lower plate 1380 is in the second position, lower plate 1380 compresses bottom panels 62, 68, 96, and/or 102 together.

Ejection assembly 1310 includes an ejection plate 1390 moveable from a first position within mandrel 1312 to a second position downstream from mandrel 1312. When ejection plate 1390 is at the first position, bottom folder assembly 1308 folds and/or presses bottom panels 62, 68, 96, and/or 102 against ejection plate 1390 to form bottom wall 222 of container 200. When ejection plate 1390 is at the second position, container 200 is removed from mandrel 1312. In the exemplary embodiment, ejection plate 1390 includes a servomechanism 1392 that controls speed, force, rotation, extension, retraction, and/or any other suitable movements of ejection plate 1390.

During operation of machine 1000 to form container 200, blank 20 is positioned under mandrel assembly 1302 by pusher assembly 1206. When blank 20 is positioned adjacent mandrel 1312, plate under assembly 1334 is raised upwardly relative to blank 20 using pneumatic cylinder assembly 1342, and lifting frames 1336 remains stationary. In the exemplary embodiment, under plate 1344 lifts second side panel 32 to be adjacent to and/or in contact with bottom face 1320 of mandrel 1312. First and second lift mechanisms 1330 and 1332 are raised using servomechanisms 1338 and 1340 that are used to individually control each of lift mechanisms 1330 and 1332, respectively. Lift mechanisms 1330 and 1332 engage at least end panels 36 and 28, respectively, of blank 20 and begin to wrap blank 20 around mandrel 1312 as lift mechanisms 1330 and 1332 move upwardly.

Lateral presser arm 1346 wraps the first portion of blank 20 around mandrel 1312 as first lift mechanism 1330 is raised using an associated servomechanism 1338. More specifically, as first lift mechanism 1330 is raised using servomechanism 1338, lateral presser arm 1346 is lifted by first lift mechanism 1330 and/or rotated toward mandrel 1312 using pneumatic cylinder 1362. Alternatively, lateral presser arm 1346 is not rotated as first lift mechanism 1330 lifts lateral presser arm 1346. In the exemplary embodiment, as lateral presser arm 1346 rotates and moves upward, lateral presser arm 1346 rotates at least fourth corner panel 34 toward second miter face 1318 of mandrel 1312 and second end panel 36 toward first side face 1316 of mandrel 1312. As lateral presser arm 1346 is lifted and/or rotated, pneumatic cylinder 1366 moves glue panel folder assembly 1358 toward glue panel 38 to rotate glue panel 38 toward first miter face 1314 of mandrel 1312.

Folding arm 1350 wraps the second portion of blank 20 around mandrel 1312 as second lift mechanism 1332 is raised using an associated servomechanism 1340. After lifting and/or during lifting, folding arm 1350 is rotated such that engaging bar 1354, miter bar 1356, and squaring bar 1352 further wrap blank 20 around mandrel 1312. Miter bar 1356 and squaring bar 1352 position blank 20 in face-to-face contact with mandrel faces 1324, 1326, and 1328 at panels 28, 26, and 24, respectively. Once folding arm 1350 has wrapped the second portion of blank 20 about mandrel 1312, pneumatic cylinder 1368 moves glue panel presser assembly 1360 toward first corner panel 22 and/or glue panel 38 to press first corner panel 22 and glue panel 38 together against mandrel 1312. Glue panel folder assembly 1358 and/or glue panel presser assembly 1360 rotates first corner panel 22 about fold line 40. Pneumatic cylinder 1368 holds glue panel presser assembly 1360 against panels 22 and 38 for a predetermined time length to ensure that adhesive bonds panels 22 and 38 together. Accordingly, lateral presser arm 1346, folding arm 1350, glue panel folder assembly 1358, and glue panel presser assembly 1360 cooperate to fold blank 20 along fold lines 40, 42, 44, 46, 48, 50, 52, and 54 to form container 200.

Because glue panel presser assembly 1360 is servo-controlled, the predetermined time length can be set based on the size and/or type of container, a material of the container, a type of adhesive and/or any other suitable variables. Further, because lateral presser arm 1346 and folding arm 1350 are servo-controlled, once first lift mechanism 1330 is at a predetermined location, lateral presser arm 1346 can be rotated inwardly toward mandrel 1312 by pneumatic cylinder 1362 to further wrap blank 20 about and/or press blank 20 into contact with mandrel 1312. Similarly, once second lift mechanism 1332 reaches a predetermined location, folding arm 1350 is rotated toward mandrel 1312 using servomechanism 1364 that controls the speed, force, and location of folding arm 1350 to further wrap blank 20 about mandrel 1312.

Bottom folder assembly 1308 then rotates bottom panels 62, 68, 96, and 102 about fold lines 66, 72, 100, and 106. More specifically, side arms 1374 and 1376 rotate bottom end panels 102 and 96, respectively, against ejection plate 1390; upper arm 1378 rotates first bottom side panel 62 against bottom end panels 96 and/or 102 and/or against ejection plate 1390; and then lower plate 1380 rotates second bottom side panel 68 against panels 62, 96, and/or 102 and/or against ejection plate 1390. Lower plate 1380 presses panels 62, 68, 96, and/or 102 against ejection plate 1390 for a predetermined length of time to ensure that adhesive bonds panels 62, 68, 96, and/or 102 together. Because each arm 1374, 1376, and 1378 and lower plate 1380 are servo-controlled, each component of bottom folder assembly 1308 can be individually controlled to form any size and/or type of container from any suitable container material using any suitable type of adhesive.

Ejection assembly 1310 facilitates removal of formed container 200 from mandrel wrap section 1300 to outfeed section 1400. More specifically, ejection plate 1390 applies a force to bottom wall 222 of container 200 to remove container 200 from mandrel 1312. In the exemplary embodiment, ejection plate 1390 is at a first position within and/or adjacent to mandrel 1312 during formation of container 200. To remove container 200, ejection plate 1390 is moved to a second position adjacent outfeed section 1400. As ejection plate 1390 is moved, container 200 is moved toward outfeed section 1400.

FIGS. 43-50 illustrate various portions and perspectives of outfeed section 1400. Containers 200 are received in outfeed section 1400 from mandrel wrap section 1300. Outfeed section 1400 includes a conveyor assembly 1600 and a diverter assembly 1406. Conveyor assembly 1600 is configured to move containers 200 from mandrel wrap section 1300 to diverter assembly 1406. Diverter assembly 1406 is configured to selectively convey containers 200 toward one or more product load sections 1500. In the exemplary embodiment, conveyor assembly 1600 is positioned downstream from mandrel wrap section 1300 such that ejection plate 1390 is above conveyor assembly 1600 when ejection plate 1390 is at its second position.

Conveyor assembly 1600 includes a bottom belt assembly 1602, and a top belt assembly 1604 positioned above bottom belt assembly 1602. Bottom belt assembly 1602 is coupled to machine frame 1002 and is oriented to support container 200 from machine frame 1002, and to move container 200 from mandrel wrap section 1300 to diverter assembly 1406. Top belt assembly 1604 is oriented with respect to bottom belt assembly 1602 such that container 200 is positioned between top belt assembly 1604 and bottom belt assembly 1602. Top belt assembly 1604 is configured to contact container 200 and move container from mandrel wrap section 1300 to diverter assembly 1406. Top belt assembly 1604 is also configured to prevent a rotation of container 200 as container 200 is moved from to diverter assembly 1406 such that container bottom wall 222 is closer to diverter assembly 1406 than top wall 224 as container 200 is moved to diverter assembly 1406.

Conveyor assembly 1600 also includes a motor 1606 that is operatively coupled to top belt assembly 1604 and bottom belt assembly 1602 to operate each assembly 1602 and 1604 at the same speed. In addition, motor 1606 is configured to remove container 200 from machine 1000 at a predetermined speed and timing. In the exemplary embodiment, conveyor assembly 1600 is controlled in synchronization with ejection plate 1390 such that conveyor assembly 1600 is only activated when container 200 is being ejected from mandrel wrap section 1300. Alternatively, conveyor assembly 1600 is constantly activated while machine 1000 is forming containers 200.

Diverter assembly 1406 is oriented between conveyor assembly 1600 and product load section 1500 for selectively conveying container 200 to each product loading area 1501. Diverter assembly 1406 is configured to convey containers 200 from mandrel wrap section 1300 to a first product loading area 1502 in a first container discharge direction $Y_1$, and to convey containers 200 to a second product loading area 1504 in a second container discharge direction $Y_2$ that is different than first container discharge direction $Y_1$.

In the exemplary embodiment, diverter assembly 1406 includes a container loading assembly 1408, and a conveyor belt assembly 1410. Conveyor belt assembly 1410 is configured to move containers 200 from mandrel wrap section 1300 to product load section 1500. Conveyor belt assembly 1410 includes at least one servomechanism 1416 that is configured to remove container 200 from machine 1000 at a predetermined speed and timing. In the exemplary embodiment, conveyor belt assembly 1410 is servo-controlled in synchronization with conveyor assembly 1600 such that conveyor belt assembly 1410 is only activated when container 200 is being ejected from mandrel wrap section 1300.

In the exemplary embodiment, conveyor belt assembly 1410 includes one or more conveyor belts 1418, a first channel plate 1420, a second channel plate 1422, and a dividing wall 1424 that is positioned with respect to conveyor belts 1418 to define a first conveyor section 1426 and a second conveyor section 1428. First conveyor section 1426 is defined between first channel plate 1420 and dividing wall 1424. Second conveyor section 1428 is defined between second channel plate 1422 and dividing wall 1424.

In the exemplary embodiment, first conveyor section 1426 and second conveyor section 1428 each operate bi-directionally to convey containers 200 toward first product loading area 1502 and/or second product loading area 1504. In one embodiment, second conveyor section 1428 is configured to convey containers to a third product loading area 1506 in first container discharge direction $Y_1$, and to convey containers 200 to a fourth product loading area 1508 in second container discharge direction $Y_2$.

Container loading assembly 1408 is coupled to mandrel assembly 1302, and is configured to channel containers 200 from mandrel assembly 1302 to conveyor belt assembly 1410. Container loading assembly 1408 includes a frame 1411 that is coupled to machine frame 1002, a loading rail assembly 1412, and a diverter plate 1414. In the exemplary embodiment, loading rail assembly 1412 is pivotably coupled to machine frame 1002 and extends outwardly from conveyor assembly 1600 towards conveyor belt assembly 1410. Loading rail assembly 1412 is configured to selectively transfer containers 200 to one of first conveyor section 1426 and second conveyor section 1428. In the exemplary embodiment, loading rail assembly 1412 includes a plurality of rails 1429 that are each oriented obliquely with respect to machine frame 1002. Each rail 1429 includes an outer surface 1431 that is oriented to enable containers 200 to slide across rail outer surface 1431 from container forming system 1026 to conveyor belt assembly 1410.

Diverter plate 1414 is pivotably coupled to frame 1411 and extends outwardly from frame 1411 such that diverter plate 1411 may contact containers 200 and direct containers 200 into one of first conveyor section 1426 and second conveyor section 1428. Moreover, diverter plate 1414 is spaced a distance 1433 along machine axis 1030 from loading rail assembly 1412, and is oriented to selectively channel containers 200 towards first conveyor section 1426 or second conveyor section 1428.

In the exemplary embodiment, container loading assembly 1408 is positionable between a first position (shown in FIG. 49) to convey a container 200 from container forming system 1026 to first conveyor section 1426, and a second position (shown in FIG. 50) to convey containers 200 from container forming system 1026 to second conveyor section 1428. More specifically, in the first position, loading rail assembly 1412 is positioned with respect to conveyor belt assembly 1410 such that containers 200 are conveyed from conveyor assembly 1600 to first conveyor section 1426. Moreover, in the first position, diverter assembly 1406 is positioned with respect to dividing wall 1424 such that containers 200 are prevented from being conveyed from conveyor assembly 1600 to second conveyor section 1428.

In the second position, loading rail assembly 1412 extends between conveyor assembly 1600 and dividing wall 1424, and prevents containers 200 from entering first conveyor section 1426. In addition, loading rail assembly 1412 extends across first conveyor section 1426 towards second conveyor section 1428 to move containers 200 across first conveyor section 1426 and into second conveyor section 1428. Moreover, in second position, diverter plate 1414 is positioned with respect to second channel plate 1422 to direct containers 200 from conveyor assembly 1600 to second conveyor section 1428.

In the exemplary embodiment, diverter plate 1414 and loading rail assembly 1412 each include a hydraulic cylinder assembly 1430 to selectively position diverter plate 1414 and loading rail assembly 1412 between the first position and the second position. A servomechanism 1432 is operatively coupled to each hydraulic cylinder assembly 1430 to control a bi-directional position of loading rail assembly 1412 and diverter plate 1414. Loading rail assembly 1412 operates in synchronization with diverter plate 1414 to move containers 200 to first conveyor section 1426 or second conveyor section 1428.

Figure 51:
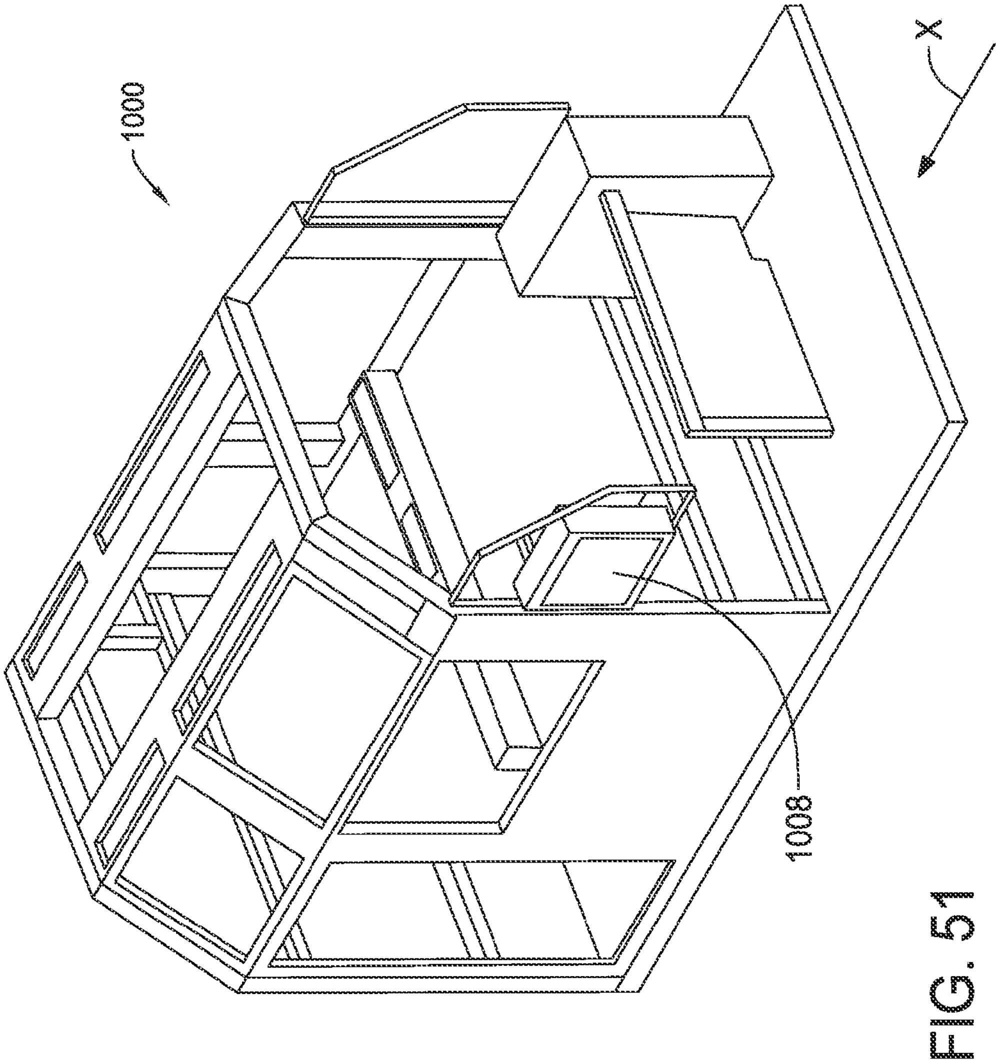
FIG. 51 is a perspective view of a portion of an exemplary control system that is part of the machine shown in FIGS. 5-8.
Figure 52:
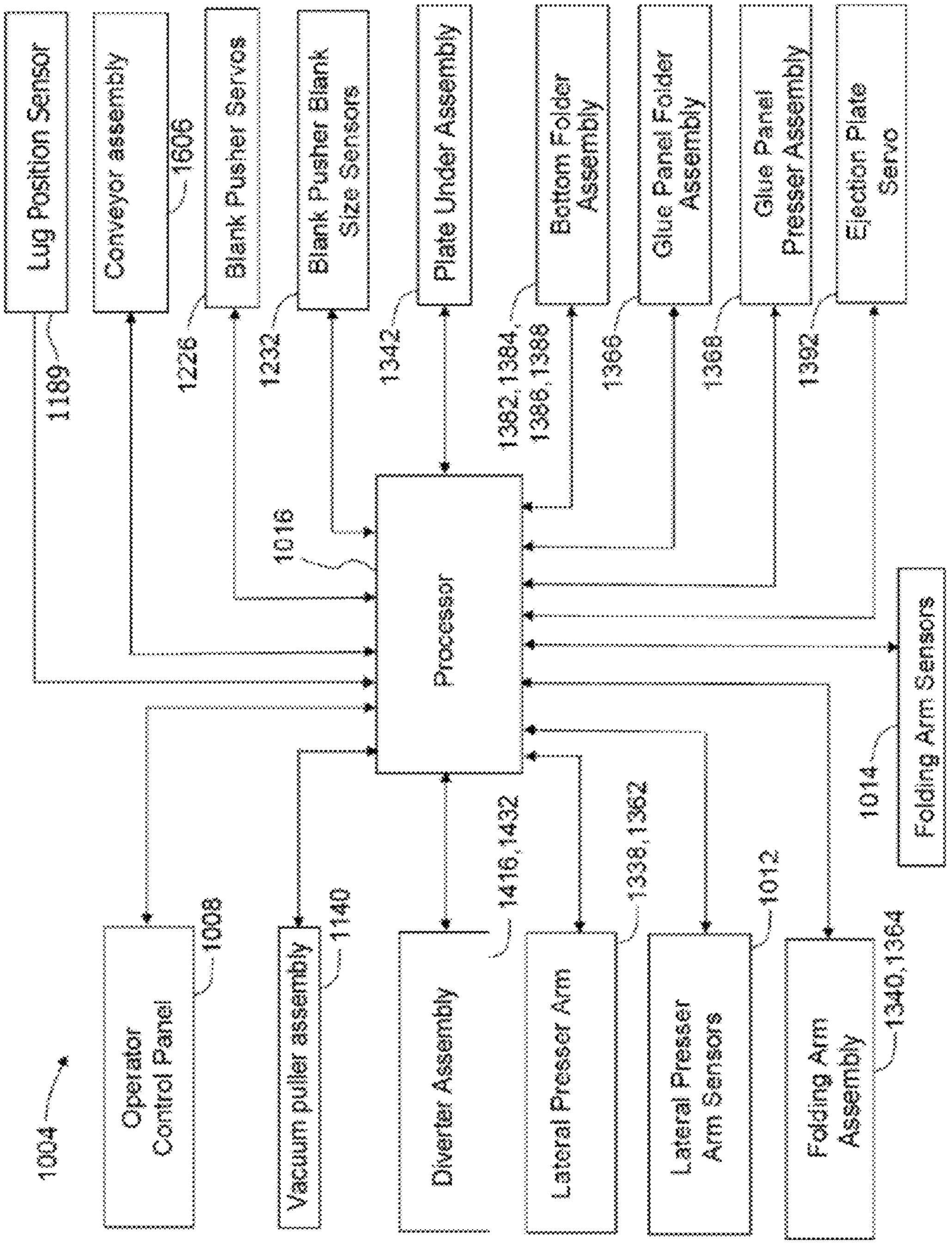
FIG. 52 is a schematic view of the control system that is part of the machine shown in FIGS. 5-8.

FIG. 51 is a perspective view of a portion of an exemplary control system 1004 that may be used to control machine 1000 shown in FIGS. 5-8. More specifically, FIG. 51 illustrates positioning of an operator control panel or user interface 1008 on machine 1000. FIG. 52 is a schematic view of control system 1004 that may be used with machine 1000 shown in FIGS. 5-8. Machine 1000 is configured to assemble containers of any size and any shape without limitation. Therefore, to accommodate machine 1000's assembly of such a large variety of containers, machine control system 1004 is configured to automatically detect dimensional features of blanks 20 of varying shapes and sizes, including, but not limited to, length, width, and/or depth.

In the exemplary embodiment, machine 1000 includes at least a lug position sensor 1189, a lateral presser arm sensor 1012, a folding arm sensor 1014, and blank pusher blank size sensor 1232. Further each servomechanism can include a sensor. Sensors 1189, 1012, 1014, and/or 1232 can be any suitable sensors such as, for example, encoders, reed switches, reed sensors, infra-red type sensors, and/or photo-eye sensors. Alternatively, any sensors that enable operation of control system 1004 and machine 1000, as described herein may be used. Servomechanisms 1226, 1338, 1340, 1364, 1388, 1392, 1416, and 1432 and sensors 1012, 1014, 1189, and 1232 are integrated within machine control system 1004, as described herein.

Control system 1004 also includes at least one processor 1016. Preprogrammed recipes or protocols are programmed in and/or uploaded into processor 1016 and such recipes include, but are not limited to, predetermined speed and timing profiles, wherein each profile is associated with blanks of a predetermined size and shape. Control panel 1008 allows an operator to select a recipe that is appropriate for a particular blank. The operator typically does not have sufficient access rights/capabilities to alter the recipes; although select users can be given privileges to create and/or edit recipes. Each recipe is a set of computer instructions that instruct machine 1000 as to forming the container. For example, machine 1000 is instructed as to speed and timing of picking a blank from blank feed section 1100, speed and timing of transferring the blank under mandrel 1312, speed and timing of lifting the blank into contact with mandrel 1312, speed and timing of moving lateral presser arm 1346, speed and timing of moving folding arm 1350, speed and timing of bottom folder assembly 1308, and speed and timing of transferring the formed container to outfeed section 1400. Since each component is individually controlled by a servomechanism, control system 1004 is able to control the movement of each component of machine 1000 relative to any other component of machine 1000. This enables an operator to maximize the number of containers that can be formed by machine 1000, easily change the size of containers being formed on machine 1000, and easily change the type of containers being formed on machine 1000.

As illustrated in FIG. 52, processor 1016 is coupled in communication with actuator 1140, pneumatic cylinders 1156, 1342, 1362, 1366 1368, 1382, 1384, 1386, servomechanisms 1226, 1338, 1340, 1364, 1388, 1392, 1416, 1432, and sensors 1012, 1014, 1189, 1232. Servomechanisms 1226, 1338, 1340, 1364, 1388, 1392, 1416, and 1432 independently drive and position the associated devices and/or components as commanded by processor 1016. Sensors 1012, 1014, 1189 and 1232 independently generate and transmit real-time feedback signals to processor 1016 that are substantially representative of a position of a blank within machine 1000. Control system 1004 is configured to facilitate programming a plurality of component speeds and timing of movement within each recipe. That is, for a particular cycle of a component, the speed of that component as driven by the associated servomechanism can vary at any point in the cycle. Additionally, the timing of the movement can also be controlled by servomechanisms 1226, 1338, 1340, 1364, 1388, 1392, 1416, and 1432 and/or control system 1004.

Control system 1004 is configured to facilitate dynamic control of the container-forming process. More specifically, if the blanks to be formed into containers are not uniform with respect to, for example, the associated depth dimension (i.e., the depth or height of the box), the sensors will generate and transmit a signal to processor 1016 that will alter the movement of the drives driven by the associated servomechanisms to accommodate the differing depth dimensions dynamically. For example, in the event that transfer section 1200's pusher assembly 1206 senses that a particular blank has a greater depth than a previous blank (or control system 1004 instructs machine 1000 either via sensors or operator input that the blank has a different depth dimension), such dimension feedback to processor 1016 will induce processor 1016 to adjust a stroke of pusher assembly 1206 to accommodate the varying blank depths.

The above-described machine and methods overcome at least some disadvantages of known box forming machines by providing a blank delivery system that includes modular blank hoppers that are each configured to deliver blanks having different blank depths, different lid configurations, and/or different printing to a container forming system. In addition, the blank delivery system described herein includes a blank transfer assembly that is coupled to each blank hopper to selectively deliver different blanks to the container forming section to form a plurality of different types of containers having different container depths, different printing on the outside of containers, and/or different lid structures. Moreover, the machine described herein also includes a container delivery system that is configured to selectively deliver the different containers from the container forming system to one or more product loading areas. By providing a machine that includes a blank delivery system that delivers different types of blanks to a container forming system to form different types of containers without having to stop the machine for adjustment or reconfiguration, the cost of forming different types of containers is reduced as compared to known box forming machines.

Exemplary embodiments of methods and a machine for forming a container from a blank are described above in detail. The methods and machine are not limited to the specific embodiments described herein, but rather, components of systems and/or steps of the methods may be utilized independently and separately from other components and/or steps described herein. For example, the methods and machine may also be used in combination with other box forming machines, and are not limited to practice with only the machine described herein. Rather, the exemplary embodiment can be implemented and utilized in connection with many other box forming machine applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A machine for forming a first type of container from a first blank of sheet material and a second type of container from a second blank of sheet material, said machine comprising:

a container forming system comprising a mandrel;

a transfer section positioned upstream of said container forming system, said transfer section comprising a pusher assembly;

a blank loading assembly comprising a first blank hopper configured to hold a plurality of first blanks and a second blank hopper configured to hold a plurality of second blanks, the first blanks having a first depth and the second blanks having a second depth;

a blank transfer assembly coupled to said first and second blank hoppers, said blank transfer assembly configured to convey the first and second blanks from said respective first and second blank hoppers to said transfer section, wherein said pusher assembly is configured to convey each of the first blanks and the second blanks to said container forming system;

a sensor configured to sense a depth dimension of each of the first and second blanks conveyed to said transfer section, wherein the depth dimension corresponds to one of the first depth and the second depth; and a control system configured to adjust a stroke of said pusher assembly based on the sensed depth dimension, such that each of the first and second blanks is properly positioned under said mandrel by said pusher assembly, wherein said machine is configured to selectively form the first type of container from each of the plurality of first blanks and the second type of container from each of the plurality of second blanks during continuous operation of said machine at least partially by wrapping each of the first and second blanks about said mandrel.

2. A machine in accordance with claim 1, wherein said blank loading assembly is configured to modularly couple to a third blank hopper, each of said first, second, and third blank hoppers is configurable to receive blanks having different blank depths, different lid configurations, and different printing.

3. A machine in accordance with claim 1, wherein each of said first and second blank hoppers comprises:

a hopper assembly configured to support a plurality of blanks having a predefined number of sides and a predefined length, said hopper assembly comprising opposing sidewalls that are oriented such that the plurality of blanks are arranged in a stack within said hopper assembly; and a vacuum puller assembly positioned below the stack of blanks, said vacuum puller assembly configured to transfer each blank from said hopper assembly to said blank transfer assembly.

4. A machine in accordance with claim 3, wherein said vacuum puller assembly comprises at least one vacuum assembly that is coupled to a support assembly, said support assembly configured to position said vacuum assembly against a blank within said hopper assembly and to move said vacuum assembly such that the blank is positioned onto said blank transfer assembly.

5. A machine in accordance with claim 4, wherein said vacuum assembly comprises a suction cup assembly configured to selectively form a suction seal with an outer surface of the blank to facilitate removing the blank from said hopper assembly.

6. A machine in accordance with claim 1, wherein said blank transfer assembly comprises a pair of lug assemblies for conveying the blanks from each of said blank hoppers to said transfer section, each of said lug assemblies comprising:

a lug chain extending between a tail sprocket and a drive sprocket, said lug chain extends through said blank loading assembly to define a loading path from said blank loading assembly to said transfer section; and a plurality of lugs pivotably coupled to said lug chain, each lug of said plurality of lugs comprises a positioning slot extending therethrough, each said positioning slot having a pin inserted therethrough, such that each said lug pivots about said pin away from a conveyed blank as said lug travels off of an end portion of said loading path.

7. A machine in accordance with claim 6, wherein each said lug is aligned with a corresponding lug coupled to an adjacent lug chain to form a pair of pushing lugs.

8. A machine in accordance with claim 1, wherein said pusher assembly comprises a pusher bar, a pair of pusher rods extending outwardly from said pusher bar, and a plurality of pusher feet, wherein each pusher foot of said plurality of pusher feet is pivotably coupled to a corresponding pusher rod such that said pusher foot is below the blank as said pusher assembly moves opposite a sheet loading direction, and contacts the blank as said pusher assembly moves along the sheet loading direction.

9. A machine for forming a first type of container from a first blank of sheet material and a second type of container from a second blank of sheet material, said machine comprising:

a mandrel assembly comprising a mandrel having an external shape complimentary to an internal shape of at least a portion of each of the first and second types of container, and at least one lifting mechanism configured to wrap at least a portion of each of the first and second blank about said mandrel to facilitate forming the respective first and second types of container; and a transfer section positioned upstream of said mandrel assembly, said transfer section comprising a pusher assembly;

a blank delivery system coupled to said transfer section, said blank delivery system comprising:

a blank loading assembly comprising a first blank hopper configured to hold a plurality of first blanks and a second blank hopper configured to hold a plurality of second blanks, the first blanks having a first depth and the second blanks having a second depth; and a blank transfer assembly coupled to said first and second blank hoppers, said blank transfer assembly configured to convey the first and second blanks from said respective first and second blank hoppers to said transfer section, wherein said pusher assembly is configured to convey each of the first blanks and the second blanks to said mandrel assembly;

a sensor configured to sense a depth dimension of each of the first and second blanks conveyed to said transfer section, wherein the depth dimension corresponds to one of the first depth and the second depth; and a control system configured to adjust a stroke of said pusher assembly based on the sensed depth dimension, such that each of the first and second blanks is properly positioned under said mandrel by said pusher assembly, wherein said machine is configured to selectively form the first type of container from each of the plurality of first blanks and the second type of container from each of the plurality of second blanks during continuous operation of said machine.

10. A machine in accordance with claim 9, wherein said blank loading assembly is configured to modularly couple to a third blank hopper, each of said first, second, and third blank hoppers is configurable to receive blanks having different blank depths, different lid configurations, and different printing.

11. A machine in accordance with claim 9, wherein each of said first and second blank hoppers comprises:

a hopper assembly configured to support a plurality of blanks having a predefined number of sides and a predefined length, said hopper assembly comprising opposing sidewalls that are oriented such that the plurality of blanks are arranged in a stack within said hopper assembly; and a vacuum puller assembly positioned below the stack of blanks, said vacuum puller assembly configured to transfer each blank from said hopper assembly to said blank transfer assembly.

12. A machine in accordance with claim 11, wherein said vacuum puller assembly comprises at least one vacuum assembly that is coupled to a support assembly, said support assembly configured to position said vacuum assembly against a blank within said hopper assembly and to move said vacuum assembly such that the blank is positioned onto said blank transfer assembly.

13. A machine in accordance with claim 12, wherein said vacuum assembly comprises a suction cup assembly configured to selectively form a suction seal with an outer surface of the blank to facilitate removing the blank from said hopper assembly.

14. A machine in accordance with claim 9, wherein said blank transfer assembly comprises a pair of lug assemblies for conveying the blanks from each of said blank hoppers to said transfer section, each of said lug assemblies comprising:

a lug chain extending between a tail sprocket and a drive sprocket, said lug chain extends through said blank loading assembly to define a loading path from said blank loading assembly to said mandrel-assembly transfer section; and a plurality of lugs pivotably coupled to said lug chain, each lug of said plurality of lugs comprises a positioning slot extending therethrough, each said positioning slot having a pin inserted therethrough, such that each said lug pivots about said pin away from a conveyed blank as said lug travels off of an end portion of said loading path.

15. A machine in accordance with claim 14, wherein each said lug is aligned with a corresponding lug coupled to an adjacent lug chain to form a pair of pushing lugs.

16. A machine in accordance with claim 15, wherein said pusher assembly comprises a pusher bar, a pair of pusher rods extending outwardly from said pusher bar, and a plurality of pusher feet, wherein each pusher foot of said plurality of pusher feet is pivotably coupled to a corresponding pusher rod such that said pusher foot is below the blank as said pusher assembly moves opposite a sheet loading direction, and contacts the blank as said pusher assembly moves along the sheet loading direction.

17. A machine in accordance with claim 9, further comprising a container delivery system positioned downstream of said mandrel assembly, said container delivery system comprising:

a conveyor belt assembly comprising a first conveyor section and at least a second conveyor section, wherein said first conveyor section is coupled to a first product loading area, said second conveyor section is coupled to a second product loading area that is different than the first product loading area; and a container loading assembly coupled to said mandrel assembly for conveying the first type of container and the second type of container from said mandrel assembly to said conveyor belt assembly, said container loading assembly positionable between a first position to convey the first type of container from said mandrel assembly to said first conveyor section, and a second position to convey the second type of container from said mandrel assembly to said second conveyor section.

18. A machine in accordance with claim 17, wherein said container loading assembly comprises a loading rail assembly extending outwardly from said mandrel assembly, said loading rail assembly comprises an outer surface that is oriented to enable the first and second types of container to slide across said outer surface from said mandrel assembly to said conveyor belt assembly.

19. A machine in accordance with claim 18, wherein said loading rail assembly extends across said first conveyor section to said second conveyor section in the second position, said loading rail assembly preventing the second type of container from being conveyed to said first conveyor section.

* * * * *